United States Patent [19]
Frank et al.

[11] Patent Number: 5,960,461
[45] Date of Patent: *Sep. 28, 1999

[54] MULTIPROCESSOR DIGITAL DATA PROCESSING SYSTEM/SHARED MEMORY MULTIPROCESSOR SYSTEM AND METHOD OF OPERATION

[75] Inventors: Steven J. Frank, Hopkinton; Henry Burkhardt, III, Manchester; Linda O. Lee, Cambridge; Nathan Goodman, Brookline; Benson I. Margulies, Arlington; Frederick D. Weber, Cambridge, all of Mass.

[73] Assignee: Sun Microsystems, Inc., Palo Alto, Calif.

[*] Notice: This patent is subject to a terminal disclaimer.

[21] Appl. No.: 08/403,308

[22] Filed: Mar. 14, 1995

Related U.S. Application Data

[63] Continuation of application No. 08/100,100, Jul. 30, 1993, abandoned, which is a continuation of application No. 07/370,341, Jun. 22, 1989, Pat. No. 5,297,265, which is a continuation of application No. 07/136,930, Dec. 22, 1987, Pat. No. 5,055,999.

[51] Int. Cl.$^6$ ........................................... G06F 12/14
[52] U.S. Cl. ..................... 711/163; 711/117; 711/202
[58] Field of Search .................................. 395/490, 444, 395/474, 478, 479; 711/163, 117, 147, 151, 152

[56] References Cited

U.S. PATENT DOCUMENTS

| 4,503,497 | 3/1985 | Krygowski et al. | 711/124 |
| 4,821,172 | 4/1989 | Kaneko et al. | 395/825 |
| 5,055,999 | 10/1991 | Frank et al. | 711/163 |
| 5,297,265 | 3/1994 | Frank et al. | 711/202 |

OTHER PUBLICATIONS

"Shared Virtual Memory on Loosely Coupled Multiprocessors" by Kai Li, Thesis, Yale University, Department of Computer Science, Sep. 1986.

"Organization and Statistical Simulation of Hierarchical Multiprocessors" by Andrew W. Wilson, Jr., Thesis, Carnegie–Mellon University, Department of Electrical and Computer Engineering, Aug. 1985.

*Primary Examiner*—Eddie P. Chan
*Assistant Examiner*—Kevin L. Ellis

[57] ABSTRACT

A multiprocessor digital data processing system comprises a plurality of processing cells arranged in a hierarchy of rings. The system selectively allocates storage and moves exclusive data copies from cell to cell in response to access requests generated by the cells. Routing elements are employed to selectively broadcast data access requests, updates and transfers on the rings.

14 Claims, 75 Drawing Sheets

| PROCESSOR OPERATION | INVALID(1) | READ-ONLY | NON-EXCLUSIVE | EXCLUSIVE | ATOMIC | PENDING ATOMIC |
|---|---|---|---|---|---|---|
| LOAD(DEFAULT), SUBPAGE LOAD | READ READ-ONLY | NONE | NONE | NONE | WAIT(3) | ERROR |
| LOAD(EXCLUS), SUBPAGE LOAD, SUBPAGE PRE(2) | READ EXCLUSIVE | READ EXCLUSIVE | WRITE INVALIDATE | NONE | WAIT(3) | ERROR |
| SUBPAGE LOAD (ONE TIME) | READ ONE-TIME ->INVALID | NONE | NONE | NONE | NONE | ERROR |
| SUBPAGE STORE STORE(DEFAULT) | READ HIGHEST NONEXCLUSIVE | READ HIGHEST NONEXCLUSIVE | NONE | NONE | NONE | ERROR |
| SUBPAGE STORE STORE(EXCLUS) | READ EXCLUSIVE | READ EXCLUSIVE | WRITE INVALIDATE | NONE | NONE | ERROR |
| UPDATE | N/A | N/A | WRITE | NONE UPDATE | NONE | ERROR |

(1) INVALID DESCRIPTOR AND INVALID SUBPAGE
(2) SUBPAGE PRE - SUBPAGE PREFETCH, MEMORY SYSTEM SIDE EFFECT COMPLETES ASYNCHRONOUSLY
(3) WAIT IF BLOCKING MODE SPECIFIED ELSE NONE

*FIG. 6A*

| PROCESSOR OPERATION | INVALID (1) | READ-ONLY | NON-EXCLUSIVE | EXCLUSIVE | ATOMIC | PENDING ATOMIC |
|---|---|---|---|---|---|---|
| RELEASE SUBPAGE | →ATOMIC →EXCL | ERROR | ERROR | ERROR | →EXCL | →INVALID |
| RELEASE SUBPAGE, EXPEL | →ATOMIC EXPEL →INVALID | ERROR | ERROR | ERROR | EXPEL →INVALID | →INVALID |
| STOP SUBPAGE | →PENDING | ERROR | ERROR | →ATOMIC | WAIT NON-A | NONE (6) |
| STOP SUBPAGE & WAIT (3) | →PENDING →ATOMIC (6) | ERROR | ERROR | →PENDING →ATOMIC (6) | NONE | →ATOMIC |
| GET SUBPAGE | READ EXCLU →ATOMIC (5) | READ EXCLU →ATOMIC | READ EXCLU →ATOMIC | →ATOMIC | EXCEPTION | →ATOMIC |
| GET SUBPAGE & WAIT (4) | READ EXCLU →ATOMIC | READ EXCLU →ATOMIC | READ EXCLU →ATOMIC | →ATOMIC | →WAIT, →ATOMIC | →ATOMIC |
| REL & STOP SUBPAGE | NONE | ERROR | ERROR | ERROR | EXPEL →PENDING | NONE |
| WAIT, REL & STOP SUBPAGE | →PENDING WAIT ATOMIC EXPEL →PENDING | ERROR | ERROR | ERROR | EXPEL →PENDING | WAIT ATOMIC EXPEL →PENDING |
| LOAD, REL & STOP SUBPAGE | →PENDING WAIT ATOMIC EXPEL →PENDING | ERROR | ERROR | ERROR | EXPEL →PENDING | WAIT ATOMIC EXPEL →PENDING |
| MEMCHECK SUBPAGE | NONE | NONE | NONE | NONE | NONE | NONE |

(1) INVALID DESCRIPTOR AND INVALID SUBPAGE.
(2) GSPW, WAIT UNTIL SUBPAGE STATE LEAVES ATOMIC STATE THEN READ EXCLUSIVE,→ATOMIC GSP, TRAP
(3) INCLUDES STOP SUBPAGE & WAIT, STOP SUBPAGE & LOAD ATOMIC AND STOP & LOAD SUBPAGE
(4) INCLUDES GET SUBPAGE & WAIT, GET SUBPAGE & LOAD ATOMIC AND GET & LOAD SUBPAGE
(5) →INVALID IF SUBPAGE ATOMIC IN ANOTHER CACHE
(6) TRANSITIONS TO ATOMIC, WHEN OWNER STATE IS AVAILABLE FROM DOMAIN

*FIG. 6B*

| INTERCONNECT OPERATION | INVALID | READ-ONLY | NON-EXCLUSIVE | EXCLUSIVE | ATOMIC | PENDING ATOMIC |
|---|---|---|---|---|---|---|
| ATOMIC | NO CHANGE | ERROR | ERROR | ERROR | RESPOND, →INVALID | NO CHANGE |
| EXCLUSIVE | NO CHANGE | INVALID | INVALID, RESPOND, OWNER-LIMIT? | SAME | NO CHANGE, TRANSIENT | NO CHANGE |
| NON-EX | NO CHANGE | NO CHANGE | READ-ONLY, RESPOND, OWNER-LIMIT? SUBCACHED? | READ-ONLY, RESPOND, OWNER-LIMIT?, SUBCACHED? | NO CHANGE, TRANSIENT | NO CHANGE |
| HIGHEST NON-EX | NO CHANGE | DOM 0-COPY? | DOM 0-COPY?, RESPOND | SAME | NO CHANGE, TRANSIENT | NO CHANGE |
| READ-ONLY | NO CHANGE | NO CHANGE, RESPOND | NO CHANGE, WORKING-SET?, RESPOND, | NON-EX, WORKING-SET?, RESPOND | NO CHANGE, TRANSIENT | NO CHANGE |
| HIGHEST READ-ONLY | NO CHANGE | DOM 0-COPY? UPDATE-FLUSH? RESPOND | INVALID, RESPOND | SAME | NO CHANGE, TRANSIENT | NO CHANGE |
| ONE-TIME COPY | NO CHANGE | NO CHANGE | NO CHANGE | NO CHANGE | NO CHANGE | NO CHANGE |

*FIG. 7A*

| INTERCONNECT OPERATION | INVALID(1) | READ-ONLY | NON-EXCLUSIVE | EXCLUSIVE | ATOMIC | PENDING ATOMIC |
|---|---|---|---|---|---|---|
| UPDATE | NO CHANGE | DOM 0-COPY?, UPDATE-FLUSH? | ERROR | ERROR | ERROR | NO CHANGE |
| INVALIDATE | NO CHANGE | INVALID | ERROR | ERROR | ERROR | NO CHANGE |
| EXCLUSIVE RECOMBINE | RECOMBINE? →EXCLUS(2) | RECOMBINE? EXCLUS | ERROR | ERROR | ERROR | RECOMBINE? →ATOMIC |
| NON-EX RECOMBINE | RECOMBINE? →EXCLUS(2) | RECOMBINE? NON-EXCLUS | ERROR | ERROR | ERROR | NO CHANGE |

(1) INVALID DESCRIPTOR AND INVALID PAGE
(2) INVALID SUBPAGE ONLY

*FIG. 7B*

RESULT OF RESPONSE MESSAGES ON CACHES WITHOUT PENDING REQUESTS

| INTERCONNECT OPERATION | INVALID(1) | READ-ONLY | NON-EXCLUSIVE | EXCLUSIVE | ATOMIC | PENDING ATOMIC |
|---|---|---|---|---|---|---|
| ATOMIC | NO CHANGE | NO CHANGE | ERROR | ERROR | ERROR | RECOMBINE →ATOMIC |
| EXCLUSIVE | NO CHANGE | NO CHANGE | ERROR | ERROR | ERROR | RECOMBINE? →ATOMIC |
| NON-EX | →READ-ONLY (2) | NO CHANGE | ERROR | ERROR | ERROR | NO CHANGE |
| READ-ONLY | →READ-ONLY (2) | NO CHANGE | NO CHANGE | ERROR | ERROR | NO CHANGE |

(1) INVALID DESCRIPTOR AND INVALID PAGE
(2) INVALID SUBPAGE ONLY

*FIG. 7C*

RESULT OF RESPONSE MESSAGES ON CACHES WITH PENDING REQUESTS

| INTERCONNECT OPERATION | READ-ONLY | NON-EXCLUS EXCLUSIVE | ATOMIC | PENDING ATOMIC | HIGHEST NON-EX | HIGHEST READ-ONLY |
|---|---|---|---|---|---|---|
| ATOMIC | NO CHANGE | NO CHANGE | NO CHANGE | →ATOMIC | NO CHANGE | NO CHANGE |
| EXCLUSIVE | NO CHANGE | NO CHANGE | NO CHANGE | →ATOMIC | NO CHANGE | NO CHANGE |
| NON-EX | READ-ONLY | NO CHANGE | NO CHANGE | NO CHANGE | NO CHANGE | READ-ONLY |
| READ-ONLY | READ-ONLY | NO CHANGE | NO CHANGE | NO CHANGE | NO CHANGE | READ-ONLY |

*FIG. 7D*

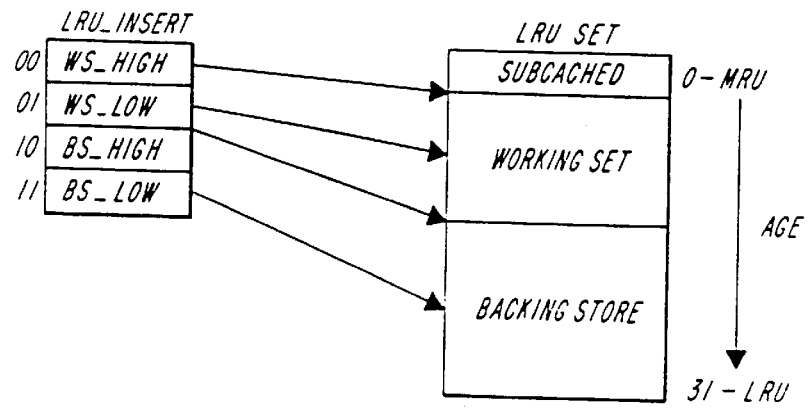

MULTIPROCESSOR DIGITAL DATA PROCESSING SYSTEM/SHARED MEMORY MULTIPROCESSOR SYSTEM AND METHOD OF OPERATION

This is a continuation of application Ser. No. 08/100,100, filed on Jul. 30, 1993, which is a continuation of U.S. Ser. No. 370,341, filed on Jun. 22, 1989 (now U.S. Pat. No. 5,297,265), which is a continuation of U.S. Ser. No. 136,930, filed on Dec. 22, 1987 (now U.S. Pat. No. 5,055,999), the teachings of all of which are incorporated herein by reference.

BACKGROUND OF THE INVENTION

This invention relates to digital data processing systems and, more particularly, to multiprocessing systems with distributed hierarchical memory architectures.

The art provides a number of configurations for coupling the processing units of multiprocessing systems. Among the earlier designs, processing units that shared data stored in system memory banks were coupled to those banks via high-bandwidth shared buses or switching networks. During periods of heavy usage, bottlenecks were likely to develop as multiple processing units simultaneously contended for access to the shared data.

In order to minimize the risk of formation of transmission bottlenecks, distributed memory systems were developed coupling individual processing units with local memory elements to form semi-autonomous processing cells. To achieve the benefits of multiprocessing, some of the more recently designed systems established cell communications through utilization of hierarchical architectures.

The distributed memory systems, however, permit multiple copies of single data items to reside within multiple processing cells; hence, it is difficult insure that all processing cells maintain identical copies of like data elements. Conventional efforts to resolve this problem, i.e., to preserve data coherency, rely upon software oriented techniques utilizing complex signalling mechanisms.

To avoid processing and signalling overhead associated with these software oriented solutions, Frank et al, U.S. Pat. No. 4,622,631, discloses a multiprocessing system in which a plurality of processors, each having an associated private memory, or cache, share data contained in a main memory element. Data within that common memory is partitioned into blocks, each of which can be owned by any one of the main memory and the plural processors. The current owner of a data block is said to have the correct data for that block.

A hierarchical approach is disclosed by Wilson Jr. et al, United Kingdom Patent Application No. 2,178,205, wherein a multiprocessing system is said to include distributed cache memory elements coupled with one another over a first bus. A second, higher level cache memory, attached to the first bus and to either a still higher level cache or to the main system memory, retains copies of every memory location in the caches below it. The still higher level caches, if any, and system main memory, in turn, retain copies of each memory location of cache below them. The Wilson Jr. et al processors are understood to transmit modified copies of data from their own dedicated caches to associated higher level caches and to the system main memory, while concurrently signalling other caches to invalidate their own copies of that newly-modified data.

Notwithstanding the solutions proposed by Frank et al and Wilson Jr. et al proposal, data coherency and bus contention remain significant problems facing both designers and users of multiprocessing systems. With respect to Wilson Jr. et al, for example, these problems may be attributed, at least in part, to the requirement that data in main memory must always be updated to reflect permanent modifications introduced to the data elements by each of the processors in the system. Moreover, neither of the proposed designs is capable of supporting more than a limited number of processing units. This restriction in "scalability" arises from a requirement of both the Wilson Jr. et al and Frank et al systems that the size of main memory must increase to accommodate each additional processor.

It is therefore an object of this invention to provide an improved multiprocessing system with improved data coherency, as well as reduced latency and bus contention. A further object is to provide a multiprocessing system with unlimited scalability.

Other objects of the invention are to provide a physically distributed memory multiprocessing system which requires little or no software overhead to maintain data coherency, as well as to provide a multiprocessing system with increased bus bandwidth and improved synchronization.

SUMMARY OF THE INVENTION

The invention attains the aforementioned objects by providing, in one broad aspect, a digital data processing system comprising a plurality of processing cells arranged in a hierarchy of rings. The system selectively allocates storage and moves exclusive data copies from cell to cell in response to access requests generated by the cells. Routing elements are employed to selectively broadcast data access requests, updates and transfers on the rings.

A system of the type provided by the invention does not require a main memory element, i.e., a memory element coupled to and shared by the systems many processors. Rather, data maintained by the system is distributed, both on exclusive and shared bases, among the memory elements associated with those processors. Modifications to datum stored exclusively in any one processing cell do not have to be communicated along the bus structure to other storage areas. As a result of this design, only that data which the processors dynamically share, e.g., sharing required by the executing program themselves, must be transmitted along the bus structure. These aspects, along with the systems hierarchical structure, localize signal traffic greatly, thereby reducing bus contention and bottlenecks.

With further attention to system structure and element interconnection, the processing cells include central processing units coupled with memory elements, each including a physical data and control signal store, a directory, and a control element. Groups of cells are interconnected along unidirectional intercellular bus rings, forming units referred to as segments. These segments together form a larger unit referred to as "information transfer domain(0)." While cells residing within each segment may communicate directly with one another via the associated intercellular bus, the associated central processing units are not themselves interconnected. Rather, intersegment communications are carried out via the exchange of data and control signals stored in the memory elements. A memory management element facilitates this transfer of information.

Communications between cells of different domain(0) segments are carried out on higher level information transfer domains. These higher level domains are made up of one or more segments, each comprising a plurality of domain routing elements coupled via a unidirectional bus ring. It will be appreciated that the segments of higher level domains differ from those of domain(0) insofar as the former comprise a ring of routing elements, while the latter comprise a ring of processing cells. Each routing element is connected with an associated one of the segments of the next lower information transfer domain. These connected lower segments are referred to as "descendants." Every information transfer domain includes fewer segments than the next lower domain. Apart from the single segment of the system's highest level domain, signals are transferred between segments of each information transfer domain via segments of the next higher domain.

An exemplary system having six domain(0) segments includes two domain(1) segments, the first which transfers data between a first three of the domain(0) segments, and the second of which transfers data between the other three domain(0) segments. Data is transferred between the two domain(1) segments over a domain(2) segment having two domain routing elements, each connected with a corresponding one of the domain(1) segments.

The system's memory elements each include a directory element that maintains a list of descriptors reflecting the identity and state of each datum stored in the corresponding memory. One portion of each descriptor is derived from the associated datum's system address, while another portion represents an access state governing the manner in which the local central processing unit may utilize the datum. This access state may include any one of an "ownership" state, a read-only state, and an invalid state. The first of these states is associated with data which can be modified by the local central processing unit, i.e., that unit included within the cell in which the datum is stored. The read-only state is associated with data which may be read, but not modified, by the local central processing unit. The invalid state is associated with invalid data copies.

The domain routing elements themselves maintain directories listing all descriptors stored in their descendant domain(0) segments. Thus, in the above example, the routing elements of first domain(1) segments maintain directories reflecting the combined content of the cells of their respective domain(0) segment. Moreover, the single routing element of the domain(2) segment maintains a directory listing all descriptors retained in all of the system's processing cells.

Data access requests generated by a processor are handled by the local memory element whenever possible. More particularly, a controller coupled with each memory monitors the cell's internal bus and responds to local processor requests by comparing the request with descriptors listed in the corresponding directory. If found, matching data is transmitted back along the internal bus to the requesting processor.

Data requests that cannot be resolved locally are passed from the processing cell to the memory management system. The management element selectively routes those unresolved data requests to the other processing cells. This routing is accomplished by comparing requested descriptors with directory entries of the domain routing units. Control elements associated with each of those other cells, in turn, interrogate their own associated directories to find the requested data. Data satisfying a pending request is routed along the domain segment hierarchy from the remote cell to the requesting cell.

Data movement between processing cells is governed by a protocol involving comparative evaluation of each access request with the access state associated with the requested item. The memory management system responds to a request for exclusive ownership of a datum by moving that datum to the memory element of the requesting cell. Concurrently, the memory management element allocates physical storage space for the requested item within the requesting cell's data storage area. The management element also invalidates the descriptor associated with the requested item within the data store of the remote cell, thereby effecting subsequent deallocation of the physical storage space which had retained the requested item prior to its transfer to the requesting cell.

While the aforementioned operations result in exclusive storage of the requested datum within the requesting cell, other cells may subsequently gain concurrent access to that datum, for example, on a read-only basis. Particularly, the memory management system responds to a request by a first cell for read-only access to datum exclusively owned by a second cell by transmitting a copy of that datum to the first cell while simultaneously designating the original copy of that data, stored in the second cell, as "nonexclusively owned."

The system permits an owning cell to disable the copying of its data by providing a further ownership state referred to as the "atomic" state. The memory management system responds to requests for data in that state by transmitting a wait, or "transient," signal to requestors and by broadcasting the requested data over the hierarchy once atomic ownership is relinquished.

A system of the type described above provides improved multiprocessing capability with reduced bus and memory contention. The dynamic allocation of exclusive data copies to processors requiring exclusive access, as well as the sharing of data copies required concurrently by multiple processors reduces bus traffic and data access delays. Utilization of a hardware-enforced access protocol further reduces bus and memory contention, while simultaneously decreasing software overhead required to maintain data coherency. The interconnection of information transfer domain segments permits localization of data access, transfer and update requests.

These and other aspects of the invention are evident in the description which follows.

BRIEF DESCRIPTION OF DRAWINGS

A more complete understanding of the invention may be attained by reference to the drawings, in which:

FIGS. 6A and 6B present state tables depicting handling of processor access requests directed to data stored in local caches in a digital data processing system constructed according to a preferred embodiment of the invention;

FIGS. 7A, 7B, 7C and 7D present state tables depicting handling of memory management data requests directed to data stored in the caches in a digital data processing system constructed according to a preferred embodiment of the invention; and FIG. 8 depicts a preferred interrelationship between the LRU_Insert table and the LRU set utilized in a digital data processing system constructed according to a preferred embodiment of the invention.

FIG. 11a through FIG. 11k-1 are timing diagrams depicting the timing of subcache hit and miss operations;

FIG. 13a through FIG. 13i-2 are timing diagrams depicting the timing of load and interrupt operations;

FIG. 14a through 14b-1 are timing diagrams depicting the timing of space load and store operations;

FIG. 15a through 15d-2 are timing diagrams depicting the timing of exception processing operations.

DETAILED DESCRIPTION OF THE ILLUSTRATED EMBODIMENT

Figure 1:
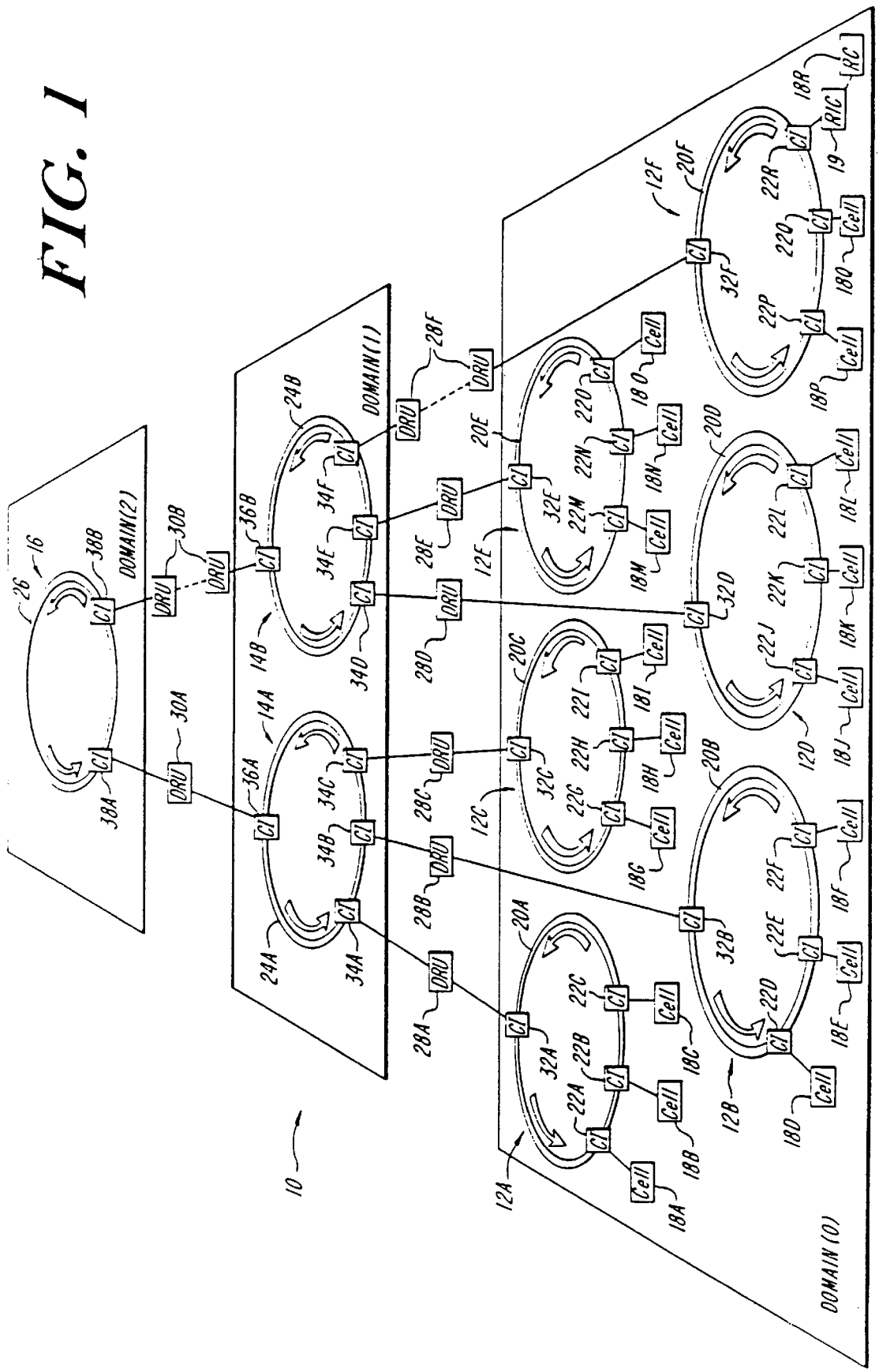
FIG. 1 depicts the structure of a preferred multiprocessing system constructed in accord with the invention.

FIG. 1 depicts the structure of a preferred multiprocessing system 10 constructed in accord with the invention. The illustrated system 10 includes three information transfer domains: domain(0), domain(1), and domain(2). Each information transfer domain includes one or more domain segments, characterized by a bus element and a plurality of cell interface elements. Particularly, domain(0) of the illustrated system 10 includes six segments, designated 12A, 12B, 12C, 12D, 12E and 12F, respectively. Similarly, domain(1) includes segments 14A and 14B, while domain (2) includes segment 16.

Each segment of domain(0), i.e., segments 12A, 12B, . . . 12F, comprise a plurality of processing cells. For example, as shown in the illustration, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

As further illustrated, each domain(0) segment may be characterized as having a bus element providing a communication pathway for transferring information-representative signals between the cells of the segment. Thus, illustrated segment 12A is characterized by bus 20A, segment 12B by 20B, segment 12C by 20C, et cetera. As described in greater detail below, information-representative signals are passed between the cells 18A, 18B and 18C of exemplary segment 12A by way of the memory elements associated with each of those cells. Specific interfaces between those memory elements and the bus 20A are provided by cell interface units 22A, 22B and 22C, as shown. Similar direct communication pathways are established in segments 12B, 12C and 12D between their respective cells 18D, 18E, . . . 18R by cell interface units 22D, 22E, . . . 22R, as illustrated.

As shown in the illustration and noted above, the remaining information transfer domains, i.e., domain(1) and domain(2), each include one or more corresponding domain segments. The number of segments in each successive segment being less than the number of segments in the prior one. Thus, domain(1)'s two segments 14A and 14B number fewer than domain(0)'s six 12A, 12B . . . 12F, while domain(2), having only segment 16, includes the fewest of all. Each of the segments in domain(1) and domain(2), the "higher" domains, include a bus element for transferring information-representative signals within the respective segments. In the illustration, domain(1) segments 14A and 14B include bus elements 24A and 24B, respectively, while domain(2) segment 16 includes bus element 26.

The segment buses serve to transfer information between the components elements of each segment, that is, between the segment's plural domain routing elements. The routing elements themselves provide a mechanism for transferring information between associated segments of successive domains. Routing elements 28A, 28B and 28C, for example, provide a means for transferring information to and from domain(1) segment 14A and each of domain(0) segments 12A, 12B and 12C, respectively. Similarly, routing elements 28D, 28E and 28F provide a means for transferring information to and from domain(1) segment 14B and each of domain(0) segments 12D, 12E and 12F, respectively. Further, domain routing elements 30A and 30B provide an information transfer pathway between domain(2) segment 16 and domain(1) segments 14A and 14B, as shown.

The domain routing elements interface their respective segments via interconnections at the bus elements. Thus, domain routing element 28A interfaces bus elements 20A and 24A at cell interface units 32A and 34A, respectively, while element 28B interfaces bus elements 20B and 24B at cell interface units 32B and 34B, respectively, and so forth. Similarly, routing elements 30A and 30B interface their respective buses, i.e., 24A, 24B and 26, at cell interface units 36A, 36B, 38A and 38B, as shown.

FIG. 1 illustrates further a preferred mechanism interconnecting remote domains and cells in a digital data processing system constructed in accord with the invention. Cell 18R, which resides at a point physically remote from bus segment 20F, is coupled with that bus and its associated cells (18P and 18O) via a fiber optic transmission line, indicated by a dashed line. A remote interface unit 19 provides a physical interface between the cell interface 22R and the remote cell 18R. The remote cell 18R is constructed and operated similarly to the other illustrated cells and includes a remote interface unit for coupling the fiber optic link at its remote end.

In a like manner, domain segments 12F and 14B are interconnected via a fiber optic link from their parent segments. As indicated, the respective domain routing units 28F and 30B each comprise two remotely coupled parts. With respect to domain routing unit 28F, for example, a first part is linked directly via a standard bus interconnect with cell interface 34F of segment 14B, while a second part is linked directly with cell interface unit 32F of segment 12F. These two parts, which are identically constructed, are coupled via a fiber optic link, indicated by a dashed line. As above, a physical interface between the domain routing unit parts and the fiber optic media is provided by a remote interface unit (not shown).

Figure 2A:
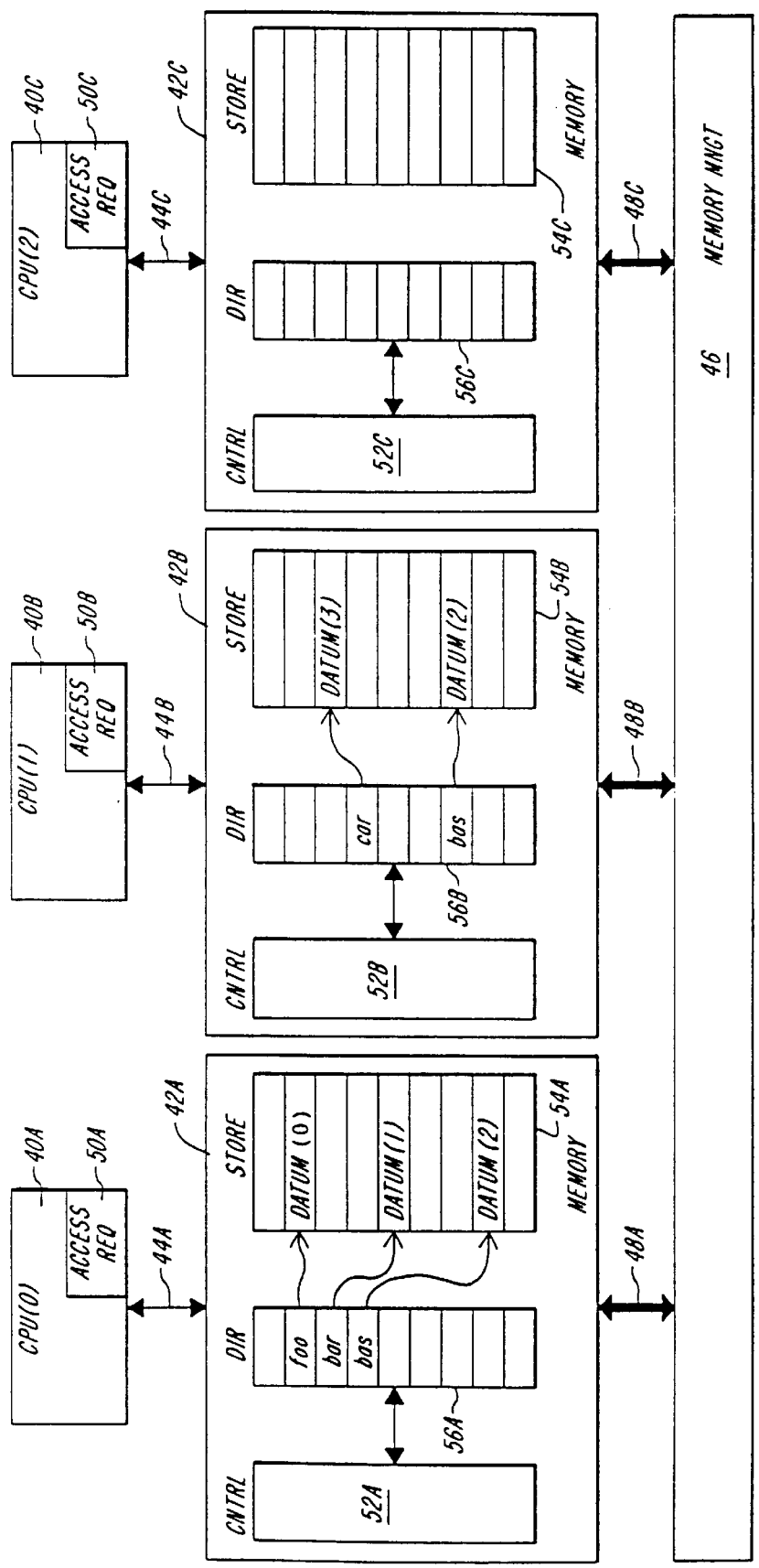
FIGS. 2A and 2B depict a preferred configuration of processing cells, including illustration of data movement provided within respective memory elements, in a digital data processing system constructed according to a preferred embodiment of the invention.

FIG. 2A depicts a preferred memory configuration providing data coherence in a multiprocessing system of the type, for example, described above. The illustrated system includes plural central processing units 40(A), 40(B) and 40(C) coupled, respectively, to associated memory elements 42(A), 42(B) and 42(C). Communications between the the processing and memory units of each pair are carried along buses 44A, 44B and 44C, as shown. The illustrated system further includes memory management element 46 for accessing information-representative signals stored in memory elements 44A, 44B and 44C via buses 48(A), 48(B) and 48(C), respectively.

In the illustrated embodiment, the central processing units 40A, 40B and 40C each include access request element, labelled 50A, 50B and 50C, respectively. These access request elements generate signals representative of requests for for access to an information stored in the memory elements 42A, 42B and 42C. Among the types of access request signals generated by elements 50A, 50B and 50C is the ownership-request signal, representing requests for for priority access to an information-representative signal stored in the memories. In a preferred embodiment, access request elements 50A, 50B and 50C comprise a subset of an instruction subset implemented on CPU's 40A, 40B and 40C. This instruction subset is described below.

The memory elements 40A, 40B and 40C include control elements 52A, 52B and 52C, respectively. Each of these control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units. Thus, store 54A maintains data and control information used by CPU 40A, while stores 54B and 54C maintain such information used by central processing units 40B and 40C, respectively. The information signals maintained in each of the stores are identified by unique descriptors, corresponding to the signals' system addresses. Those descriptors are stored in address storage locations of the corresponding directory. While the descriptors are considered unique, multiple copies of some descriptors may exist among the memory elements 42A, 4B and 42C where those copies themselves identify copies of the same data element.

Access request signals generated by the central processing units 40A, 40B and 40C include, along with other control information, an SA request portion matching the SA address of the requested information signal. The control elements 52A, 52B and 52C respond to access-request signals generated their respective central processing units 40A, 40B and 40C for determining whether the requested information-representative signal is stored in the corresponding storage element 54A, 54B and 54C. If so, that item of information is transferred for use by the requesting processor. If not, the control unit 52A, 52B, 52C transmits the access-request signal to said memory management element along lines 48A, 48B and 48C.

In an effort to satisfy a pending information access request, the memory management element broadcasts an access-request signal received from the requesting central processing unit to the memory elements associated with the other central processing units. By way of a cell interface unit, described below, the memory management element effects comparison of the SA of an access request signal with the descriptors stored in the directories 56A, 56B and 56C of each of the memory elements to determine whether the requested signal is stored in any of those elements. If so, the requested signal, or a copy thereof, is transferred via the memory management element 46 to the memory element associated with the requesting central processing unit. If the requested information signal is not found among the memory elements 42A, 42B and 42C, the operating system can effect a search among the system's peripheral devices (not shown) in a manner described below.

Within the illustrated multiprocessor system, data coherency is maintained through action of the memory management element on memory stores 54A, 54B and 54C and their associated directories 56A, 56B and 56C. More particularly, following generation of an ownership-access request by a first CPU/memory pair (e.g., CPU 40C and its associated memory element 42C), the memory management element 46 effects allocation of space to hold the requested data in the store of the memory element of that pair (e.g., data store 54C of memory element 42C). Concurrent with the transfer of the requested information-representative signal from the memory element in which it was previously stored (e.g., memory element 42A), the memory management element deallocates that physical storage space which had been previously allocated for storage of the requested signal.

Figure 2B:
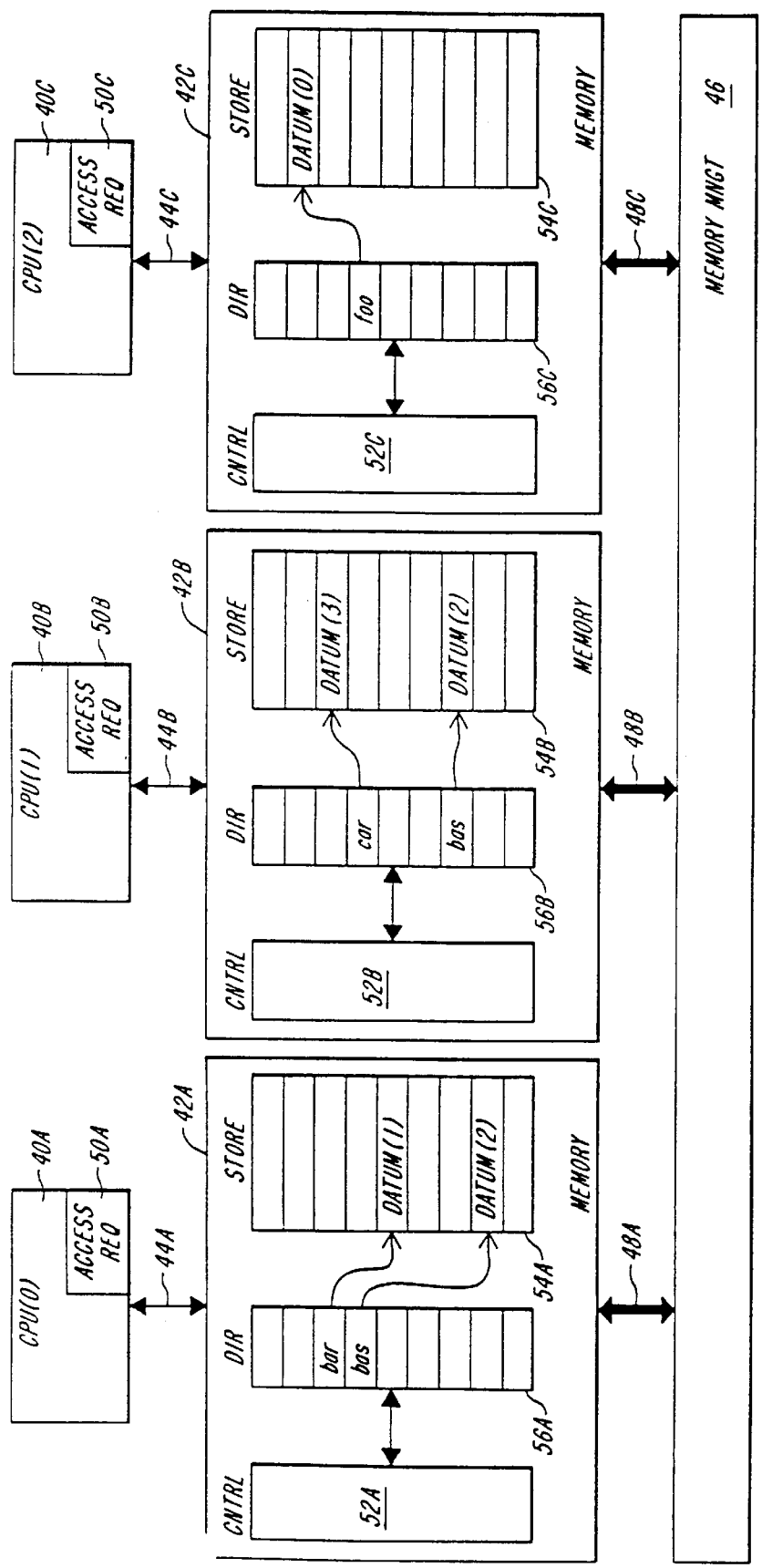

The aforementioned actions of the memory management element and, more particularly, the data coherence element are illustrated in FIGS. 2A and 2B. In the first of those drawings, information signals DATUM(0), DATUM(1) and DATUM(2) are stored in the data store of the memory element 42A partnered with CPU 40A. Descriptors "foo," "bar" and "bas" which correspond, respectively, to those data signals are stored in directory 56A. Each such descriptor includes a pointer indicating the location of its associated information signal in the store 42A.

In the memory element 42B partnered to CPU 40B, the illustrated system stores information signals DATUM(3) and DATUM(2). Corresponding to each of those data elements are descriptors "car" and "bas," retained in directory 56B. DATUM(2), and its descriptor "bas," are copied from store 42A and, therefore, retain the same labels.

The system illustrated in FIG. 2A does not store any data in the memory element 54C partnered to CPU 40C.

FIG. 2B illustrates actions effected by the memory management system 46A following issuance of an ownership-access request by one of the central processing units. In particular, the illustration depicts the movement of information signal DATUM(0) following issuance of an ownership-access request for that signal by CPU 40C. At the outset, in response to the request signal, the memory management element 46 allocates physical storage space in the store 54C of the memory element partnered with CPU 40C. The memory management element 46 also moves the requested information signal DATUM(0) from store 54A, where it had previously been stored, to the requestor's store 54C, while concurrently deallocating that space in store 54A which had previously held the requested signal. Along with moving the requested information signal, the memory management element 46 also effects invalidation of the descriptor "foo" in directory 56A, where it had previously been used to identify DATUM(0) in store 54A, and reallocation of that same descriptor in directory 56C, where it will subsequently be used to identify the signal in store 54C.

In the preferred embodiment, the memory management element 46 includes a mechanism for assigning access state information to the data and control signals stored in the memory elements 42A, 42B and 42C. These access states, which include the invalid, read-only, owner and atomic states, govern the manner in which data may be accessed by specific processors. A datum which is stored in a memory element whose associated CPU maintains priority access over that datum is assigned an ownership state. While, a datum which is stored in a memory element whose associated CPU does not maintain priority access over that datum is assigned a read-only state. Further, a purported datum which associated with "bad" data is assigned the invalid state.

Figure 3:
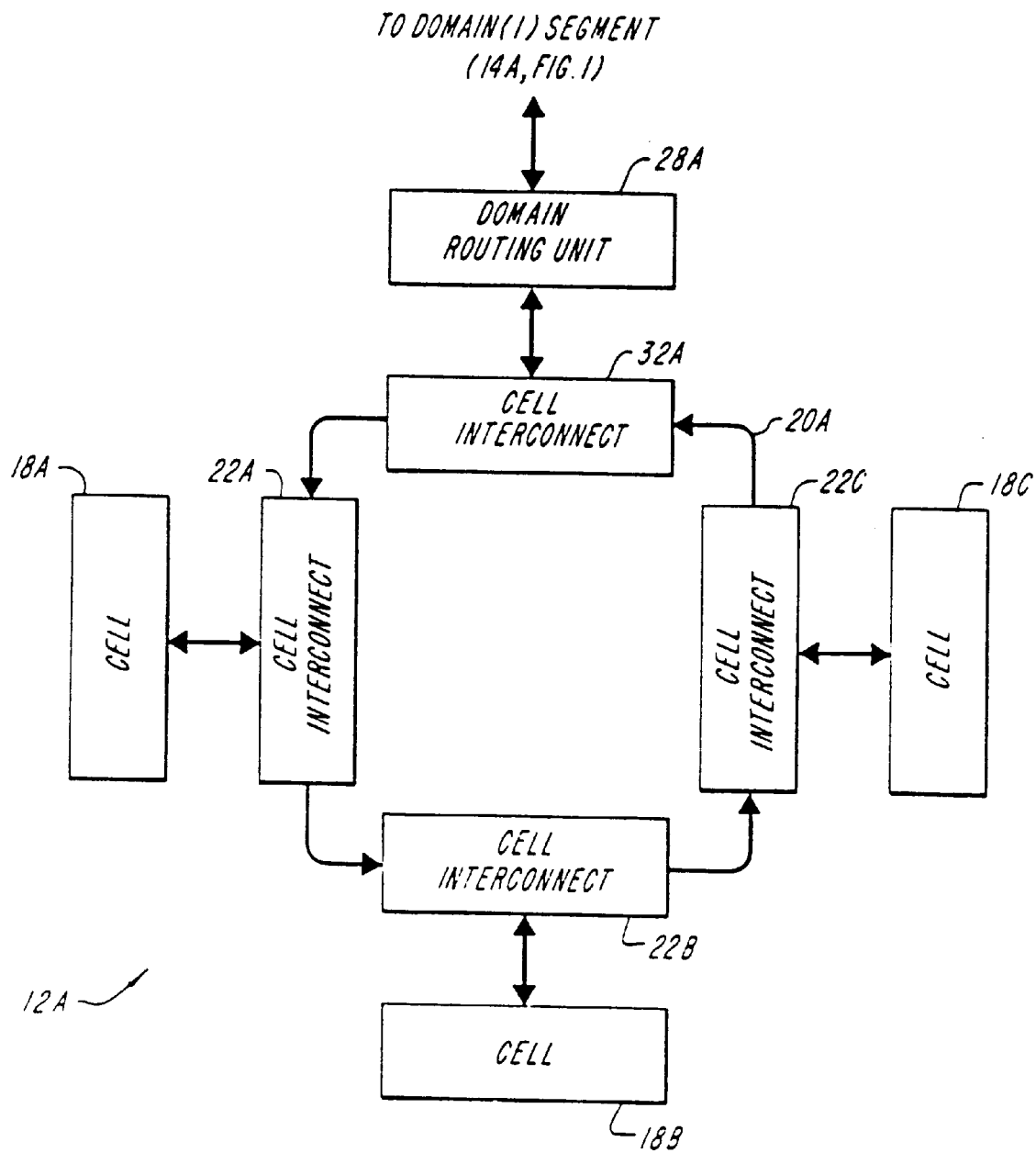
FIG. 3 depicts a preferred interconnect structure of processing cells within a domain(0) segment in a digital data processing system constructed according to a preferred embodiment of the invention.

FIG. 3 depicts a preferred configuration for exemplary domain(0) segment 12A of FIG. 1. The segment 12A includes processing cells 18A, 18B and 18C interconnected by cell interconnects 22A, 22B and 22c along bus segment 20A. Domain routing unit 28A provides an interconnection between the domain(0) segment 12A and if parent, domain (1) segment 14a of FIG. 1. This routing unit 28A is coupled along bus 20A by way of cell interconnect 32A, as shown. The structure of illustrated bus segment 20A, as well as its interrelationship with cell interconnects 22A, 22B, 22C and 32A is more fully discussed in commonly assigned, U.S. patent application Ser. No. 136,701, filed Dec. 22, 1987, abandoned Apr. 13, 1990, in favor of U.S. patent application Ser. No. 509,480, filed Apr. 13, 1990, abandoned May 13, 1991, in favor of U.S. patent application Ser. No. 696,291, filed Apr. 26, 1991 (now U.S. Pat. No. 5,119,481, issued Jun. 2, 1992 and incorporated herein by reference. Further description of a preferred cell interconnect structure is provided in Appendix A, filed herewith.

Figure 4:
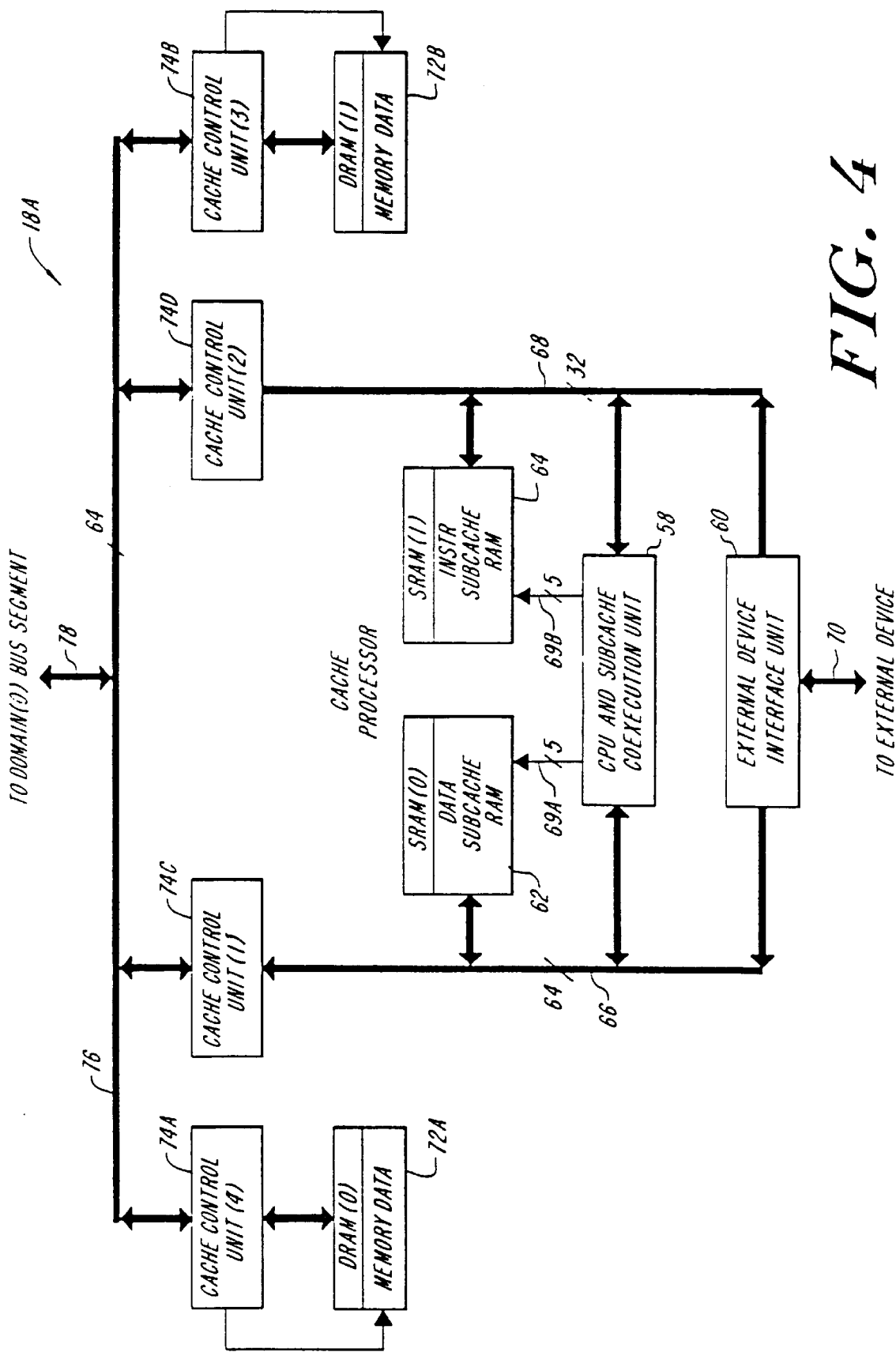
FIG. 4 depicts a construction of an exemplary processing cell in a digital data processing system constructed according to a preferred embodiment of the invention.

FIG. 4 depicts a preferred structure for processing cells 18A, 18B . . . 18R. The illustrated processing cell 18A includes a central processing unit 58 coupled with external device interface 60, data subcache 62 and instruction subcache 64 over processor bus 66 and instruction bus 68, respectively. Interface 60, which provides communications with external devices, e.g., disk drives, over external device bus, is constructed in a manner conventional to the art.

Processor 58 can comprise any one of several commercially available processors, for example, the Motorola 68000 CPU, adapted to interface subcaches 62 and 64, under control of a subcache co-execution unit acting through data and address control lines 69A and 69B, in a manner conventional to the art, and further adapted to execute memory instructions as described below. Schematics for a preferred central processing unit are provided in Appendix B, filed herewith. A description of a preferred processor interface is provided in Appendix C, filed herewith.

Processing cell 18A further includes data memory units 72A and 72B coupled, via cache control units 74A and 74B, to cache bus 76. Cache control units 74C and 74D, in turn, provide coupling between cache bus 76 and processing and data buses 66 and 68. As indicated in the drawing, bus 78 provides an interconnection between cache bus 76 and the domain(0) bus segment 20A associated with illustrated cell. A preferred construction for cache control units 74A, 74B, 74C and 74D is provided in Appendix D, filed herewith.

In a preferred embodiment, data caches 72A and 72B dynamic random access memory devices, each capable of storing up to 8 Mbytes of data. The subcaches 62 and 64 are static random access memory devices, the former capable of storing up to 512 k bytes of data, the latter of up to 256 k bytes of instruction information. As illustrated, cache and processor buses 76 and 64 provide 64-bit transmission pathways, while instruction bus 68 provides a 32-bit transmission pathway. A preferred construction of cache bus 76 is provided in Appendix E, filed herewith.

Those skilled in the art will understand that illustrated CPU 58 represents a conventional central processing unit and, more generally, any device capable of issuing memory requests, e.g., an i/o controller or other special purpose processing element.

The Memory Management System

A multiprocessing system 10 constructed in accord with a preferred embodiment of the invention permits access to individual data elements stored within processing cells 18A, 18B, . . . 18R by reference to a unique system virtual address (SVA) associated with each datum. Implementation of this capability is provided by the combined actions of the memory management system 46, the subcaches 62, 64 and the caches 72A, 72B. In this regard, it will be appreciated that the memory management system 46 includes cache control units 74A, 74B, 74C and 74D, with their related interface circuitry. It will further be appreciated that the aforementioned elements are collectively referred to as the "memory system."

A complete understanding of the structure and operation of the memory system may be attained through recognition of its architectural features, enumerated below:

Data Storage—The memory in each cache is divided into pages, each of which may be dynamically assigned to some page of SVA space. The memory system maintains usage and status information about the data in each cache to facilitate efficient migration to and from secondary storage.

Data Locality—The memory system keeps data recently referenced by a processor in the subcache or cache in the same cell of that processor.

Data Movement—The memory system moves data to the cache of the processor referencing it.

Data Sharing—The memory system keeps copies of SVA data in more than one cache to facilitate efficient data sharing by parallel programs.

Data Coherence—The memory system implements the strongly ordered coherent memory model and the transaction model.

With regard to the last point, those skilled in the art will appreciate that a system is "sequentially consistent" if the result of any execution is the same as if the operations of all the processors were executed in some sequential order, and the operations of each individual processor appear in this sequence in the order specified by its program.

Moreover, storage accesses are considered "strongly ordered" if accesses to data by any one processor are initiated, issued and performed in program order and; if at the time when a store by processor I is observed by processor K, all accesses to data performed with respect to I before the issuing of the store must be performed with respect to K. By contrast, storage accesses are weakly ordered if accesses to synchronizing variables are strongly ordered and; if no access to synchronizing variable is issued in a processor before all previous data accesses have been performed and; if no access to data is issued by a processor before a previous access to a synchronizing variable has been performed.

A coherent system with strong ordering of events is sequentially consistent.

In the illustrated embodiment, the memory system stores data in units of pages and subpages, with each page containing 4 k bytes and each subpage containing 64 bytes. The memory system allocates storage in the caches 74A, 74B on a page basis. Each page of SVA space is either entirely represented in the system or not represented at all. The memory system shares data between caches in units of subpages. In the description which follows, the term "caches" refers to the cache storage elements 74A, 74B of the respective processing cells.

The organization of SVA space within the illustrated system is a major departure from ordinary virtual memory schemes. Conventional architectures include a software controlled page-level translation mechanism that maps system addresses to physical memory addressor generates missing page exceptions. In these schemes, the software is responsible for multiplexing the page table(s) among all the segments in use. In the architecture of the illustrated system, there is no software controlled page-level translation mechanism. The memory system can handle a significant portion of the address space management normally performed by software in conventional architectures. These management responsibilities include:

(1) maintaining page usage and status information,
(2) reusing old pages,
(3) synchronizing and ensuring coherence of shared data access amongst multiple processors, and
(4) migrating data and copies of data on a subpage basis from place to place in the system to keep data nearest to the processors that are using it most frequently.

The illustrated system's processors, e.g., processors 40A, 40B, 40C, communicate with the memory system via two primary logical interfaces. The first is the data access interface, which is implemented by the load and store instructions. In data access mode, the processor presents the memory system with an SVA and access mode information, and the memory system attempts to satisfy that access by finding the subpage containing the data and returning it.

The second logical interface mode is control access, which is implemented by memory system control instructions. In control access, the processor instructs the memory system to perform some side effect or return some information other than the actual data from a page. In addition to the primary interfaces, system software uses control locations in SPA space for configuration, maintenance, fault recovery, and diagnosis.

Cache Structure

The caches, e.g., elements 72A, 72B of cell 18A, stores information in units of pages, i.e., 4096 bytes. Each page of SVA space is either entirely present in the caches or not present at all. Each individual cache, e.g., the combination of elements 72A and 72B of cell 18A, allocates space for data on a page by page basis. Each cache stores data on a subpage by subpage basis. Therefore, when a page of SVA space is resident in the system, the following are true:

(1) One or more caches allocates a page of storage to the page, each subpage of the page is stored on one or more of the caches with space allocated, but
(2) Each cache with space allocated for a page may or may not contain a copy of all of the page's subpages.

The associations between cache pages and SVA pages are recorded by each cache in its cache directory, e.g., element 56A. Each cache directory is made up of descriptors. There is one descriptor for each page of memory in a cache. At a particular time, each descriptor is either valid or invalid. If a descriptor is valid, then the corresponding cache memory page is associated with a page of SVA space, and the descriptor records the associated SVA page address and state information. If a descriptor is invalid, then the corresponding cache memory page is not in use.

Each cache directory 46A acts as a content-addressable memory. This permits a cache to locate a descriptor for a particular page of SVA space without an iterative search through all of its descriptors. Each cache directory is implemented as a 32 way set-associative memory with 128 sets. All of the pages of SVA space are divided into 128 equivalence classes. A descriptor for a page can only be stored in the set of a cache directory that corresponds to the page's equivalence class. The equivalence class is selected by SVA[18:12]. At any given time, a cache can store no more than 32 pages with the same value for SVA[18:12], since that are 32 elements in each set.

Figure 5:
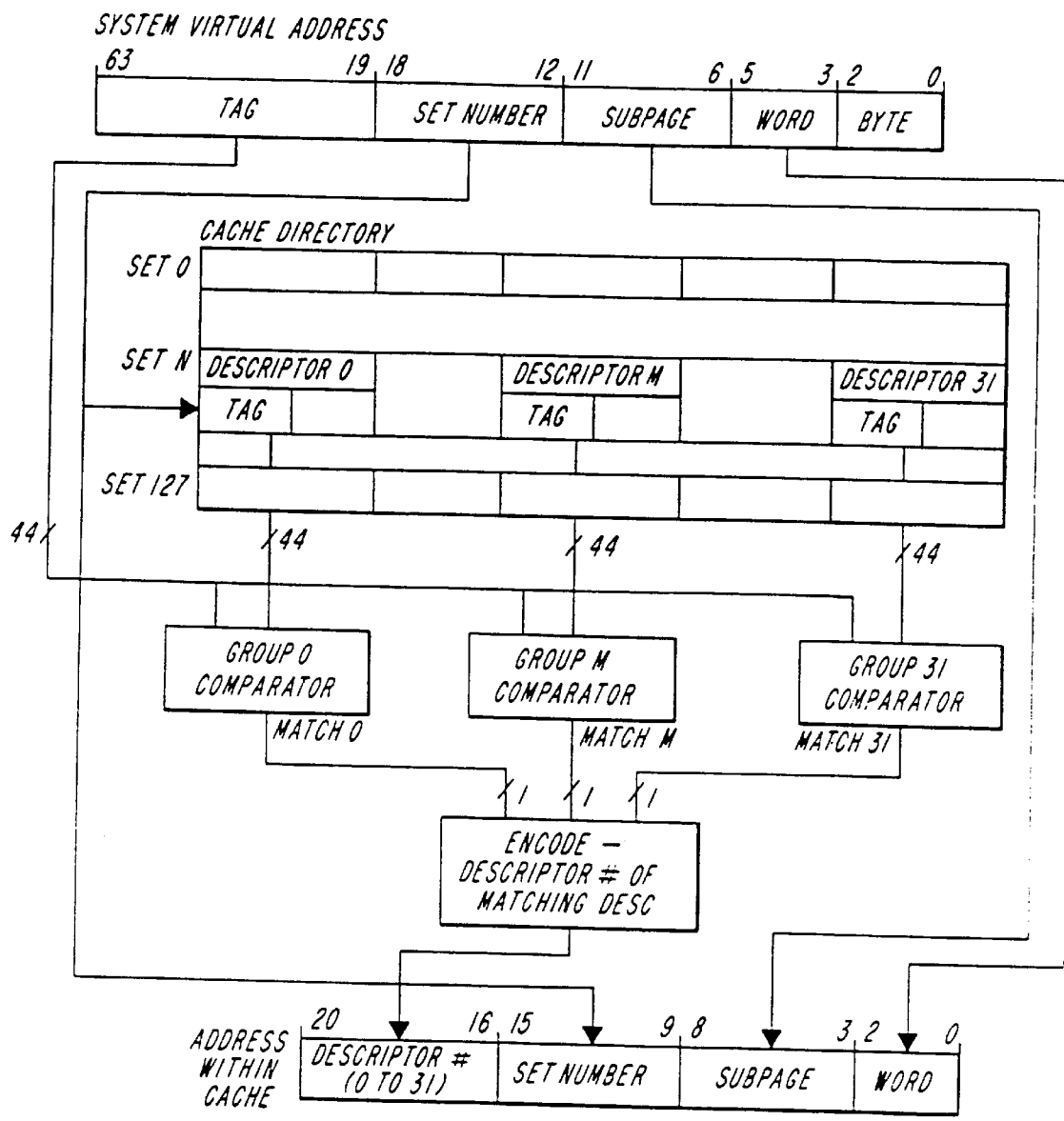
FIG. 5 depicts a preferred interrelationship between system virtual addresses, descriptors, and cache directories in a digital data processing system constructed according to a preferred embodiment of the invention.

The organization of the cache directory is shown in FIG. 5. SVA[18:12] selects a set. Each of the descriptors in the selected set is simultaneously compared against SVA [63:19]. If one of the elements of the set is a descriptor for the desired page, the corresponding comparator will indicate a match. The index in the set of the matching descriptor, concatenated with the set number, identifies a page in the cache. If no descriptor in the set matches, the cache signals a missing_page exception. If more than one descriptor matches, the cache signals a multiple_descriptor_match exception.

Preferably, SVA[18:12] is used as a hash function over SVA addresses to select a set. System software assigns SVA addresses so that this hash function gives good performance in common cases. Two important distribution cases are produced by referencing many pages of a single segment and by referencing the first page of many segments. The use of SVA[18:12] to select a cache set produces good cache behavior for contiguous groups of pages, since 128 contiguous pages can all reside in a set. However, this key produces poor hashing behavior for many pages with the same value in that field. System software avoids this situation by applying a hash function when allocating SVA space to context segments.

According to a preferred practice, descriptors contain the following fields, the bit-size of each of which is indicated in parentheses:

descriptor.valid (1)
    A cache sets this bit flag to one to allocate the corresponding page of cache memory to a page of SVA space, and zero otherwise. If descriptor.valid is zero, then none of the other fields are meaningful.

descriptor.tag (45)
    Bits [63:19] of an SVA. System software sets this field to identify the particular page of SVA space specified by corresponding descriptor.

descriptor.modified (1)
    A cache sets this bit flag to one when any data is modified in the page. System software sets descriptor.modified to zero to acknowledge the modification of the page.

descriptor.atomic_modified (1)
    A cache sets this bit flag to one when any subpage of this page undergoes a transition into or out of atomic state. System software sets descriptor.atomic_modified to zero to acknowledge the change in atomic state.

descriptor.held (1)
    Software sets the bit flag to indicate that the descriptor may not be invalidated by the cache even if no subpages are present in the cache.

descriptor.LRU_position (5)
    The cache maintains this field as the current position of the descriptor in its set from Most Recently Used (0) to Least Recently Used (31).

descriptor.LRU_insert_index (2)
    Software sets this field to bias the treatment of the page by the cache's LRU maintenance.

descriptor.no_write (1)
    A flag. Software sets this field to prevent modifications to the page by the local processor. An attempt to modify the page fails, and is signalled back to the processor. The processor signals a page_no_write exception.

descriptor.no_atomic (1)

A flag. Software sets this field to prevent any cache from acquiring atomic or pending atomic state on any subpage of this page. An attempt to acquire an atomic state fails, and is signalled back to the processor. The processor signals a page_no_atomic exception.

descriptor.no_owner (1)

Descriptor.no_owner prevents this cache from acquiring ownership of this page. Any attempt to acquire ownership fails, and is signalled back to the processor. The processor signals a page_no_owner exception.

descriptor.owner_limit (2)

Descriptor.owner_limit limits ownership to subpages of the page to a particular cache, domain(0), or domain1 in the domain hierarchy descriptor.subcache (1)

Set by cache to record that the corresponding subpage is subcached in the processor on the cache's cell.

descriptor.subpage_state (3)

The subpage state field is set by the cache to record the state of each subpage.

descriptor.summary (2)

Summarizes subpage state field corresponding to four consecutive subpages.

If descriptor.no_write is set, write accesses to the page result in a page_no_write exception. System software can trap page reads by keeping a table of pages to be trapped, and refusing to create an SVA page for them. Then, it can translate missing_page exceptions into software generated page_no_read exceptions.

Descriptor.no_write can be used to implement an copy-on-access scheme, which in turn can be used as an approximation of 'copy-on-write.' When a process forks, the pages of the forking process's address space are set to take page_no_write exceptions. The child process's address space segments are left sparse. When the child process references a page that has not yet been written by the parent, the page fault is satisfied by making a copy of the corresponding page of the parent process, and the descriptor.no_write is cleared for that page. If the parent writes a page before the child has copied it, the page_no_write handler copies the page into the child address space and then clears descriptor.no_write.

If the descriptor.held is 1 in a descriptor, then the descriptor's cache is prevented from invalidating it. When the first subpage arrives after the subpages of a page with a held descriptor became invalid, all of the field of the descriptor except descriptor.tag, descriptor.held, descriptor.LRU_insert_index and descriptor.LRU_insert_priority are reinitialized as if the descriptor had not existed when the subpage arrived. Descriptor.held is not propagated from one cache to another.

Descriptor.owner_limit limits ownership of subpages of the page to a particular cache or domain(0) in the system bus hierarchy. The following list shows the values of descriptor.owner_limit, and the semantics from the point of view of an owning cache responding to requests from other caches.

(1) Cache_owner_limit—the local cache will not relinquish ownership to any other cache. If another cache requests ownership, it receives an error response.

(2) Domain0_owner_limit—the local cache will not relinquish ownership to any cache that is not in the same domain(0).

(3) Domain1_owner_limit—the local cache will not relinquish ownership to any cache that is not in the same domain1.

(4) Default_owner_limit—any cache may be the owner of the subpages of the page.

Descriptor.owner_limit is propagated to other caches as follows: so long as all of the subpages of a descriptor are read-only copies, descriptor.owner_limit is always Default_owner_limit. When a new cache becomes the owner of a subpage, it copies the value of descriptor.owner_limit from the old owner.

If descriptor.no_owner is 1 in a descriptor, then the descriptor's cache cannot acquire an ownership state for any subpages of the page described by the descriptor. A cache containing a descriptor with descriptor.no_owner of 1 never responds to requests from other caches except to indicate that it is holding the copy. Descriptor.no_owner is not propagated from one cache to another.

If descriptor.no_atomic is 1 in a descriptor, then the descriptors cache cannot acquire atomic or pending atomic ownership states for any subpages of the page described by the descriptor. A processor attempt to set atomic or pending atomic ownership state fails, and is signalled back to the processor. The processor signals a page_no_atomic exception. Descriptor.no_atomic is propagated from one cache to another.

Descriptor.summary summarizes subpage state field corresponding to four consecutive subpages. There is one two-bit field for each of the 12 sets of four subpages represented by the descriptor. The following is a list of summary states:

all invalid—subpage state of all four subpages are invalid.

all exclusive—subpage state of all four subpages are exclusive owner.

no owner—subpage state of all four subpages are either invalid or read only.

owner—one or more subpages are either atomic owner, exclusive owner or nonexclusive owner states. If all four subpages are exclusive owner state, all exclusive summary should be used.

The illustrated memory elements, e.g., 42A, 42B, 42C, detect errors, for example, while executing a synchronous request from its local processor. The element signals the error in its response to the request. The local processor then signals a corresponding exception. When a memory element detects an error while executing a request from a remote cell, it sends an interrupt to its local processor and responds to the request with an error reply. In the descriptions that follow, the expression "the cache signals an exception" is an abbreviation for this process.

Each memory includes a Cache Activity Descriptor Table (CADT) (not shown), in which it maintains the status of ongoing activities. When a memory element detects an error in responding to a request from its domain(0) or in executing an asynchronous control instruction or a remote control instruction, it notes the error in a descriptor in the CADT before sending an interrupt. Software reads the CADT to identify the particular source and type of error. Software resets the CADT to acknowledge receipt of the error.

Subpages and Data Sharing

When a page is resident in the memory system, each of its subpages is resident in one or more of the caches. When a subpage is resident in a cache, the descriptor in that cache for the page containing that subpage records the presence of that subpage in one of several states. The state of the subpage in a cache determines two things:

1) What operations that cache's local processor may perform on the data present in the subpage; and 2) What responses, if any, that cache makes to requests for that subpage received over the domains from other caches.

The states of subpages in caches change over time as user programs request operations that require particular states. A set of transition rules specify the changes in subpage states that result from processor requests and inter-cache domain communications.

In order for a processor to complete a load or store, two conditions must be satisfied:
1) The subpage containing the data must be present in its local cache.
2) The local cache must hold the subpage in the appropriate state. The state determines whether the subpage can be modified and how the local cache responds to requests from other caches.

If either of these conditions is not satisfied, the processor's local cache communicates over the domains to acquire a copy of the subpage and/or to acquire the necessary state for the subpage. If the cache fails to satisfy the request, it returns an error indication to the processor, which signals an appropriate exception.

The instruction set includes several different forms of loan and store instructions that permit programs to request subpage states appropriate to the expected future data reference pattern of the current thread of control, as well as protocol between different threads of control in a parallel application.

In the text which follows there is first described the states and their transitions in terms of processor instructions and their effect on caches. This is followed by a description of the domain messages that are sent between the caches to implement those state transactions.

Subpage States

The subpage states and their transition rules provide two general mechanisms to user programs executing on the illustrated system:
1) They transparently implement the strongly ordered sequentially consistent model of memory access for ordinary load and store accesses by the processors of the system.
2) They provide a set of transaction primitives that are used by programs to synchronize parallel computations. These primitives can be applied to a variety of traditional and non-traditional synchronization mechanisms.

The states and their transitions are described in three groups. The first group are the basic states and transitions that implement the strongly ordered, sequentially consistent model of memory access. Second are the additional states that implement the transaction primitives. Finally, the transient states, which improve the performance of the memory system, are presented.

The processor subcaching system is divided into two sides: data and instruction. The data subcache 62 is organized in 64 bit words, like the cache. The instruction subcache 64 is organized into 32 bit half-words, since there re two 32 bit instructions in each 64 bit memory word. The data subcache stores 0.5 Mbyte, and the instruction subcache 0.25 Mbyte. Since the items in the instruction subcache are half-words, the two subcaches store the same number of items. The two sides of the subcache are similar in structure to the cache.

Subcache Data Units

Subcache descriptors do not describe entire pages of SVA space. They describe different units, called blocks. The size of a block is different on the two sides of the subcache. On the data side, blocks are the half the size of pages. On the instruction side, they are one quarter as large as pages. On both sides, each block is divided into 32 subblocks. The following table shows the relative sizes of blocks, subblocks and other items in the two subcaches.

| Comparison of Instruction and Data Subcaches | | | | | |
|---|---|---|---|---|---|
| | total size | item size | subblocks/ block | bytes/ block | subblock size |
| Data | .50Mbyte | 64 bits | 32 | 2.0K | 64 bytes |
| Instruction | .25Mbyte | 32 bits | 32 | 1.0K | 32 bytes |

In the same way that the cache allocates a page of memory but copies data one subpage at a time, the subcache allocates pages and copies data one subblock at a time.

Subcache Organization

The subcaches 62, 64 are organized similarly to the caches. Where the caches are 32-way set associative (each set contains 32 descriptors), the subcaches are 4 way set-associative. For the data side, the set number is bits [16:11] of the SVA, and the tag bits [63:17]. For the instruction side, the set number is bits [15:10], and the tag is bits [63:16]. The data subcaches maintain modification information for each subblock.

Subcache Block Replacement

The subcaches implement a simple approximation of the cache LRU scheme. Within a set, each subcache maintains the identity of the most recently referenced descriptor. When a descriptor is needed, one of the three descriptors that is not the most recently referenced descriptor is selected at random for replacement.

Subcache Block Writeback

The data subcaches write modified subblocks to their caches as described above in the section entitled 'Updates from the Subcache to the Cache.'

Basic States and Transitions

The basic model of data sharing is defined in terms of three classes of subpage states: invalid, read-only, and owner. These three classes are ordered in strength according to the access that they permit; invalid states permit no access, read-only states permit load access, and owner states permit load and store access. Only one cache may hold a particular subpage in an owner state at any given time. The cache that holds a subpage in an owner state is called the owner of the subpage. Ownership of each subpage moves from cache to cache as processors request ownership via store instructions and special load instructions that request ownership. Any number of caches may hold a particular subpage in a read-only state.

Basic States

The sections below describe the state classes and how they interact to implement the strongly ordered, sequentially consistent model of memory access.

Invalid States

When a subpage is not present in a cache, it is said to be in an invalid state with respect to that cache. If a processor requests a load or store to a subpage which is in an invalid state in its local cache, then that cache must request a copy of the subpage in some other state in order to satisfy the data access. There are two invalid states: invalid descriptor and invalid. When a particular cache has no descriptor for a particular page, then all of the subpages of that page are said to be in invalid descriptor state in that cache. Thus, subpages in invalid descriptor state are not explicitly represented. When a particular cache has a descriptor for a particular page, but a particular subpage is not present in that cache, then that subpage is in invalid state. The two invalid states are distinguished because it is much easier for a subpage to undergo a transition to a read-only or owner state from invalid than from invalid descriptor. In the former case, a descriptor is already present. In the latter case, a descriptor must be allocated.

Read-Only States
There is only one read-only state: read-only.
Owner States
There are two basic owner states: non-exclusive and exclusive. When a particular cache holds a particular subpage in non-exclusive state, any number of other caches may simultaneously hold that subpage in read-only state. When a particular cache holds a particular subpage in exclusive state, then no other cache may hold a copy so long as that cache retains exclusive state. When a cache holds a subpage in non-exclusive state, and the data in that subpage are modified, then that cache sends the modified data to all of the caches with read-only copies.
Basic State Transitions
The basic state transitions can be illustrated by considering a subpage in exclusive state on a particular cache. The basic mechanism by which data moves from this first cache to other caches is the execution of load and store instructions by processors other than the local processor of that first cache. The different load and store instructions, as well as the prefetch instructions, permit programs to request that their local cache acquired read-only, non-exclusive, or exclusive state. If another cache requests read-only state, then the first cache reduces its state from exclusive to non-exclusive and grants read-only state to the requestor. If another cache requests non-exclusive state, then the first cache reduces its state to read-only and grants non-exclusive state to the requestor. If another cache requests exclusive state, then the first cache reduces its state to invalid and grants exclusive state to the requestor.

Ownership moves from cache to cache as processors request exclusive and non-exclusive states. When a cache requests non-exclusive ownership, any read-only copies are invalidated (undergo a transition to an invalid state).

When a cache acquires ownership of a subpage in order to satisfy a store instruction, it does not grant that ownership to another cache until the store instruction is complete. In the case of non-exclusive state, a cache does not grant ownership to another cache until the new data from the store is sent to the caches with read-only copies. This rule provides the strongly ordered nature of the memory system, in that it ensures readers of a memory location to see modifications in the order that they are made.

When a particular subpage is in invalid state in a particular cache (i.e., a descriptor is already allocated, but the particular subpage is not present), and a copy of that subpage is available on the domain interconnection due to a request from some other cache, and at least one other cache in that cache's local domain(0) has copy, that cache will acquire a read-only copy of the subpage. The effect of this mechanism is to accelerate parallel computations, since it can remove the latency associated with requesting a copy of a subpage from another cache.

When a non-exclusive owner modifies a subpage, it must send the modified data over the domains to any read-only copies. This permits very fast propagation of data from a producer to a consumer. However, it consumes domain bandwidth. Therefore, the memory system includes two mechanisms for avoiding unnecessary non-exclusive owner states. First, when a non-exclusive owner sends an update out over the domains, it receives a return receipt that includes whether any other caches actually hold read-only copies. If the receipt indicates that there are no read-only copies, then the owner changes the subpage's state from non-exclusive to exclusive, avoiding future updates. Second, when a cache receives an update for a subpage that it holds in read-only state, its action depends on whether that subpage is currently resident in the CPU's subcache.

If the subpage is not subcached, then the cache invalidates it. If the subpage is cached, then the cache removes it from the subcache. The effect of these actions is as follows: So long as a subpage is not modified, read-only copies of it propagate throughout the memory system. When a subpage is modified, each read-only copy persists only if that copy is referenced at least as frequently as the subpage is modified.
Basic State Transition Transparency
It is important to note that the basic mechanisms provide the strongly ordered memory access model to programs that use simple load and store instructions. Programs may use the forms of the load, store, and prefetch instructions that request particular states in order to improve their performance, and it is expected that in many cases compilers will perform the necessary analysis. However, this analysis is optional.
Synchronization States and Transitions
The synchronization states and related transitions implement the KSR transaction model. The transaction model is a primitive synchronization mechanism that can be used to implement a wide variety of synchronization protocols between programs. All of these protocols share the purpose of imposing an orderly structure in time on accesses to shared data.

The transaction model is based on two states, atomic and pending atomic, a set of instructions that explicitly request transitions to and from these states, and forms of the load and store instructions whose semantics are dependent on whether the subpage that they reference is currently in atomic state.
Atomic State and Transactions
The atomic state is the central feature of the transaction model. Atomic state is a stronger form of ownership than exclusive state. Subpage only enter and leave atomic state as a result of explicit requests by programs.

Fundamentally, atomic state can be used to single-thread access to any subpage in SVA space. When a processor executes an instruction that requests that a subpage enter atomic state, the instruction will only complete normally if the subpage is not in atomic state already. Thus, atomic state on a subpage can be used as a simple lock. The lock is locked by taking the subpage atomic, and unlocked by releasing it to exclusive.

A program requests that a subpage enter atomic state with one of the forms of the get instruction, an d releases it with the rsp instruction. These instructions are described in more detail below.

A sequence of get, manipulate some protected information, and rsp is the simplest form of transaction. The following sections present more complex features of the transaction mechanism that permit the implementation of more sophisticated protocols. These protocols provide high performance for particular parallel programming applications.
Integrating Data and Synchronization
In simple transactions, a subpage is used purely as a lock. The data in the subpage is not relevant. Some of the more sophisticated forms of synchronization mechanisms make use of the data in a subpage held in atomic state. The simplest case is to use atomic state on a subpage as a lock on the data in that subpage. Programs take one or more subpages into atomic state, manipulate their contents, and release them.
Producers and Consumers—Blocking and Non-Blocking Load Instructions
In the transactions described above, access to the protected data is strictly single-threaded. However, there are important applications where one program produces a value and many consume it, and that the consumers need not see a consistent view of more than one full KSR word of data. In such a case, it is undesirable for each of the consumers to serially hold the subpage containing the data in atomic state, one after the other. The consumers must wait for the producer to release atomic state, but they can all read the result simultaneously.

Applications like this can be implemented using the blocking and non-blocking forms of load instructions. Non-blocking load instructions access the data in a subpage regardless of whether or not that subpage is in atomic state. These are used by ordinary programs and by the single-threaded transactions described above. Blocking load instructions only proceed normally if the subpage is not in atomic state. If the subpage referenced by a blocking load instruction is in atomic state, the instruction blocks until the subpage leaves atomic state. In a producer-consumer relationship, the producer(s) hold the subpage(s) containing the data in atomic state, while the consumers read the data using blocking load instructions.

Passive and Active Atomic State Requests—Pending Atomic State

The get instructions actively request atomic state over the domains. In some applications, a program may have absolute knowledge that a particular subpage is already in atomic state. In this case, sending a request across the domains is pointless. Instead, the program can use the stop instruction to place the subpage in pending atomic state in the local cache, and depend upon another program to expel the subpage using the rspe instruction.

When a subpage is in pending atomic state in a particular cache, this indicates that atomic state is desired in that cache. If a message arrives over the domains in a cache that holds a particular subpage in pending atomic state that indicates that atomic state is available for that subpage, then that cache will take the subpage in atomic state. When a processor executes a stop instruction for a subpage, that subpage is placed in pending atomic state on the local cache. When another processor executes an rspe instruction, a message is sent across the domains indicating that atomic state is available for the subpage. When this message reaches a cache with the subpage in pending atomic state, that cache acquires atomic state.

It is important to note that messages of this kind pass all of the caches in the system in a single, well defined order. Thus, a series of caches can use sequences of the form stop, manipulate, rspe, to pass a synchronization token to each of themselves in turn.

Transient States and Transitions

The transitive states are used automatically by the memory system to improve the performance of accesses to subpages in case of contention. There are three transient states: transient atomic, transient exclusive, and transient non-exclusive. These sdtatesd correspond to atomic, exclusive, and non-exclusive states, respectively. A particular subpage enters a transient state in a particular cache when that cache receives a request for the subpage to which it cannot respond immediately. If a subpage is in atomic state and another cache requests that subpage, that subpage enters transient atomic state in the holding cache. When the subpage is later released with an rsp instruction, the transient state forces the subpage to be expelled as if an rspe had been used. If a subpage is in exclusive or non-exclusive state and is subcached, and another cache requests that subpage, that subpage enters the corresponding transient state. When an up-to-date copy of the subpage is available for the subcache, the cache expels the subpage, making it available to the other cache(s).

A subpage enters a transient state on a cache due to a request by a single other cache. However, any number of additional caches may make requests for the same subpage before the holding cache expels it. In this case, the single expulsion satisfies all of the requesting caches with a single message over the domains.

Detailed Transitions Between States

The following is another list of the states. In this list, the most important conditions for entering and leaving the state are described. This list provides a more complete listing of the transitions than the introduction above, but the precise specifications of the state transitions are given in the tables provided in below. Some of the transitions are conditioned by LRU information.

| | |
|---|---|
| invalid descriptor | A subpage enters invalid descriptor state in a cache when the descriptor for its page is deallocated. A subpage leaves invalid state when a descriptor for its page is allocated in the cache. Unless descriptor.held is 1, a descriptor is automatically invalidated when each of its subpages is implicitly in invalid descriptor state. |
| invalid | A subpage enters invalid state in a cache when another cache acquires exclusive or atomic state. A subpage leaves invalid state in a cache when that cache acquires a copy of the subpage in any state. A cache will acquire a copy of a subpage to satisfy a request from its local processor, in response to a data movement control instruction (see below) or when a copy is available over the domains due to communication between other caches. |
| read-only | A subpage enters read-only state in a cache from an invalid state when that cache requests a read-only copy, or when a copy is available over the domains due to communication between other caches and at least one other cache in the same domain(0) has a copy of the subpage. A subpage enters read-only state from non-exclusive or exclusive state when another cache requests non-exclusive state. A subpage leaves read-only state when another cache requests exclusive or atomic state, or when the cache acquires an owner state. When the nonexclusive owner of a subpage modifies that subpage, the owner sends the new data over the domains to update any read-only copies. At the time of such an update, if a cache has a subpage in read-only state and that subpage is in use by the cache's local processor, then the cache updates the copy and replies to the update to indicate that it has a copy. A subpage is defined to be in use in a processor when it is resident in the processor's subcache. If a cache has a subpage in read-only state and the subpage is not in use, then that cache invalidates the subpage and does not respond to the update. |
| nonexclusive owner | A subpage enters non-exclusive state in a cache when that cache requests ownership and some other cache has a read-only copy. A subpage leaves non-exclusive state as follows: When a cache has a copy in non-exclusive state and another cache requests non-exclusive state, the holding cache responds to the request and changes its |

| | |
|---|---|
| | state to read-only, giving the non-exclusive state to the requesting cache. When a cache has a copy in non-exclusive state and another cache requests exclusive or atomic state, the holding cache responds to the request and invalidates its copy. When a cache holding a subpage in non-exclusive state receives an update from its local processor, it sends the new data to the other caches. If no other cache indicates that it is holding a copy, the holding cache changes the subpage's state to exclusive. |
| exclusive owner | A subpage enters exclusive state in a cache when that cache requests ownership and no other cache has a read-only copy, or when that cache explicitly requests exclusive state. A subpage leaves exclusive state on any request for a copy. The response to requests for different states is as follows: read-only - If the page is below BS High in LRU priority, the holding cache responds granting exclusive state and invalidates its copy. If the page is above BS_High in LRU priority, the holding cache responds granting read-only state and changes its copy's state to non-exclusive. non-exclusive - If the subpage is subcached, the holding cache responds granting non-exclusive state and changes its copy's state to read-only. If the subpage is not subcached, the holding cache responds granting exclusive state and invalidates its copy. exclusive or atomic - The holding cache responds to the request and invalidates its copy. |
| atomic | A subpage enters atomic state in a cache in one of two ways. First, if the local processor executes a get instruction, and the subpage is not in atomic state, then the local cache of the requesting processor will acquire the subpage in atomic state. Second, if a cache holds a subpage in pending atomic state, and the subpage is expelled from another cache holding it in atomic state, then that first cache will acquire atomic state. A subpage leaves atomic state in a cache only when it is released by explicit request from the cache's local processor. |
| pending atomic | A subpage enters pending atomic state via the stop instruction. A subpage leaves pending atomic state in two ways. If a subpage is in pending atomic state in a cache, and the local processor executes an rsp instruction, then the subpage leaves pending atomic and becomes invalid. If a subpage is in pending atomic state in a cache, and that subpage is made available in atomic state via an expulsion, then that subpage enters atomic state from pending atomic state. |
| transient nonexclusive owner transient exclusive owner transient atomic owner | If a cache holding a subpage in any owner state is unable to immediately respond, the holding cache marks the subpage transient. For example, when a cache holds a subpage in atomic state and another cache requests a copy in any state, the holding cache marks the subpage transient atomic, since a response cannot be issued while in atomic state. Transient state is passed on responses and expulsions. It is cleared only after an expel traverses the domain without being acquired by some other cache. |

Data Copying Strategy

The interaction among states described above is a tradeoff between time and domain bandwidth spent waiting for a copy from another cache and time and bandwidth spent sending updated copies to other caches. When there are many read-only copies of a subpage in the system, then the changes that a read will find the data already in the local cache are increased. However, if there are any read-only copies in the system, then the owner must send out updates when modifying the subpage.

The following heuristics attempt to dynamically detect on a short term basis multiple read/writer sharing from single read/writer access. Multiple read/writer sharing is multiple read-only copies with high temporal locality and write updates with lower temporal locality. Retaining read-only copies is most efficient since multiple copies are read multiple times between updates. Updates take place in a single domain operation. Single read/writer access is multiple read-only copies read-only copies with low temporal locality and write updates with much higher locality. Retaining read-only copies is less efficient since copies are updated multiple times between updates. A single read/write copy (exclusive owner state) does not require a domain operation for write update. Applying these two cases independently to all read-only copies allows transition from non-exclusive ownership with multiple read-only copies to exclusive ownership with no read-only copies. The strategy for balancing these considerations is as follows:

a. When a copy of a subpage is sent across the domains to satisfy a request, any cache that has a descriptor for a page but no copy of the subpage picks up a read-only copy from the message. This mechanism accelerates applications with high locality of reference.

b. When a cache sends an update for a subpage, every other cache with a copy of the subpage in read-only state which is not in use invalidates that copy. If a copy is subcached, it is considered "in use". When a copy is preserved in a processor's subcache, it is removed from the subcache. This slows down the next reference to that subpage from that processor. If it were not removed, the subpage might remain in subcache indefinitely, compelling the owner to send updates. Since interconnect bandwidth limits total system performance, trading latency on one cache for global throughput improves net system performance.

c. The caches periodically remove read-only copies of subpages when the owner is in a different domain(0). This reduces the cost of updates, since intra-domain(0) messages are faster than inter-domain(0) messages.

The Processor Side

The tables shown in FIGS. 6A and 6B provide the precise specification of the action that a cache takes in response to data access requests from its local processor. There is one row of the table for each processor request to the cache. There is a column for each possible state of the subpage in the cache. The entry in the table states the message, if any, sent over the domains by a cache to satisfy the request when the subpage is in the specified state in that cache. The messages are defined below. When an entry includes "→state", the local cache sets the subpage in state state after receiving a successful response to the message.

The Domain Side

Caches send messages over the domains to acquire copies of subpages in particular states. Each message consists of a request type, a descriptor, and the data for a subpage. The tables shown in FIGS. 7, 7A, 7B, 7C, and 7D provide the precise specification of how each cache responds to messages on the domain. The tables are divided into three sections: read operations, write operations, and response operations. Each section includes the definition of the operations. The tables give the state that results when a cache with a subpage in a specified state receives a particular message. In addition to the states, the tables are annotated with the following side effects and modifications:

| | |
|---|---|
| respond | The cache replies to the message with a copy of the subpage. |
| error | The cache signals an exception. |
| working-set | If the LRU priority of the page is lower than BS_High, then the subpage is invalidated in favor of the requestor unless the owner limit prohibits that transition. Otherwise, as shown. |
| subcached? | If the subpage is not subcached, then it is invalidated in favor of the request, unless the other limit prohibits that transition. Otherwise, as shown. |
| owner-limit? | If the value of descriptor.owner_limit is Cache_owner_limit, then error. If it is Domain0_owner_limit and the source request is in a different domain(0), then reject. Otherwise, as specified. |
| update-flush? | If the subpage is subcached, remove it from subcache and respond to indicate that the copy exists. If the subpage is not subcached, invalidate it and do not respond at all. |
| dom0-copy? | If there are other copies in the local domain(0), then if there is already a copy in the cache, retain a read-only copy. If there is no copy in the cache, acquire a copy in read-only state. Otherwise, if there is a copy, invalidate it. |
| no change | No change in state. |

If both update-flush? and dom0-copy? are specified, then either condition is sufficient to retain a copy.

Read Messages

With particular reference to FIG. 7A, read operations are used to acquire the state necessary for a processor operation. Once the subpage has been 'read' into the local cache, the operation can proceed.

Most of the read messages are simply requests for the subpage in a particular state, and are named after the state. For example, read atomic requests atomic state. There are two read messages that have complex semantics: highest read-only and highest nonexclusive. Highest read-only searches the system in order of increasing domain distance, and takes the strongest state available in the nearest cache. If there are any copies in the local domain(0), the copy in the strongest state responds and invalidates itself. Highest nonexclusive has similar semantics, except that caches with subpages in read-only state do not respond. Read one-time copy requests a copy of subpage without changing subpage state.

Write Messages

Referring to FIG. 7B, write operations are used to send modified data out to other caches or to force other caches to give up state.

| | |
|---|---|
| Write Update | is sent by the nonexclusive owner when the subpage is modified. |
| Write Invalidate | is sent by the nonexclusive owner when the nonexclusive owner needs to acquire exclusive state. (To acquire atomic state, a nonexclusive owner uses write invalidate to get exclusive state, and then internally changed the state to atomic before allowing any other cache to request ownership.) |
| Write Exclusive Recombine | is used to expel a subpage that is in transient exclusive state or which has been explicitly expelled by a CPU instruction. It is also sent by a cache with a subpage in exclusive state to find another cache to take responsibility for the subpage on the basis of LRU priority. Once one cache with a descriptor has responded to this message no other cache responds. If the message has not been responded to, and the cache has a descriptor for the page with an LRU_priority of less that WS_Top, the cache sets the state to exclusive owner and responds. This message is used at the end of a transaction to send a subpage to a cache that has requested it during the transaction. This message is also used in LRU maintenance. |
| Write Non-Exclusive Recombine | is used to expel a subpage that is in transient non-exclusive state or which has been explicitly expelled by a CPU instruction. It is also sent by a cache with a subpage in non-exclusive state to find another cache to take responsibility for the subpage on the basis of LRU priority. Once one cache with a descriptor has responded to this message no other cache responds. If the message has not been responded to, and the cache has a descriptor for the page with an LRU_priority of less that WS_Top, the cache sets the state to nonexclusive owner and responds. This message is used to in LRU maintenance. |

Both of the recombine messages are limited by descriptor.owner_limit. When descriptor.owner limit is Domain0_owner_limit, a recombine message is not delivered outside of the originating domain(0). When descriptor.owner_limit is Cache_owner_limit, a recombine message is never sent. Note that the indication "recombine?" indicates the LRU position comparison described above.

Response Messages

With reference to FIGS. 7C and 7D, response messages are sent by caches that respond to read messages. The first table shows the action, if any, taken for a response message by a cache that already holds the subpage in the specified state. The second table shows the action of a cache that is awaiting a response to the specified type of request for the subpage. There are two cases shown in the tables:

1) A response may be detectable as an error. For example, if a cache holds a subpage exclusively and another cache sends an exclusive response, there is an inconsistency, and the holding cache signals an exception.
2) If a cache has a descriptor for the page but no copy of the subpage, it will pick up a copy under some conditions.

Descriptor Movement

When a cache receives a copy of a subpage in invalid descriptor state, it initializes its descriptor by copying most of the fields of the descriptor on the source cache. LRS_position, LRU insert_index, subcache, subpage_state, held and no_owner are never copied. Owner_limit is handled specifically.

Processor Data Accesses and Domain Requests

A processor makes data requests to its local cache to satisfy load and store instructions and co-processor operations. A cache makes requests to its local processor to force the processor to invalidate its copy of a subpage in subcache.

Load and Store Instructions

A processor passes load and store instructions to its local cache as requests when the subpage containing the referenced address is not present in the subcache in the required state. The different types of load and store instructions pass information to the local cache about the access patterns of the following instructions. For example, if the sequence of the instructions is a load followed by a store, and the subpage containing the data item is not yet resident in the local cache, it is more efficient to acquire ownership for the load than to get a read-only copy for the load instruction and then communicate over the domains a second time to acquire ownership for the store instruction.

The different forms of load and store instructions are described below. Each description begins with a brief summary of the semantics of the instruction, and continues with a detailed description of the cache's action.

All of the load instructions described here have two forms: blocking and non-blocking. These forms control the behavior of the load instructions with respect to atomic state. If a processor executes a blocking load instruction that references a subpage in atomic state, that instruction will wait until the subpage leaves atomic state before proceeding. If a processor executes a non-blocking load instruction that references a subpage in atomic state, that instruction will acquire atomic state in the local cache and proceed.

load (default) [ldd/cldd]

The program will continue the current access pattern. If the subpage is already present in the cache, the local cache keeps the subpage in the same state. If it is not already present, the local cache requests the subpage in read-only state. The ldbd/cldbd forms of these instructions will block if the subpage is in atomic state, and wait for it to be released.

load (exclusive) [lde/clde]

The program will write the subpage in the following instruments, and exclusive state is preferable to non-exclusive state. A program would use this when the data was expected to have little sharing, or when a series of writes was upcoming, and it was therefore worth extra work to acquire exclusive state to avoid updating read-only copies.

The local cache requests the subpage in exclusive owner state. This allows the processor to write the subpage without updating read-only copies unless another cache gets a copy of the subpage in read-only state between the load and the store. The ldbe/cldbe forms of these instructions will block if the subpage is in atomic state, and wait for it to be released.

A particular example of the use of load (exclusive) is per-program data such as stacks. Generally, there will be no read-only copies of such data, since the only copy will be the one in use by the program. However, if a program moves from one processor to another, the new processor's local cache will have no copy, and the old processor's local cache will continue to hold the subpage in exclusive state. If the program uses load (default), the local cache acquires the subpage in non-exclusive state, leaving a read-only copy on the cache of the previous processor, and requiring inefficient updates.

Load (exclusive) instructions always load the data into the subcache in the same state that is acquired in the cache.

store (default) [st/cst]

The program is unlikely store into this subpage in the following few instructions. The local cache maintains the existing state on the subpage.

If the subpage is atomic on some other cache, then the local cache acquires atomic state.

Store (default) instructions always load the data into the subcache in exclusive state.

load subpage (default) [ldspd/cldspd]
loan subpage (exclusive) [ldspe/cldspe]

Load subpage is used to load a full subpage of data into processor or co-processor general registers. If the subpage is present in the subcache, it is loaded directly from the subcache. If the subpage is not present in subcache, it is loaded directly from the local cell cache. An option to these instructions specifies whether, in the case that the data are loaded from the cell cache, they are stored in the subcache in addition to the target registers. The ldspbe/cldspbe forms of these instructions will block if the subpage is in atomic state, and wait for it to be released.

The load subpage (default) and load subpage (exclusive) instructions have corresponding semantics to the load (default) and load (exclusive) instructions.

load subpage (one time) [ldspo/cldspo]

Load subpage (one time) is used when the program does not intend to make any further references to the data in the subpage at any time in the near future. This instruction has no effect on the state of the subcache or any of the caches, except in some cases to set transient state. If the data are available in the subcache, they are loaded from the subcache. If the data are not available in the subcache, but are available in the local cache, they are loaded from the local cache without being stored into the subcache. If the data are not available in the local cell at all, they are copied over the domains without disturbing the existing state.

store subpage (default) [stsp/cstsp]
store subpage (exclusive) [stspe/cstspe]

Store subpage is used to store a full subpage of data from processor or co-processor general registers. If the subpage is present in the subcache, it is stored directly into the subcache. If the subpage is not present in subcache, it is stored directly into the local cell cache. An option to these instructions specifies whether, in the case that the data is stored into the cell cache, it is also stored in the subcache.

instruction fetch

Instruction fetches always fetch the subpage containing the data in read-only state.

Subpage Atomic State Instructions

The subpage atomic instructions are the program interface to the get, stop, and release operations described above. These instructions exist in several forms to permit precise tuning of parallel programs.

release subpage [rsp]

Release subpage is used to remove a subpage from pending atomic or atomic state. If the subpage is in pending atomic state in the local cache, it is set to invalid state. If the subpage is not in pending atomic state in the local cache, it is set to invalid state. If the subpage is not in pending atomic state in the local cache, but is in atomic state in some cache in the system, then it is set into exclusive state from atomic state in that cache. If the subpage is in transient atomic state in that cache, it is changed to transient exclusive state and then it is expelled, as per the release and expel subpage instruction below. If the subpage is not in pending atomic state in the local cache and is not in atomic state in any cache, then release subpage has no effect.

release & expel subpage [resp]

Release and expel subpage has the same semantics as release subpage, except that if the subpage is changed from atomic to exclusive state, it is always expelled as if it were in transient atomic state.

get subpage [gsp]
get subpage & wait [gspw]
get subpage, wait & load [gspwld]
get subpage, wait & load subpage [gwldsp]

Get subpage requests that a subpage be set into atomic state. For all forms of the get subpage instruction, if the subpage is not in atomic state in any cache, then the local cache acquires it in atomic state.

For the get subpage instruction, if the subpage is already atomic on the local cache, then the instructions signals an exception. If the subpage is already atomic on some other cache, then the instruction proceeds. Programs must use the mcksp instruction after gsp to determine if the attempt to take the subpage into atomic state succeeded.

For the other get subpage instructions, if the subpage is already atomic in any cache, the instruction waits until the subpage is released. The local cache then acquires the subpage in atomic state.

The two load forms of the get subpage instruction have the same semantics as a gspw followed by the load instruction. The only difference is that the combined instructions are faster.

stop subpage [ssp]
stop subpage & wait [sspw]
stop subpage, wait & load [sspwld]
stop subpage, wait & load subpage [swldsp]

Stop subpage sets the state of a subpage in the local cache to pending atomic.

Stop subpage & wait sets the state of a subpage in the local cache to pending atomic, and then blocks until the subpage state changes from pending atomic to atomic.

Stop subpage, wait, and load is an indivisible combination of stop subpage & wait and load (default).

Stop subpage, wait, and load subpage is an indivisible combination of stop subpage & wait and load subpage (default).

release, expel & stop subpage [ressp]
wait, release, expel & stop subpage [wressp]
get subpage, wait, release, expel & stop subpage [gwressp]
load, release, expel & stop subpage [ldressp]

Release, expel and stop subpage is an indivisible combination of release & expel subpage and stop subpage.

Wait, release & stop subpage is an indivisible combination of waiting for subpage to be in atomic state in local cache, release & expel subpage and stop subpage.

Get, wait, release, expel & stop subpage is an indivisible combination of get subpage and wait, release & expel subpage and stop subpage.

Load, release and stop subpage is an indivisible combination of load (default), release & expel subpage and stop subpage.

Other Subpage Instructions

Memcheck Subpage [mcksp]

Memcheck subpage checks the progress of an asynchronous memory system instruction for a subpages. It returns two values: a binary indication of whether an instruction was in progress and the current subpage state.

Prefetch Subpage (copy) [pcspc, pdspc, pispc]
Prefetch Subpage (nonexclusive) [pspcn, pdspn, pispn]
Prefetch Subpage (exclusive) [scspe, pdspe, pispe]

Prefetch Subpage requests that a copy of a subpage be acquired on the local cache in a specified state. Prefetch subpage specifies whether or not the subpage should be prefetched into the processor's instruction or data subcache. A subsequent load for the subpage blocks until the prefetch subpage has completed.

Page Prefetch Instructions

Prefetch Cache Page (copy) [pcpc]
Prefetch Cache Page (nonexclusive) [pcpn]
Prefetch Cache Page (exclusive) [pcpe]

Prefetch cache page requests that all subpages of a page be acquired on the local cache in the specified state.

A more detailed description of a preferred memory instruction set, including processor load instructions, processor store instructions, and page manipulation instructions, is provided in Appendix F, filed herewith.

Updates from the Subcache to the Cache

When a processor has a copy of a subpage in subcache, and that subpage is owned by that processor's local cache, the processor propagates modifications to the subpage to its local cache as follows:

If the local cache holds the subpage in exclusive state, then the processor propagates modifications to the cache when:
the subpage is removed from subcache, or
the local cache receives a request for a copy of the subpage. In this case, the local cache explicitly requests the updated copy.
the processor is stalled. When the processor is stalled, it updates modified subpages in exclusive state to its local cache.

If a processor's local cache holds the subpage in nonexclusive state then the processor propagates each modification as it is completed.

A processor propagates modified information to its local cache with an Update data request.

Forcing Subcache Invalidation

A cache forces its local processor to remove a subpage from subcache in order to invalidate the subpage in response to a request from another cache.

Requests from One Cache to Another

In parallel to responding to requests from its local processor, each cache responds to messages from other caches delivered by its local domain(0). There are three types of messages: read, write, and response. A read message requests some other cache to respond with the data for a subpage. Each read message also requests a particular state, and both the cache that responds with the data and other caches with copies change the state of their copy of the subpage in order to satisfy the state request. a write message either supplies an updated copy of a subpage to caches with read-only copies, or directs other caches to change the state of their copies. A response message is sent in response to a read message. Caches other than the original requestor take actions on response messages as specified below.

It is important to note that read and write message do not correspond to load and store instructions. Both load and store instructions result in read messages to acquire a copy of the subpage in the appropriate state. A particular store instruction will not result in an immediate write message unless the subpage is held in nonexclusive state.

Cache Page Usage and Replacement

The caches of a KSR system can be used by system software as part of a multilevel storage system. In such a system, physical memory is multiplexed over a large address space via demand paging. The caches include features that accelerate the implementation of a multi-level storage system in which software moves data between the caches and secondary storage in units of SVA pages.

Caches as Two Storage Levels

All of the caches together make up a system's primary storage. However, for some purposes, it is necessary to treat each individual cache as an independent primary store. This is because each cache can only hold a limited number of pages: 4096 pages in each cache, and 32 in any particular set. Since each page can only be stored in one set in each cache, a cache signals an exception when a full set prevents it from allocating a descriptor for a page. When such an exception is signalled, software must take action to make room in the full set.

When a particular set of a particular cache is full, there is no reason for software to assume that the entire memory system is correspondingly full. Thus, it is desirable for software to respond to a full set by moving a page from that set to the corresponding set of another cache. In taking this action, software treats the rest of the memory system as an additional level of storage between a particular cache with a full set and secondary storage, called backing store.

Strategies for Backing Store Management

Referring to FIG. 8, in order to use memory efficiently, software must use some strategy for identifying an appropriate page to remove from a full set, and a appropriate target cache, if any, for the page. The caches include facilities that accelerate a class of strategies for this page replacement. To accelerate software's selection of a page for replacement within a set, each cache approximately orders the pages from Most Recently Used (MRU) to Least Recently Used (LRU). When a page is referenced, it moves to MRU. As other pages are referenced thereafter, it ages toward LRU. The LRU information accelerates strategies that replace the least recently used page.

To accelerate software's selection of a target cache for replacement between caches, each cache maintains an approximate measurement of the working set of the cache. The working set is a measurement of the number of pages which are in steady use by programs running on a cache's local processor over time, as distinct from pages referenced a few times or infrequently. Software measures the working set of each cache as a point between MRU and LRU. Pages above the working set point are in the working set, while pages below have left the working set. The working set information accelerates a software strategy that treats the non-working set portion of each cache's memory as system backing store.

Automatic Page Movement and Removal

A new page arrives when a cache's local processor references data in a subpage that is in invalid descriptor state. If the corresponding page is resident elsewhere in the system, the cache will copy its descriptor and the referenced subpage from another cache. Eventually, this process will fill up cache sets. When data is extensively shared by programs running on multiple processors, this is a very frequent event.

Therefore, each cache includes facilities to automatically move and remove pages in parallel with other computation to avoid the need for frequent software intervention required by full sets. These facilities use the LRU and working set information to:

recombine pages
    To recombine a page is to collect all of its subpages in one cache, and free the descriptors in other caches.

drop pages
    To drop a page is to remove an unmodified pages from all caches.

All of these automatic actions can be tuned or disabled by software, and are inhibited by descriptor.held. The following sections describe the circumstances in which the caches recombine, move, and drop pages.

Recombining Pages

Each cache recombines pages from LRU up to the working set point, it is significantly less likely to be referenced again that if it is above the working set point. Therefore, each cache recombines pages when they pass the working set point. A cache uses the write exclusive recombine or write non-exclusive recombine message for each subpage to recombine a page. If the recombine messages fail to find another cache to take over the page, the recombining cache retains the data. If the recombine messages fail to find another cache to take over the page, the recombining cache retains the data. In effect, it has found itself as the target of the recombine. Since pages are recombined as soon as possible after they leave the working set, any other cache with copies is likely to have the page in the working set. (were it not in the working set in some other cache, that cache would have recombined it.)

Since pages below the working set point are less likely to be referenced, most of the recombines that actually move data to another cache will be of pages that have recently left the working set. The pages below the working set that get recombined elsewhere will be pages that have been referenced since they left the working set, and so the recombine moves them to the cache that referenced them.

Dropping Pages

Caches invalidate subpages and pages to make room for other pages. This is called dropping. A cache will automatically drop a page which is below the working set point and which has subpages in read-only or invalid state (a read-only page). If a cache has no free descriptors and cannot allocate a descriptor by recombining a page, it will drop a read-only page that is not subcached and is anywhere in the MRU→LRU order. If a cache has no read-only pages, it will drop an unmodified page with subpages in invalid, read-only, or exclusive state that is not subcached and is in the lower portion of the working set, as defined by the WS_Low register defined below.

Software Working-Set-Related Action

The following sections describe a software strategy that makes use of the cache facilities to implement a multi-level store.

Modified Pages

When a modified page crosses the working set point, system software undertakes to write it to disk, so that it will be pure by the time that it reaches LRU. Since only some of the caches will be able to write a given page, by virtue of having a physical connection to the appropriate disk drive, modified pages must be migrated to the cache in a cell with an XIU connected to the secondary storage device for the page. Software moves pages to be written with copy or chng instructions.

Software sometimes has knowledge of the expected reference pattern for some data. If software expects a page to be referenced only one, that page should be put into the LRU order someplace below MRU, to avoid displacing information that is more likely to be used later. In particular, if software is prefetching data that it won't reference for a while, and perhaps not reference it at all, it should not be inserted at MRU. Software controls the insertion point by setting the appropriate LRU_insert_index in the prefetch and chng instructions.

Cache Usage and Replacement Facilities

Each cache maintains LRU state for all of the resident pages. The LRU data is maintained separately for each of the 128 sets of the descriptor associative memory, and orders the 32 pages in the set according to their approximate time of last reference.

Basic LRU Maintenance

Each cache maintains an LRU→MRU ordering of the descriptors in each set. The ordering is maintained in descriptor.LRU_priority. Each of the descriptors in a set has a value from (MRU) to 31 (LRU) in descriptor.LRU_priority. Conceptually, when a page is referenced it moves to MRU. All of the other pages from MRU down to the referenced page's LRU priority then move down.

When a page is first subcached, descriptor.LRU_priority is set to zero, which inserts it at MRU. When the last subcached subpage of a page is evicted from the subcache, descriptor.LRU_priority is set as specified by descriptor.LRU_insert_index. The insert index selects an entry in LRU_insert_table, a per-cache table described below. descriptor.LRU_priority is set to LRU_insert_table(descriptor.LRU_insert_index) and the descriptor.LRU_priority is changed for other descriptors as appropriate to accommodate it. Note that if an entry of the LRU_insert_table is set close enough to MRU, then pages evicted from subcache will be inserted closer to MRU than pages in subcache.

Working Set Measurement

Each cache has an array of 32 working set rate counters, 16 bits. The counters freeze at $2^{16}-1$. When a page is subcached, the bucket corresponding to its current LRU position is incremented. By periodically reading and clearing the buckets, software can determine the approximate working set size. Software can attempt to maintain the working set for each schedulable entity, or it can just run a set of entities on a cache and maintain the aggregate working set. The later incurs less cost at scheduling time.

Subcached pages complicate working set measurement. The LRU value of a page can change any time that some other page moves into the cache. However, the LRU numbers do not consider whether or not a page is subcached. Instead, all the hardware mechanisms which use LRU consider all subcached pages as one LRU level, and all non-subcached pages at various other LRU levels.

LRU Insert Table

The LRU_insert_table maps from four logical points in the LRU→MRU sequence to the 32 actual slots in the set. The four slots are named:

1. WS_High—conventionally set close to or at MRU.
2. WS_Low—a point low in the working set of the cache. When software prefetches low priority data into the cache, it is usually inserted at this point. This allows software to 'over prefetch' without displacing more important data, as inserting it at WS_High would. See the description of prefetch strategy below.
3. BS_High—the boundary between working set and backing store. When software migrates a page into backing store in a cache it inserts it here.
4. BS_Low—an insertion point for low-priority backing store items.

Descriptor Allocation Actions

When a new descriptor in a set is needed, the cache proceeds through as many of the following actions needed to find a usable descriptor:

1. Looks for an invalid descriptor. If one exists, it uses it.
2. Drops copies. If ctl$configuration.cde is 1, the cache searches up from LRU, looking for any page which has only read-only subpages. If it finds one that is not held (descriptor.held is 0) and not subcached it invalidates it and uses it. The scan stops at BS_High.
3. Looks for an opportunity to do a recombine. If ctl$configuration.are is 1, the cache scans up from LRU looking for a page that has at least one owned subpage, has descriptor.held of zero, does not have descriptor.owner_limit of Cache_owner_limit, and is not subcached. The scan stops at BS_High. If the scan finds one, the cache sends a Write REcombine Exclusive or Write Recombine Nonexclusive message as appropriate for each of its subpages which is owned. If all of the subpages are successfully passed off, then the descriptor is invalidated and used. Software can disable this feature by setting Recombine_high_limit to MRU.
4. Drops pure pages. If ctl$configuration.ade is 1, the cache scans up from LRU looking for pages that are:
    not modified
    have only exclusively owned or read-only subpages
    not atomic modified
    not held
    not subcached.
5. Looks for a pure page (which is subcached) to drop.
6. Signals a no_descriptor_available exception if it cannot free a descriptor by the means described above.

Background Recombine

The cache uses otherwise idle time to recombine pages. If Recombine_high_limit is not 31, then the background task scans across the sets looking for pages in each set that can be recombined and recombines them.

Allocation recombines and automatic recombines will generally recombine pages as they leave the working set. There will be few recombinable pages in backing store. If at some time there are not recombinable pages in a cache, new recombinable pages will appear in the form of pages dropping out of the working set. If background and allocation recombines keep up with this rate, the only source of recombinable pages in the backing store will be references by other caches to pages in backing store. The referencing caches' descriptors will probably be in their working sets, and so recombining the pages to them is appropriate.

Software LRU Insertion Bias

Software can bias LRU insertion in instructions. Some of the control instructions described below include an LRU_insert_index field. When one of these instructions moves the first subpage for a page into subcache, the LRU_insert_index in the instruction replaces descriptor.LRU_insert_index for that page. Then, when the page leaves subcache, it is inserted into the LRU according to the specified entry in the LRU_insert_table. The chng instruction and the various prefetch instructions (described below) permit the programmer to specify an LRU_insert_index. When a cache executes one of these instructions for a subpage of a page which has no valid subpages, the specified LRU_insert_index becomes descriptor.LRU_insert_index.

The LRU insert index specified in control instruction replaces the index previously stored in the descriptor. Once the index is set in a cache, it persists in that cache until it is reset or all of the subpages become invalid. In effect, the memory system has a limited memory for LRU bias information. If one program indicates that a page is likely to be referenced again, and shortly thereafter another program indicates that it is unlikely to be referenced again, the second indication persists. System software can establish a different default behavior. For example, system software might include a background task that changes descriptor.LRU__insert__index to WS__High for pages below BS__High. This would implement a policy as follows: once a page had aged to backing store, any LRU insert index information was too old to be valuable, and the ordinary default should apply instead.

Prefetching requires care in the use of LRU insertion bias. It is desirable for software to be able to 'over prefetch,' to prefetch any data that it may need. To avoid driving higher priority information out of the LRU, the over-prefetched pages should be fetched with an LRU__insert__index other than WS__High.

Figure 9:
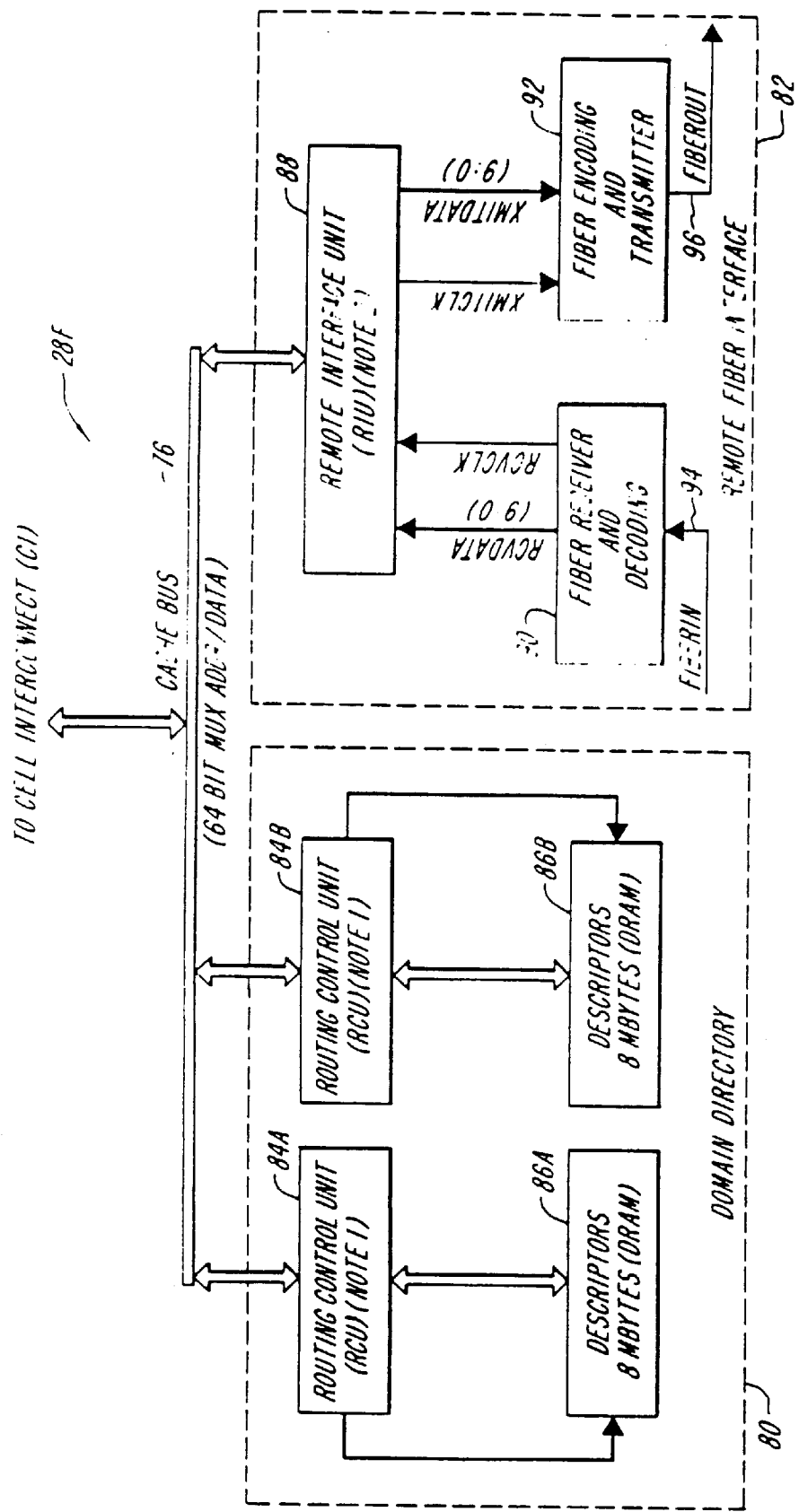
FIG. 9 depicts a construction for a preferred domain routing cell, including a remote interface unit, for a digital data processing system constructed according to a preferred practice of the invention.
Figure 10:
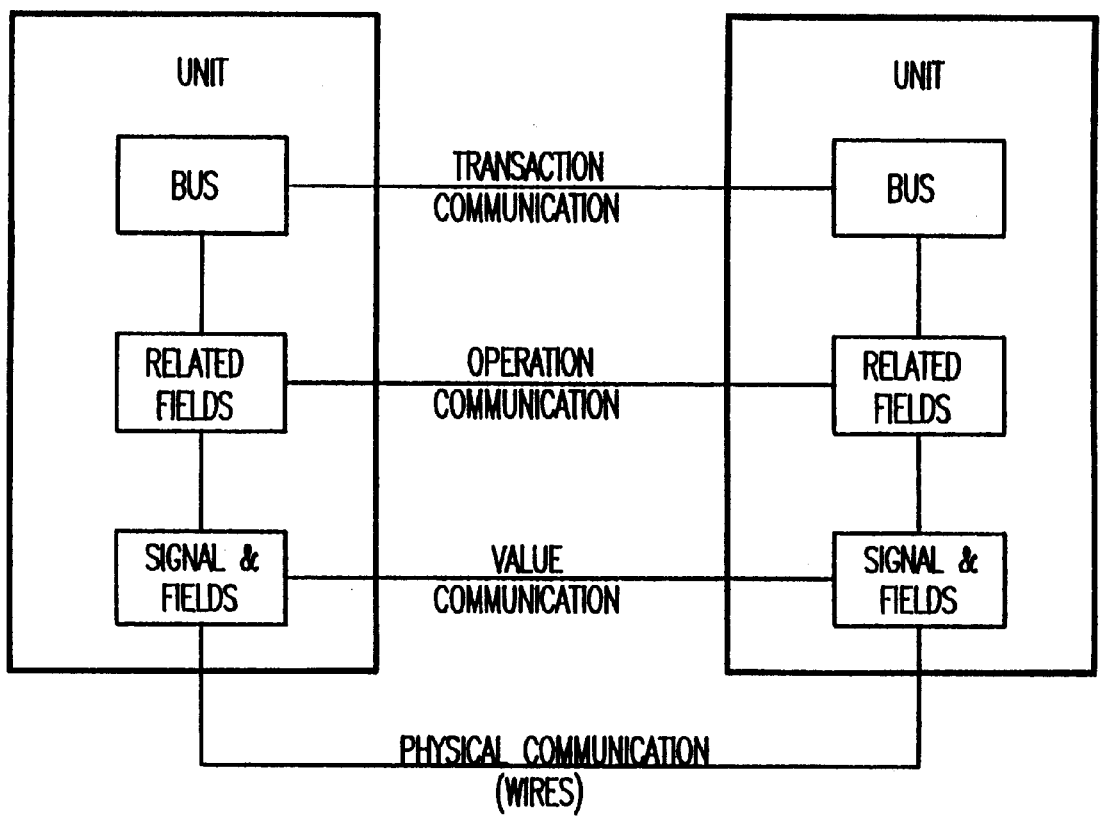
FIG. 10 is a functional block diagram depicting the interface hierarchy.
Figure 11A:
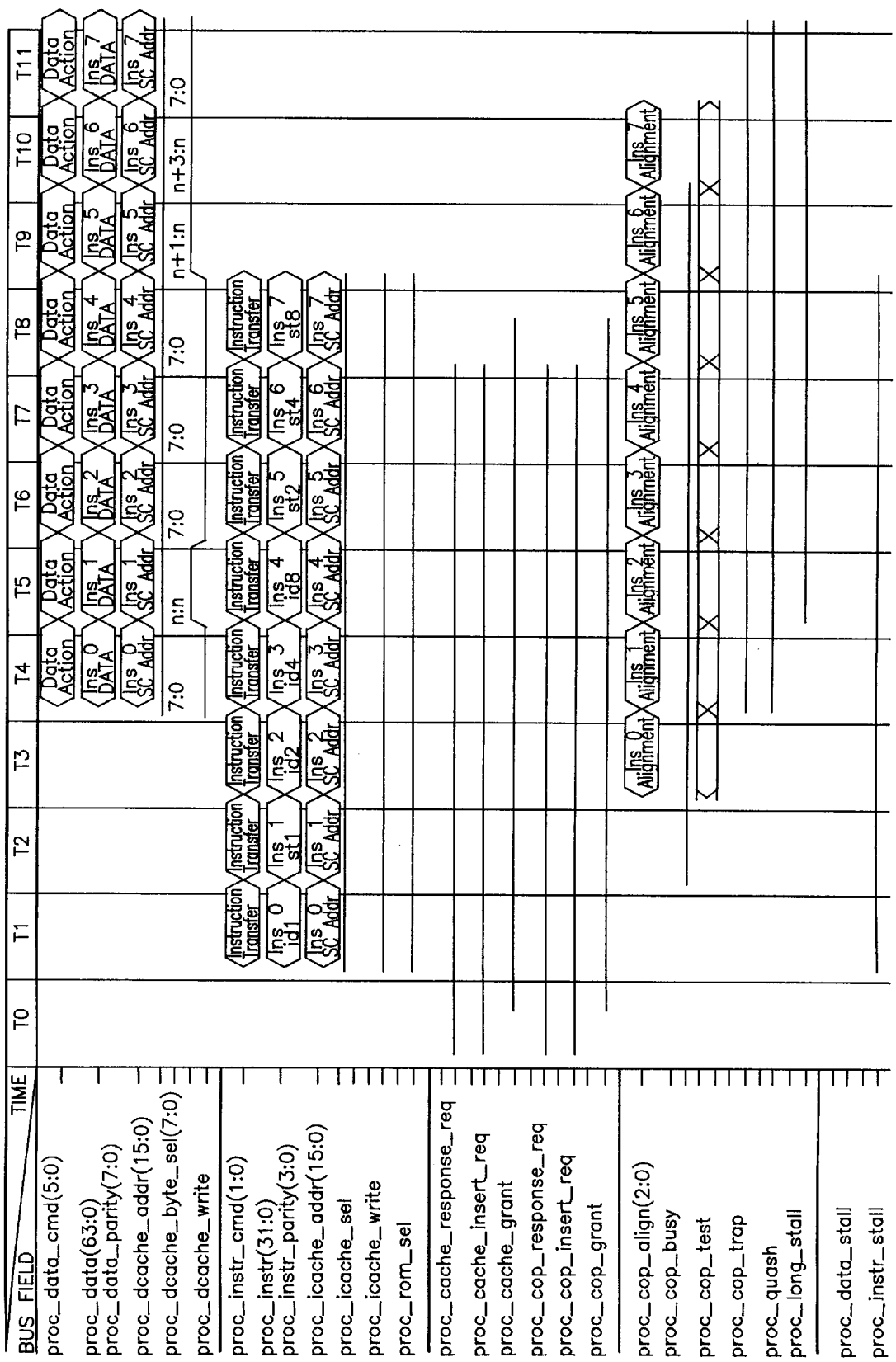
Figure 11B:
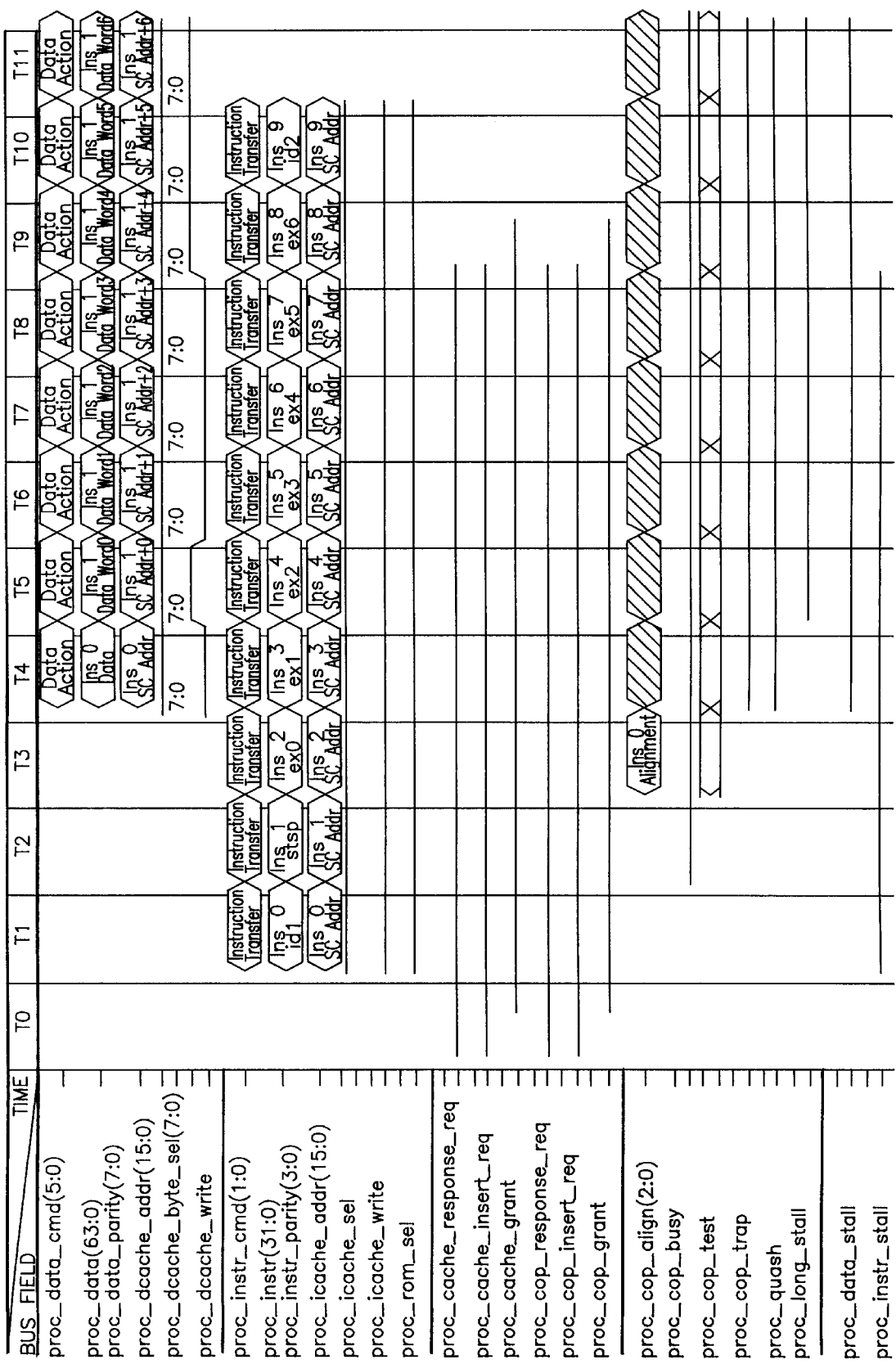
Figures 1, 11B:
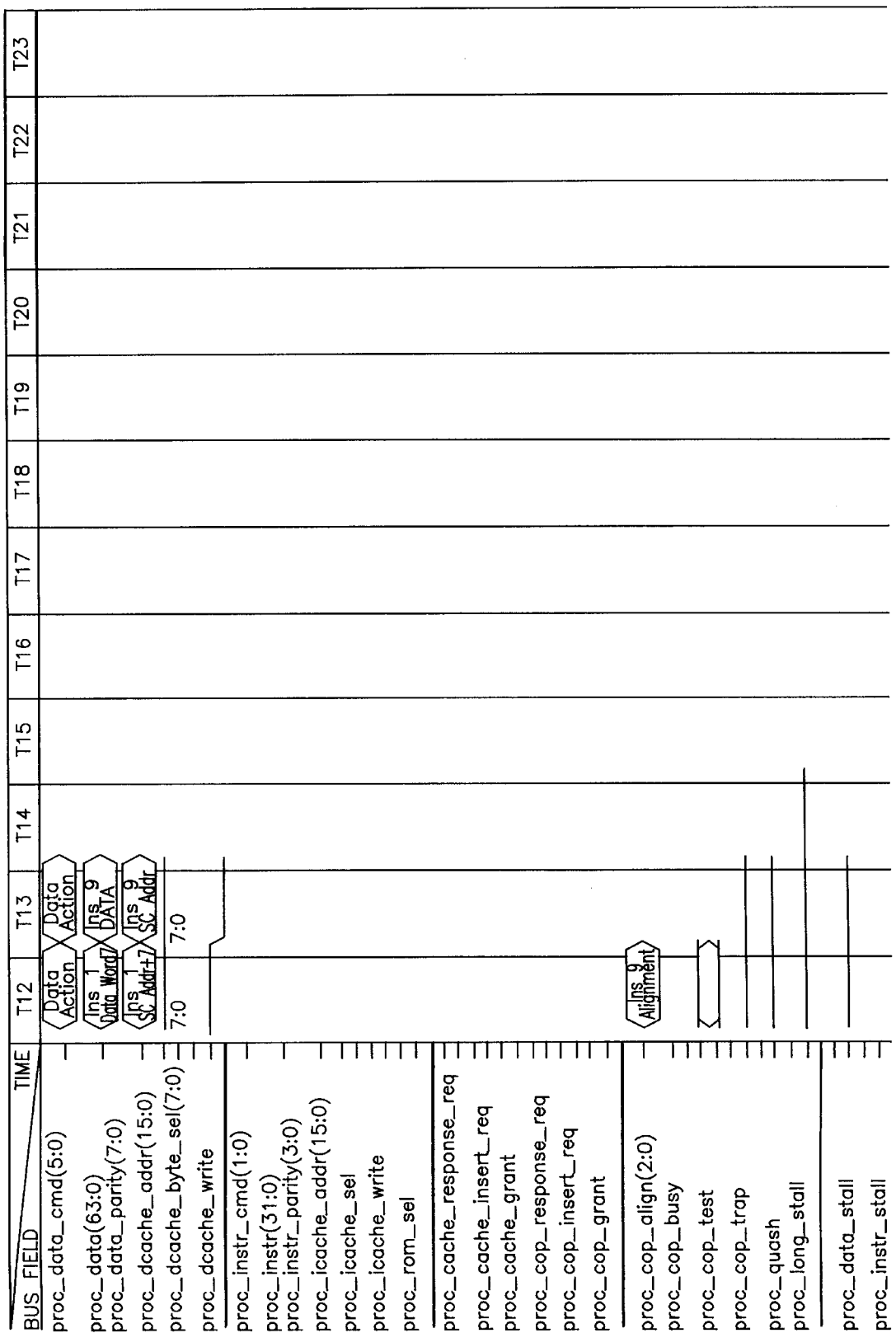
Figure 11C:
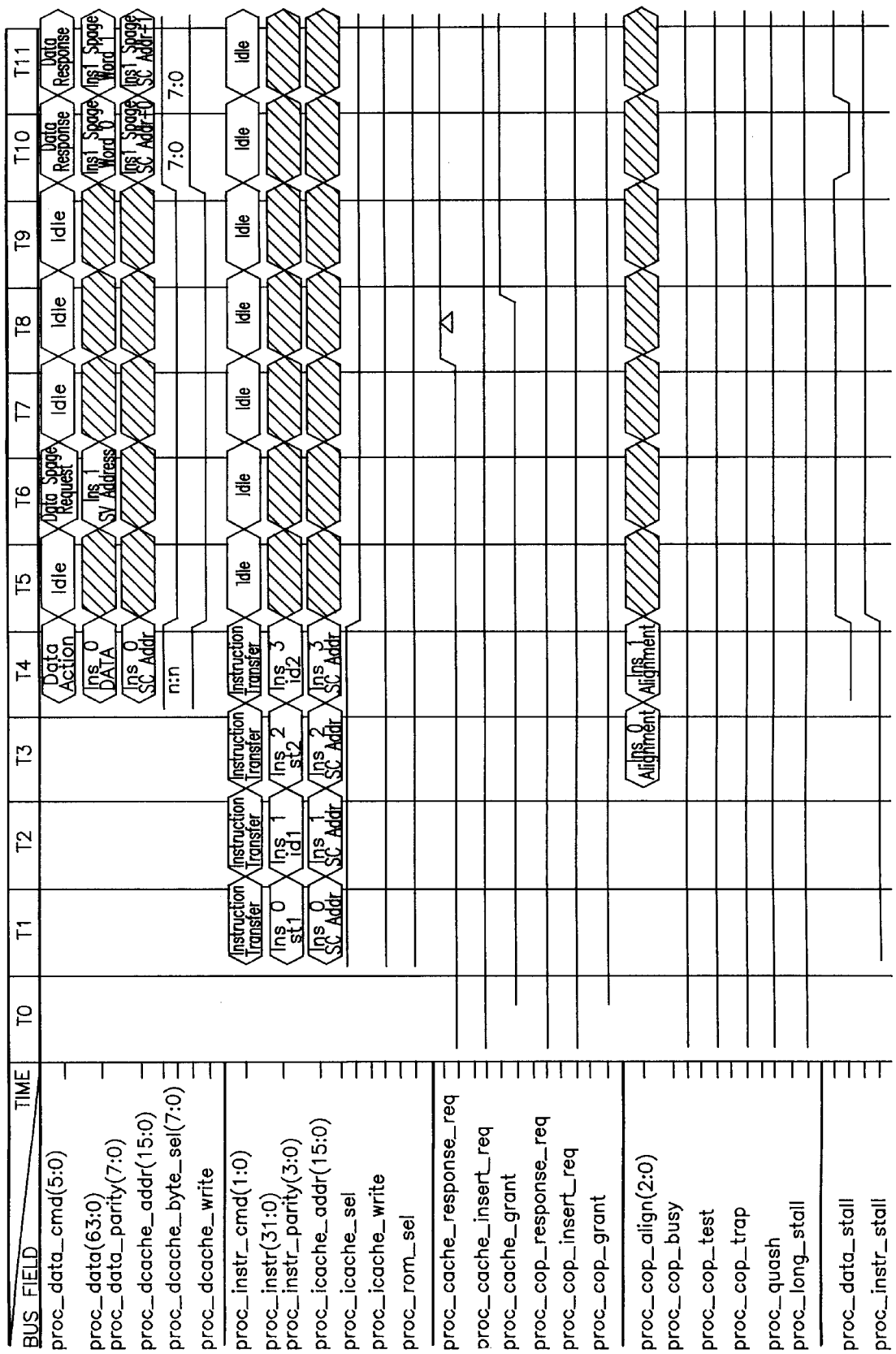
Figures 1, 11C:
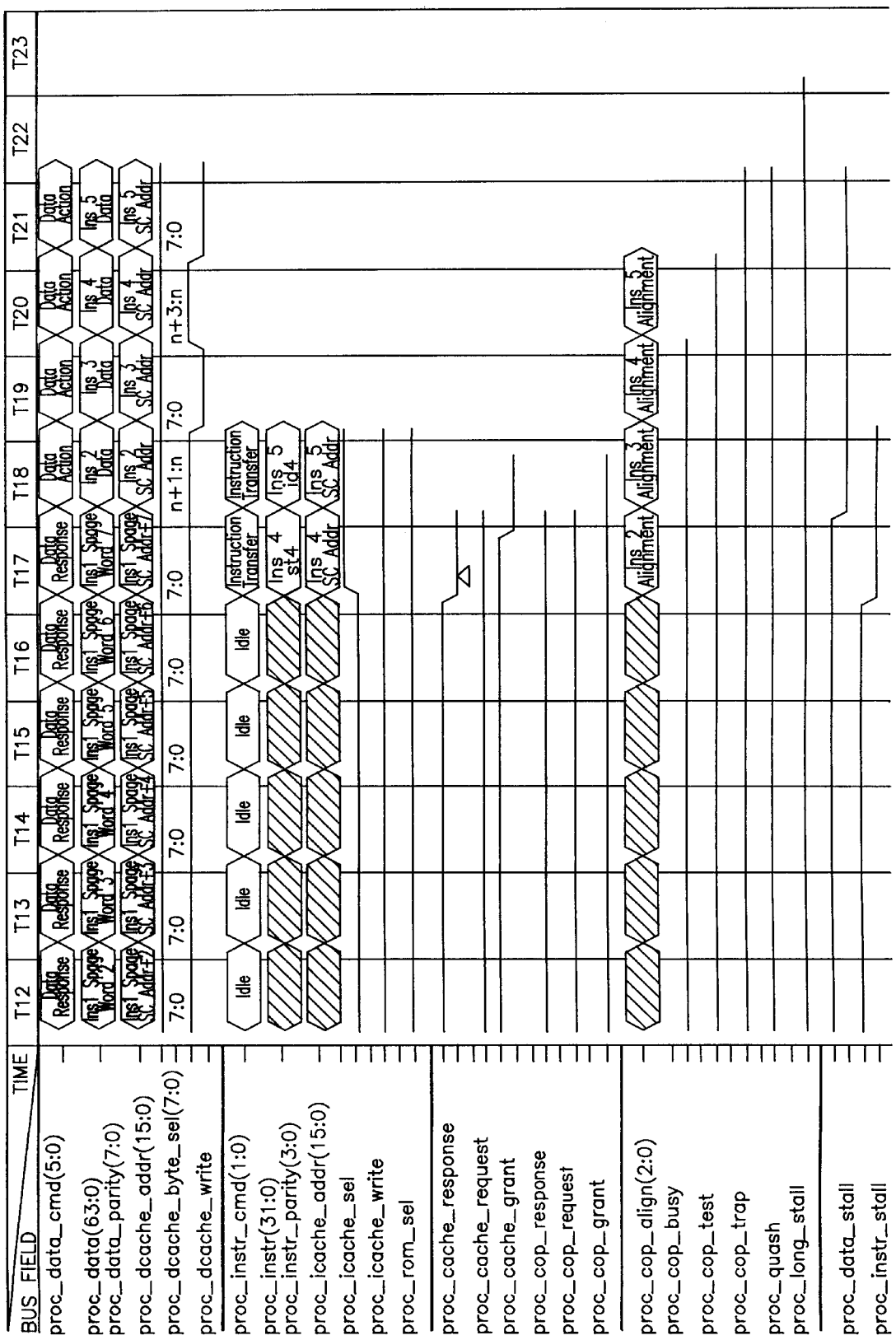
Figure 11D:
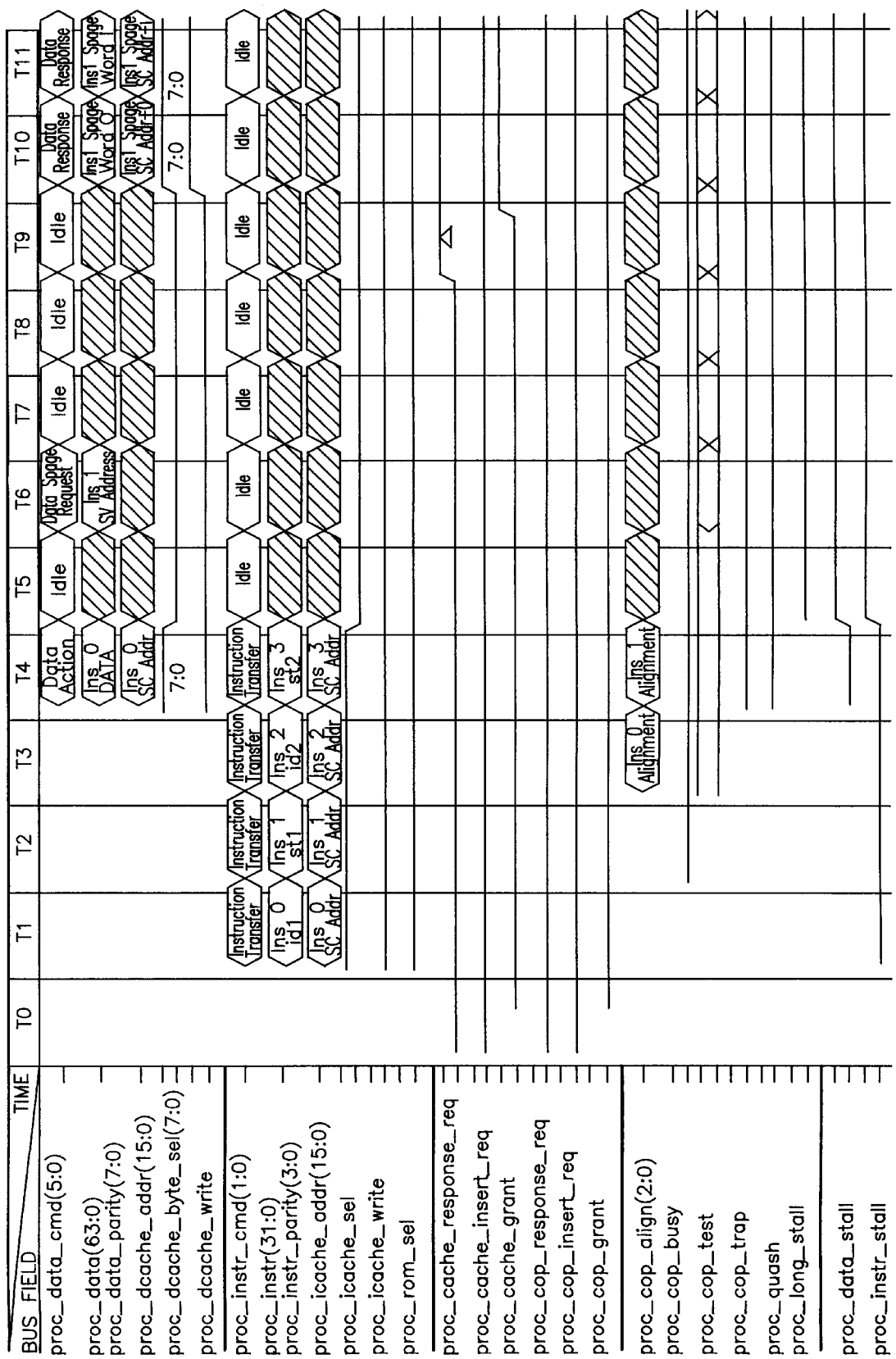
Figures 1, 11D:
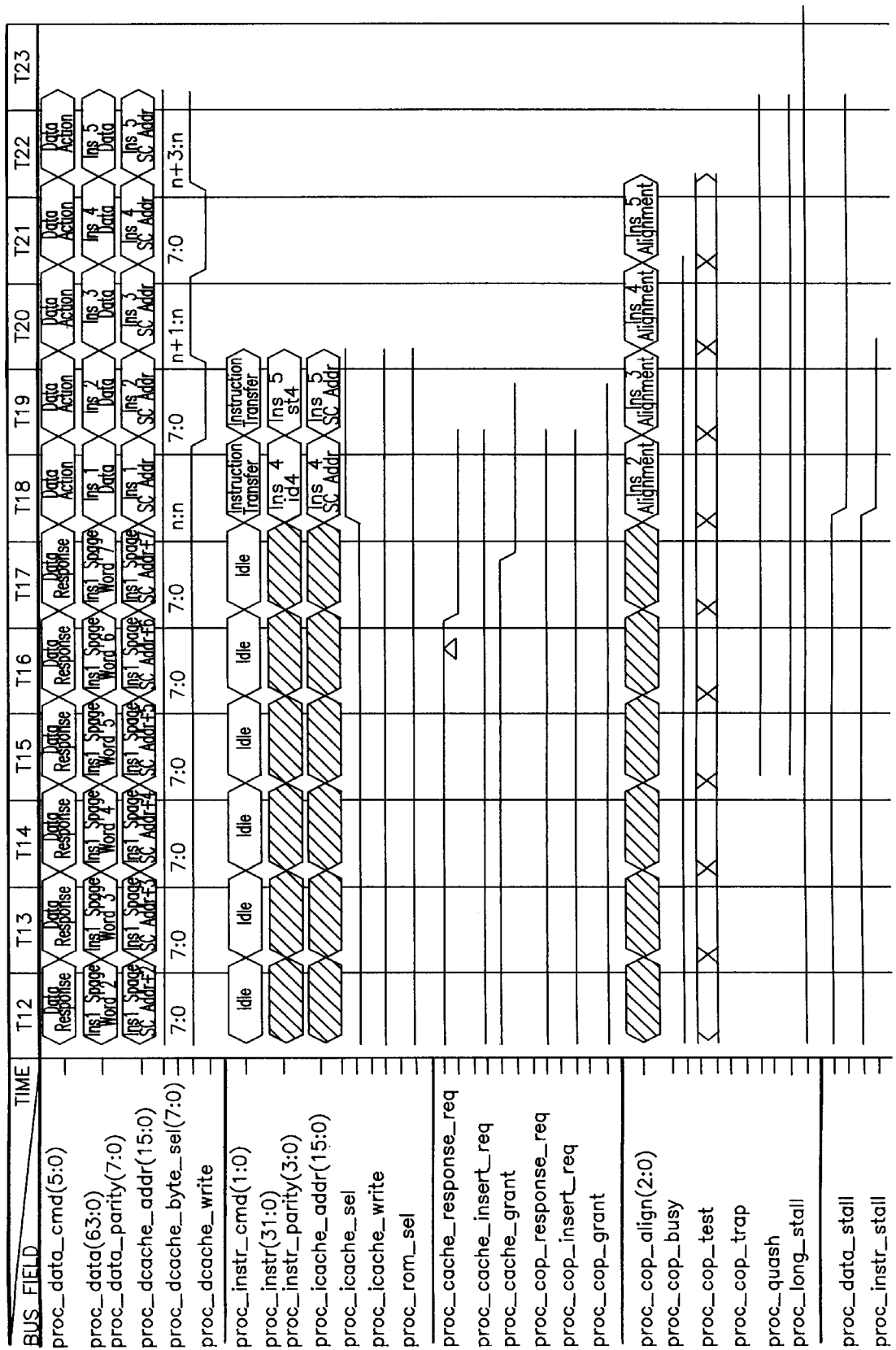
Figure 11E:
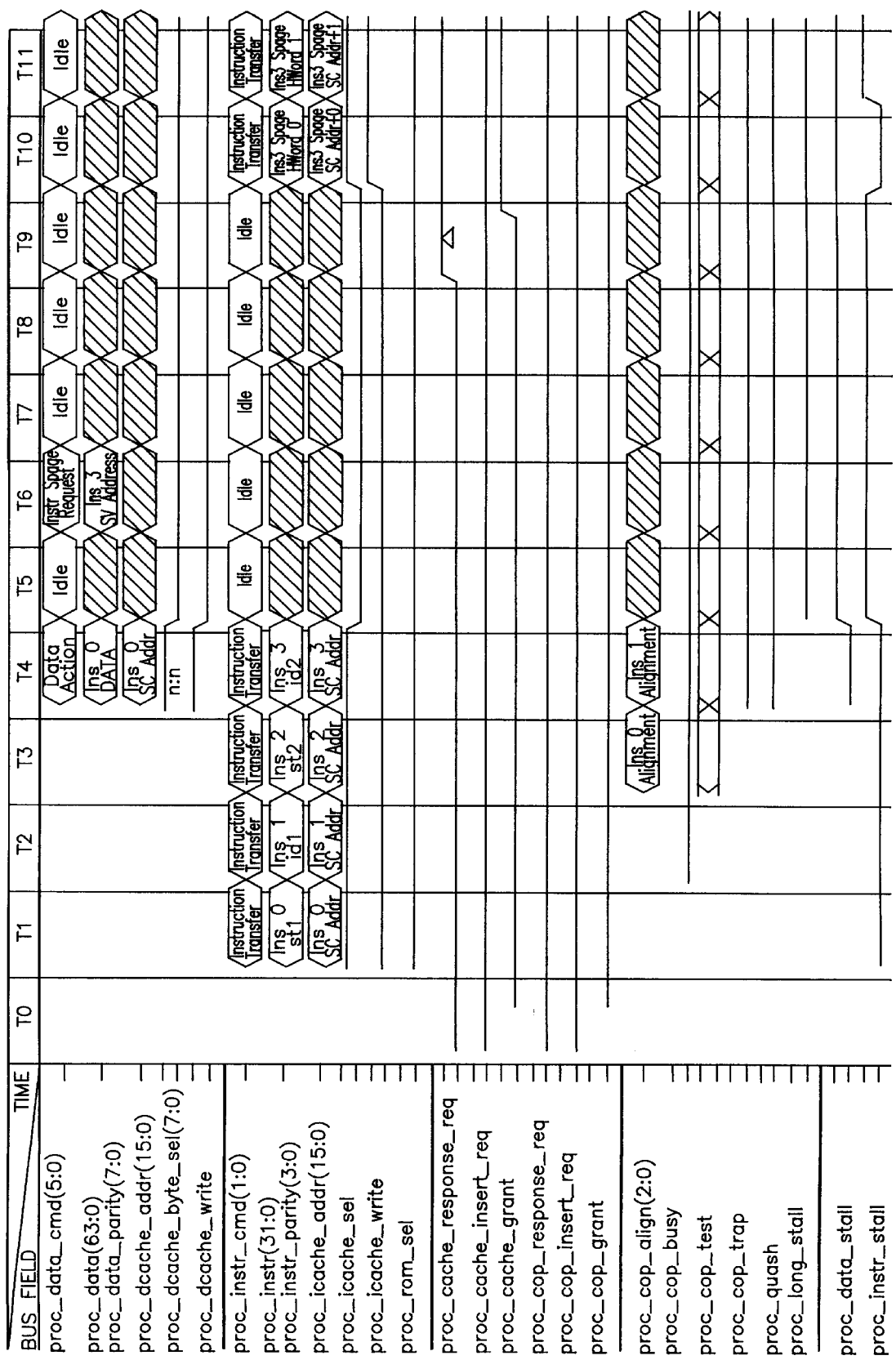
Figures 1, 11E:
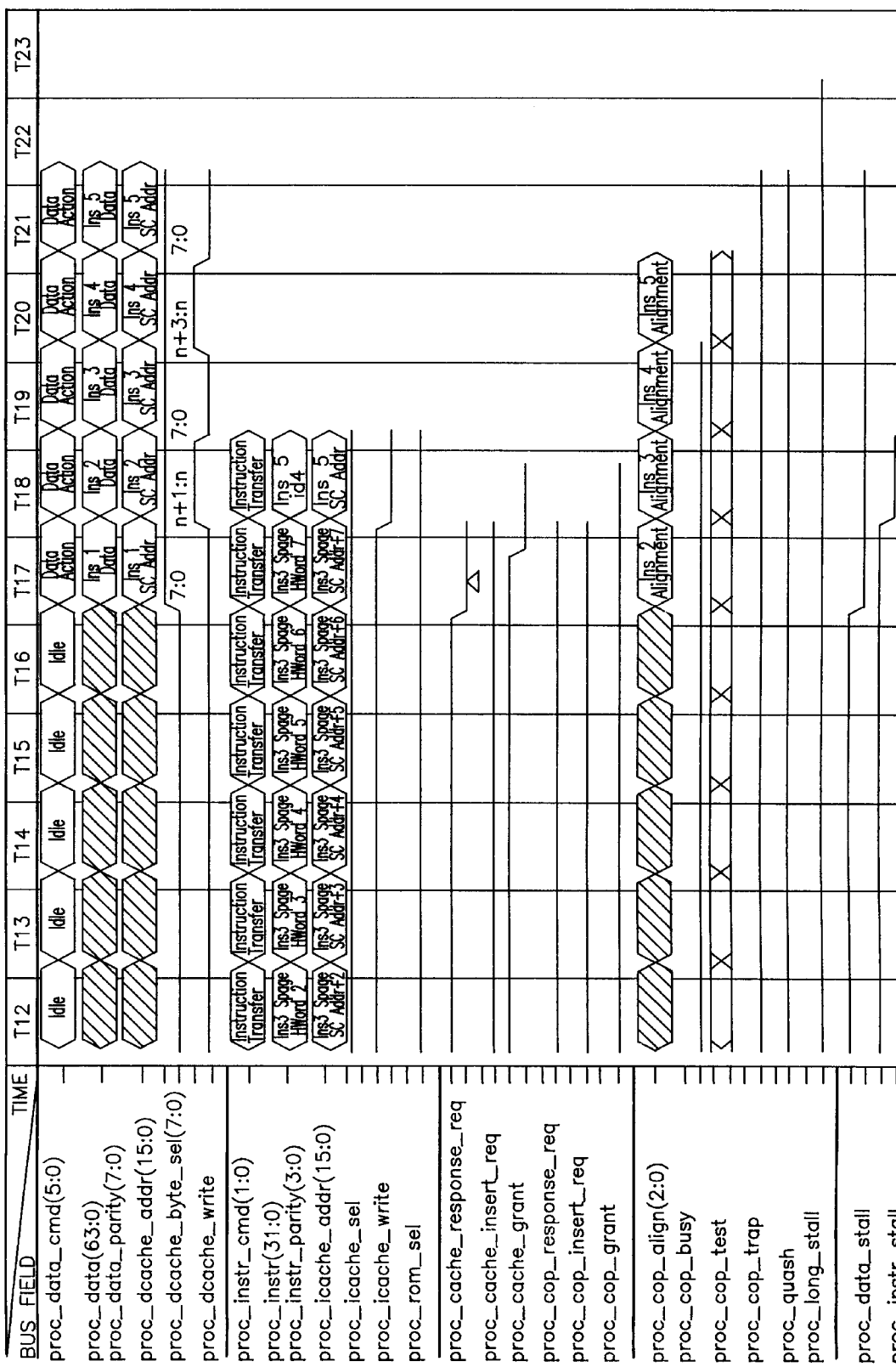
Figure 11F:
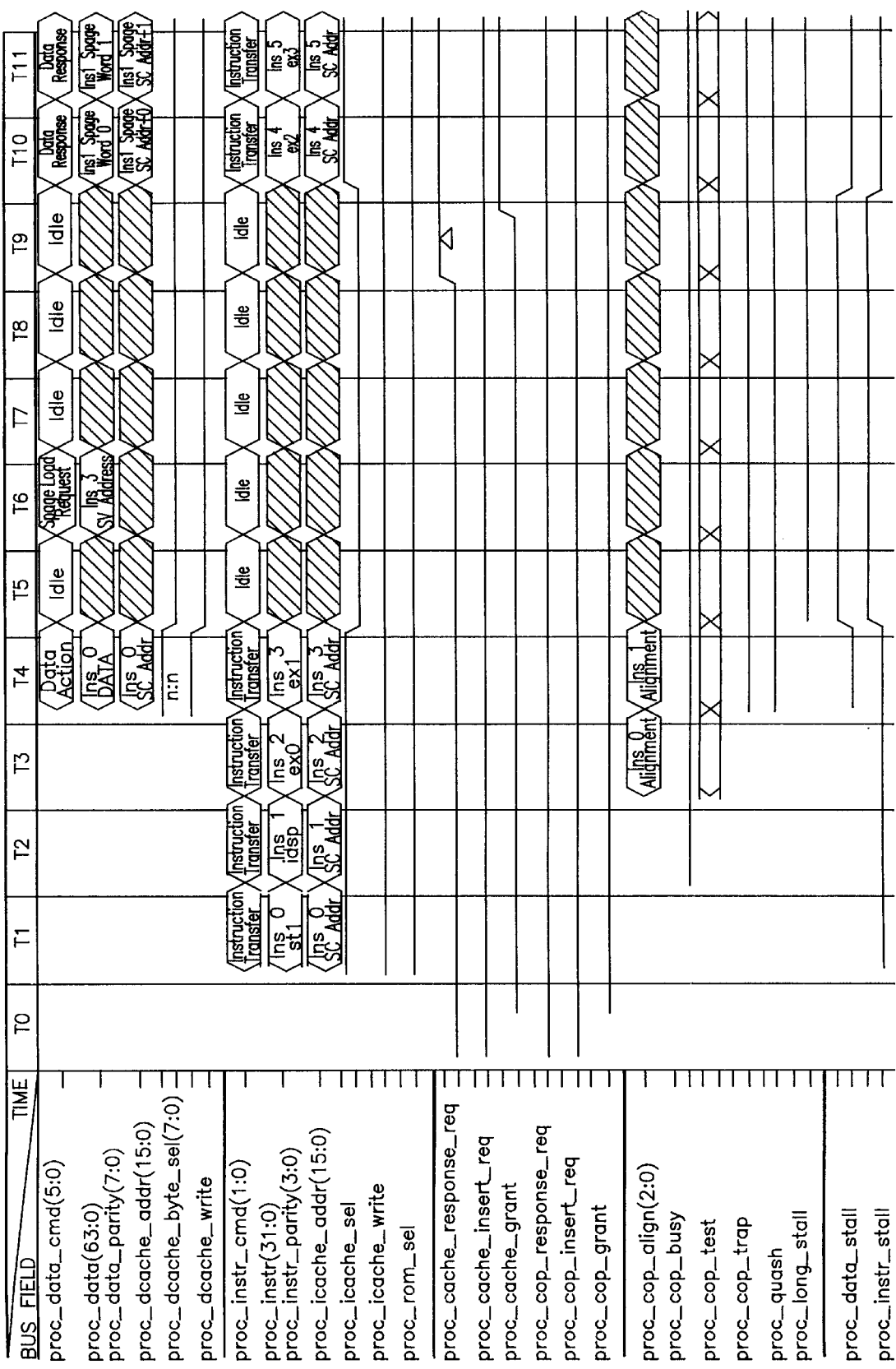
Figures 1, 11F:
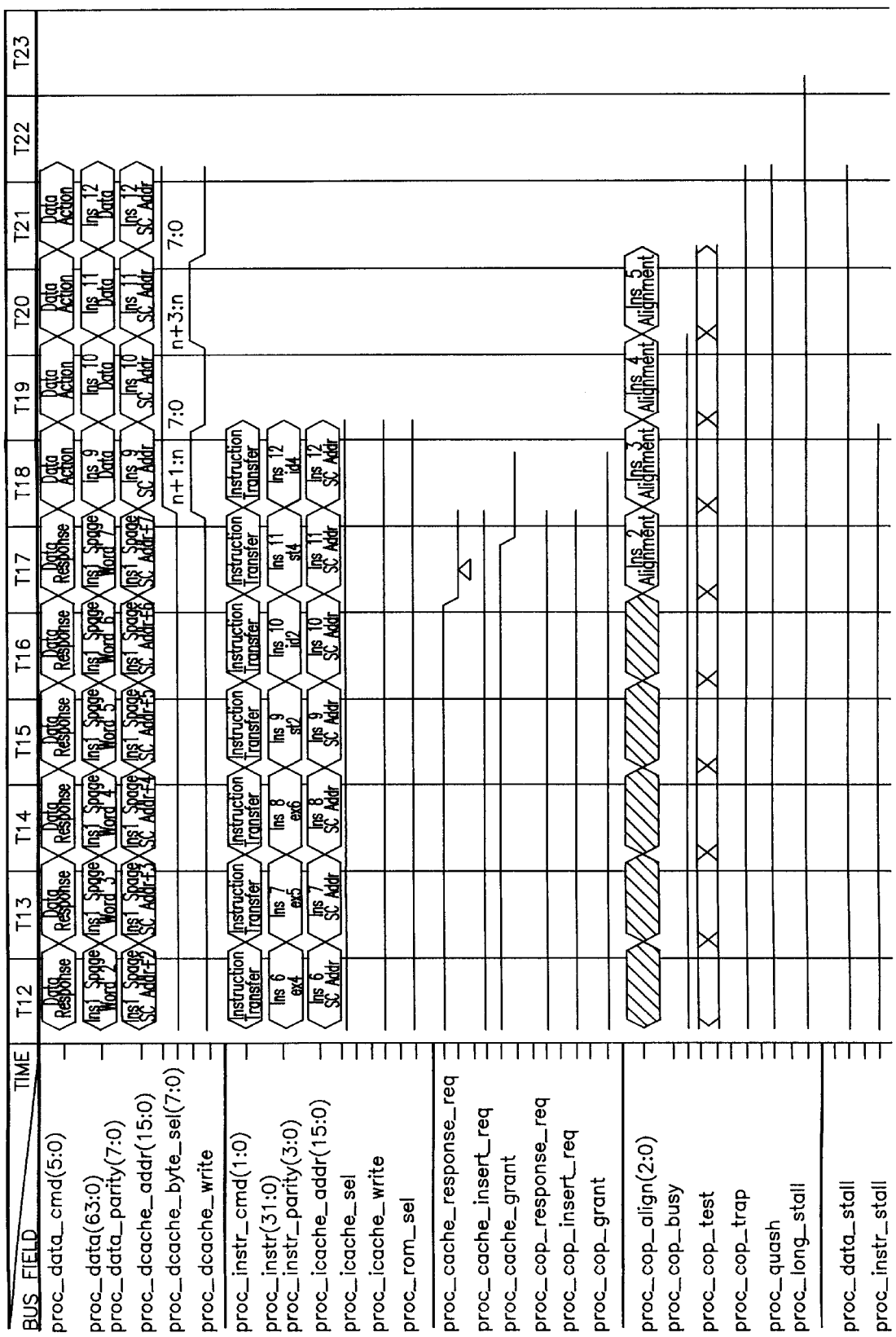
Figure 11G:
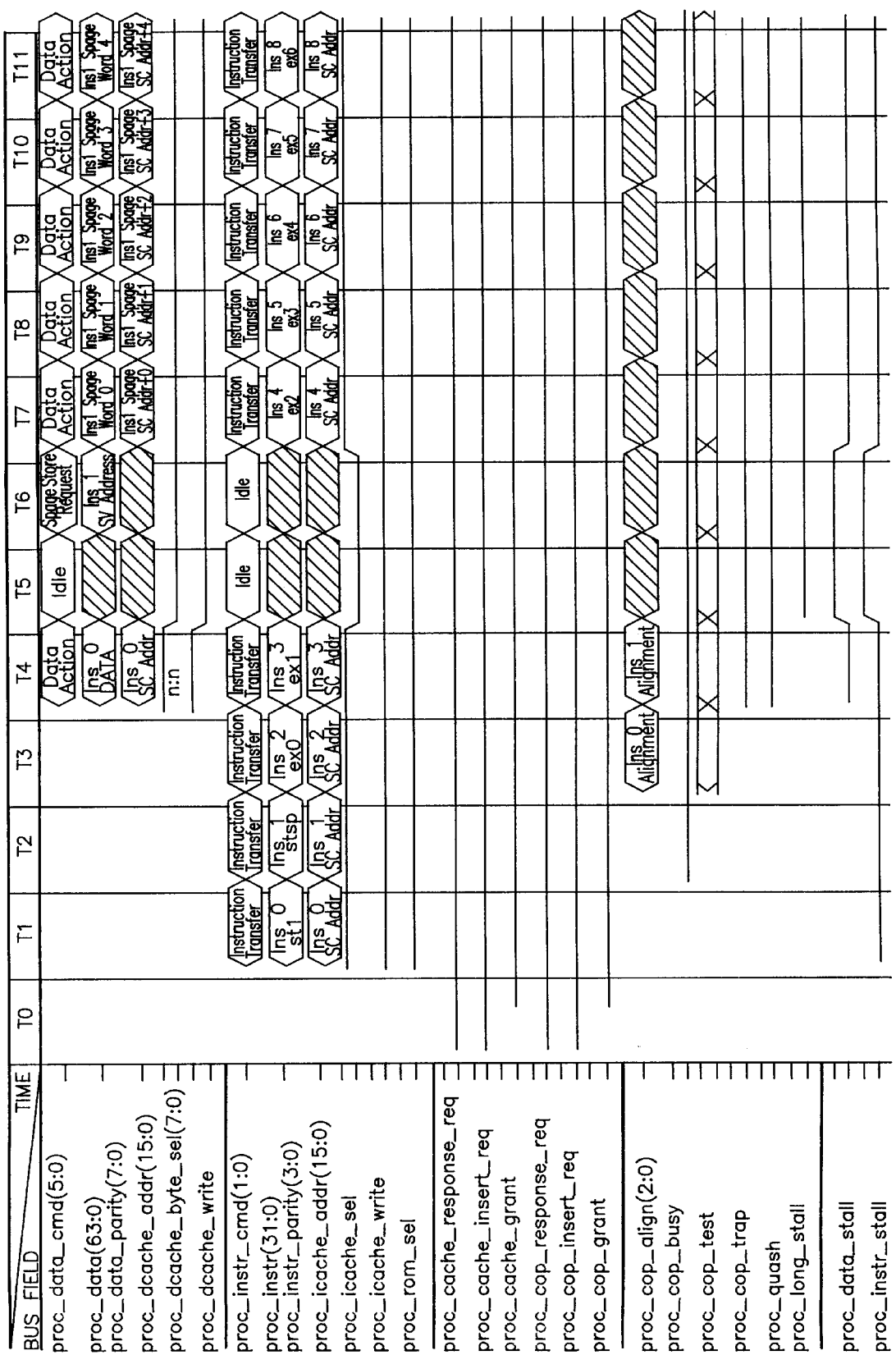
Figures 1, 11G:
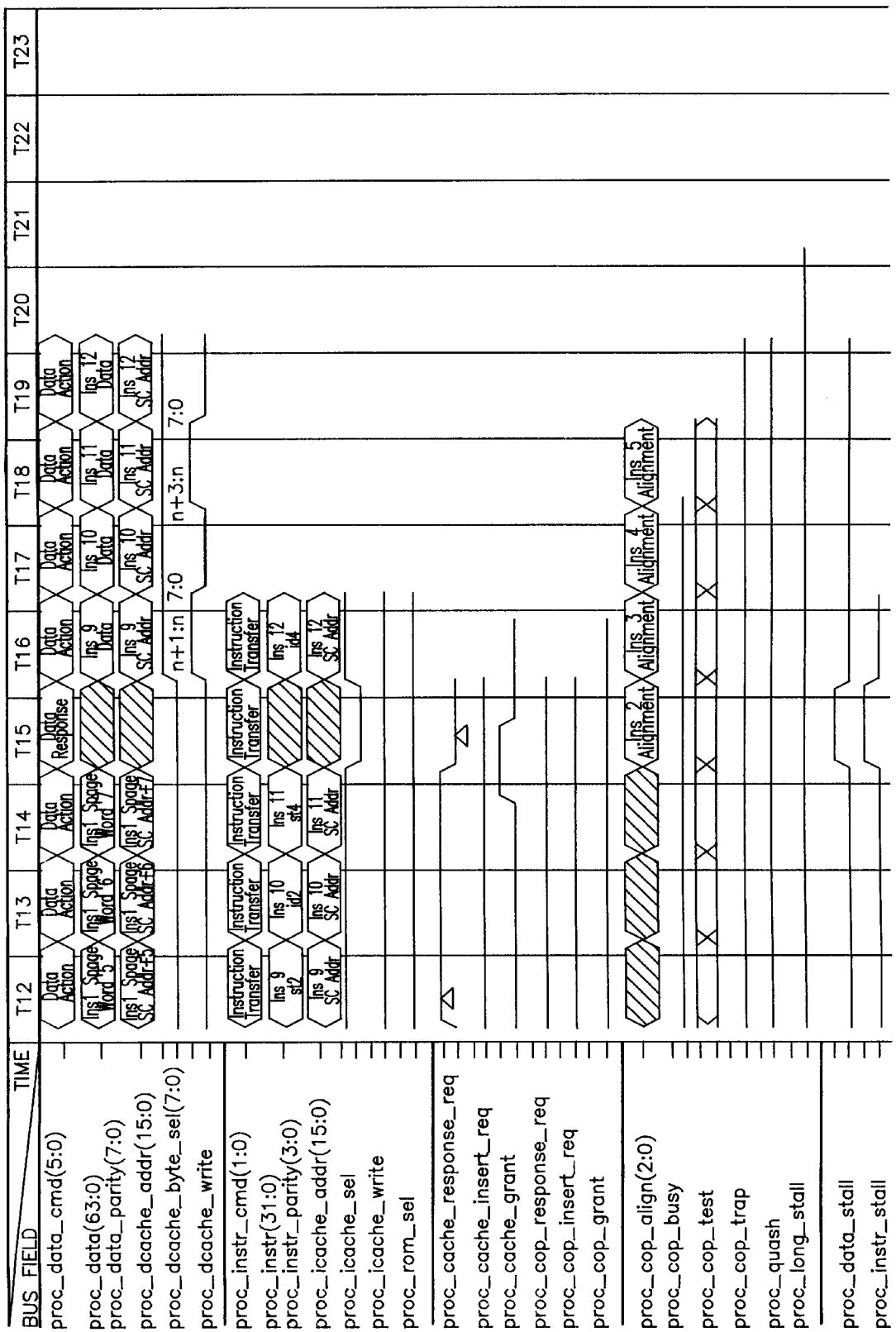
Figure 11H:
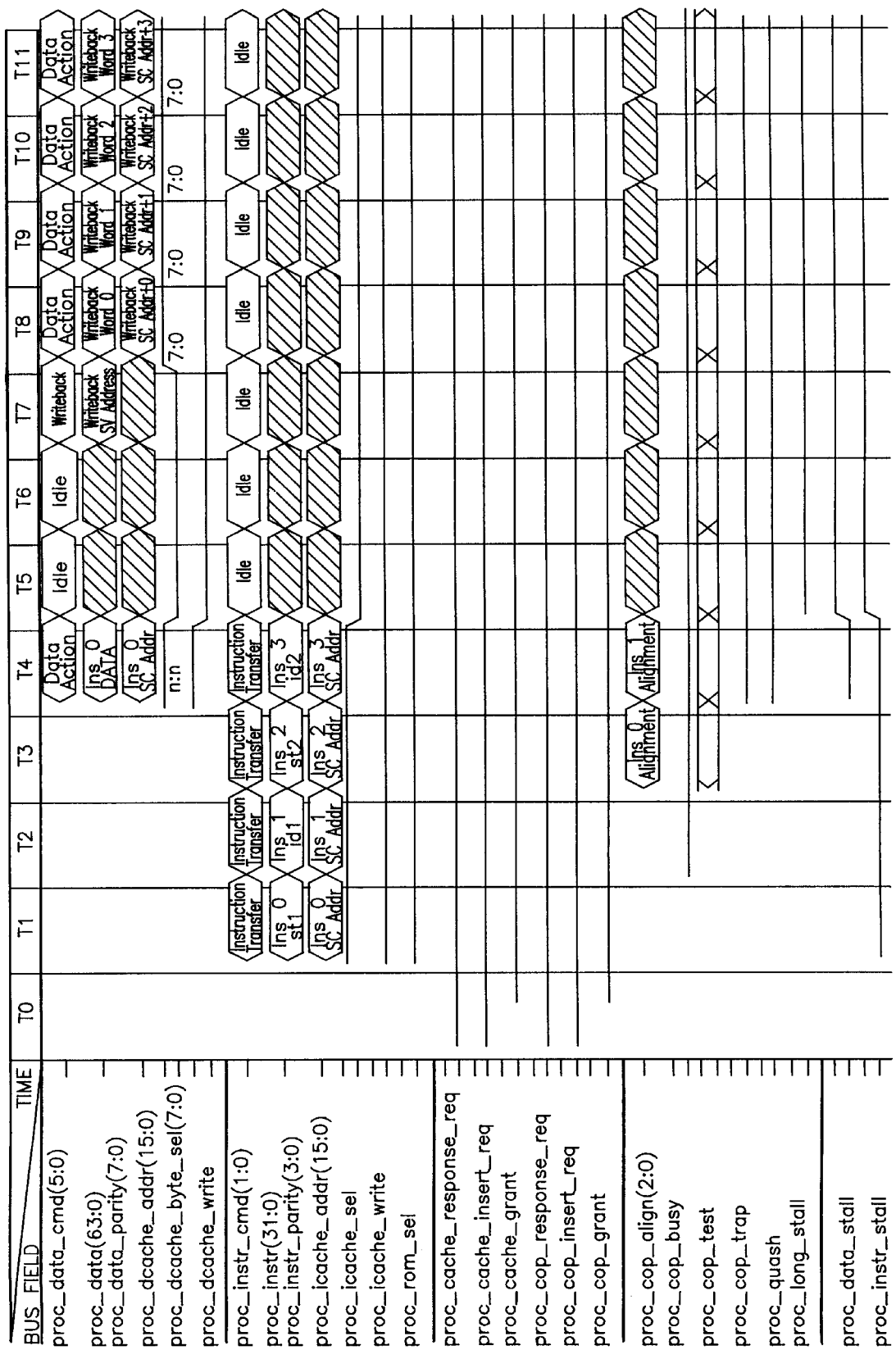
Figures 1, 11H:
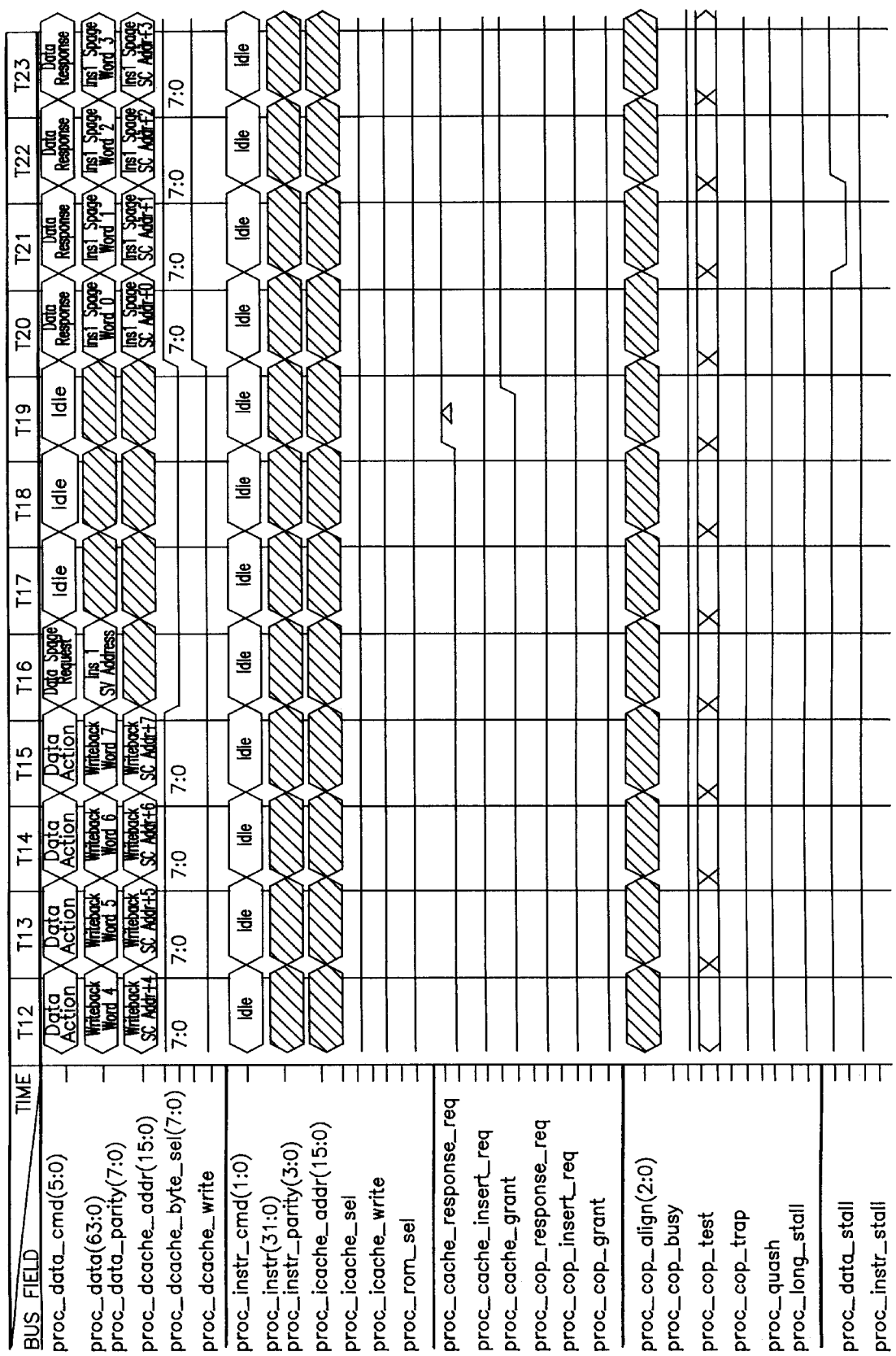
Figures 2, 11H:
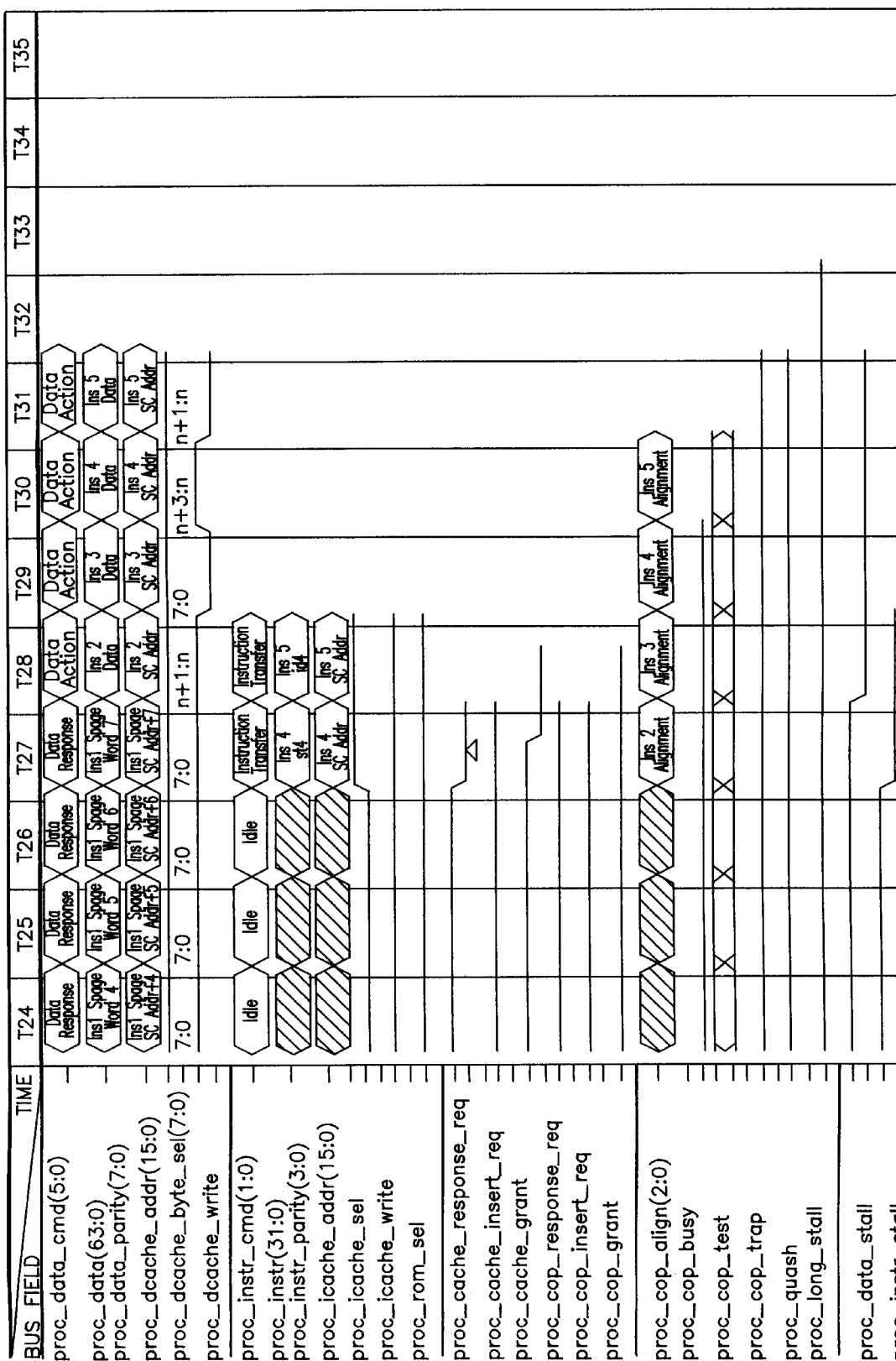
Figure 11I:
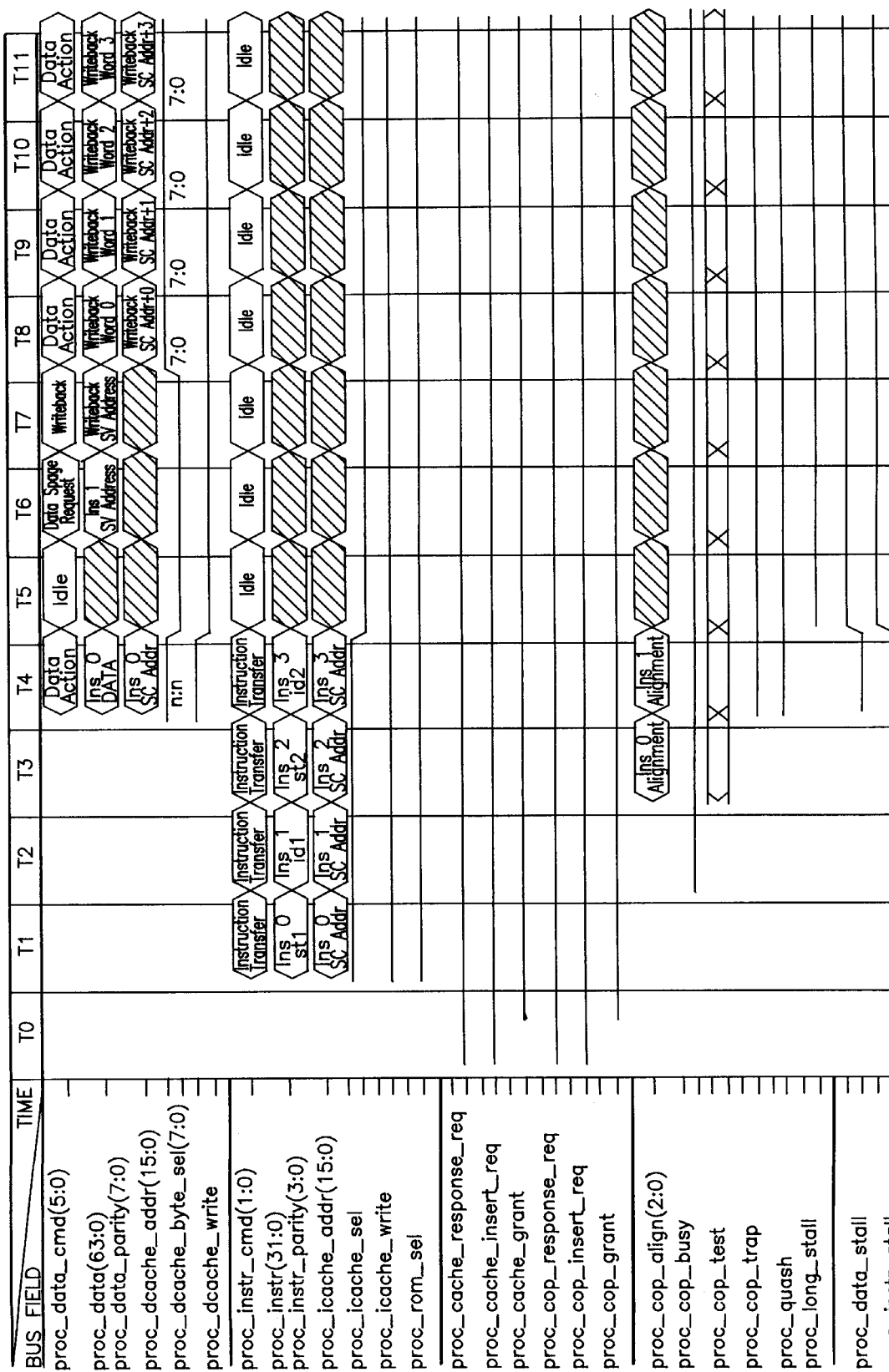
Figures 1, 11I:
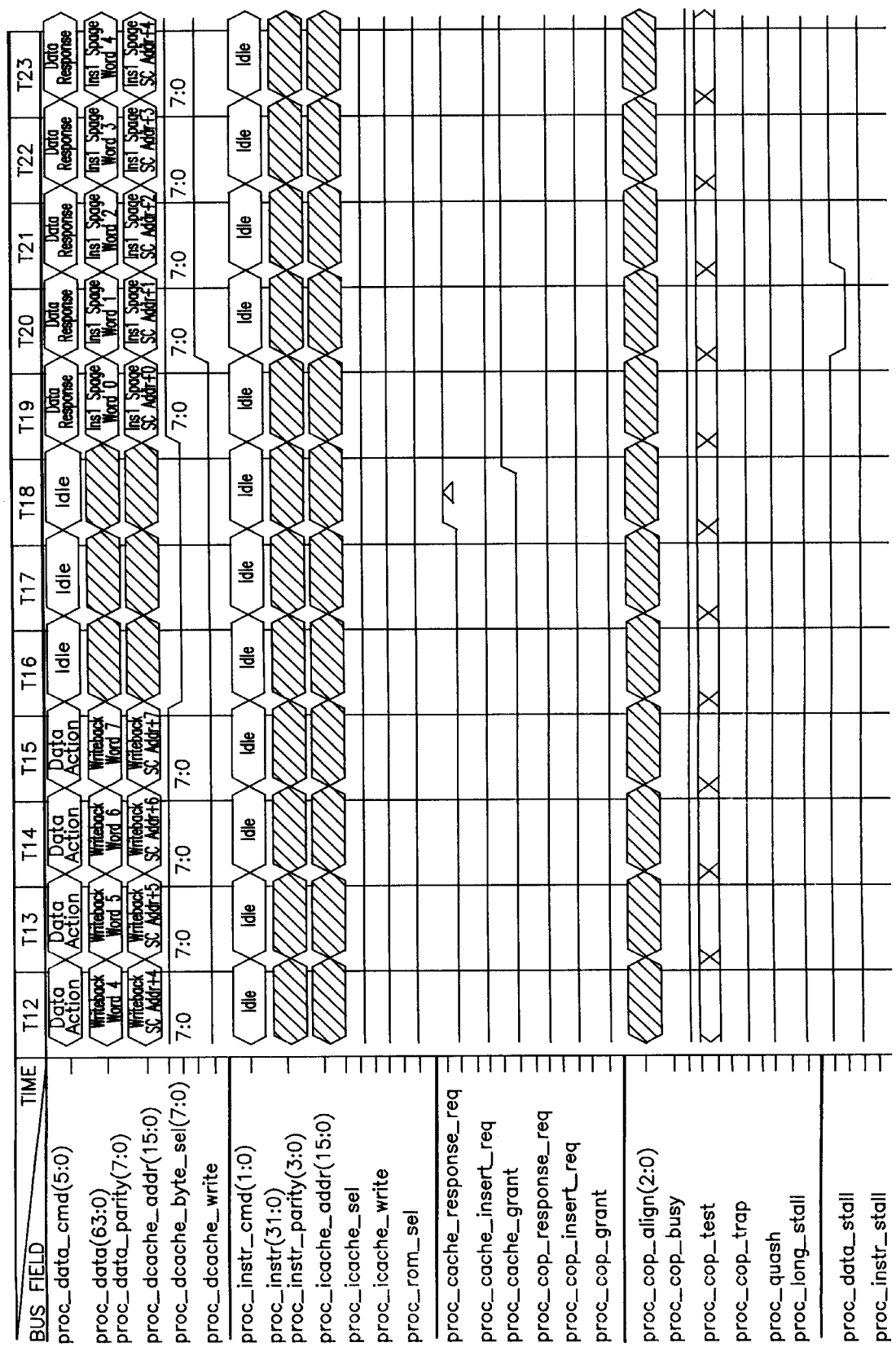
Figures 2, 11I:
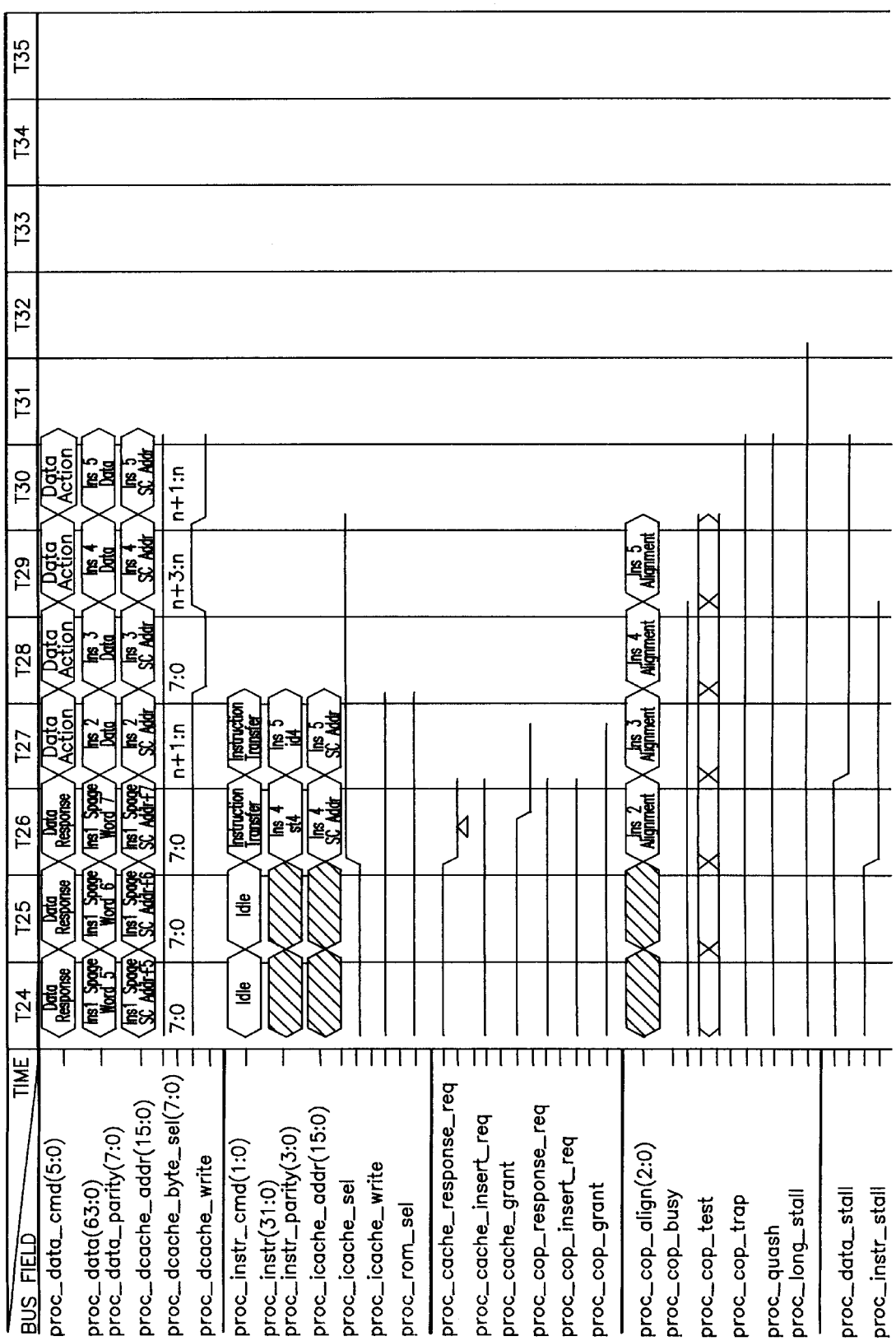
Figure 11J:
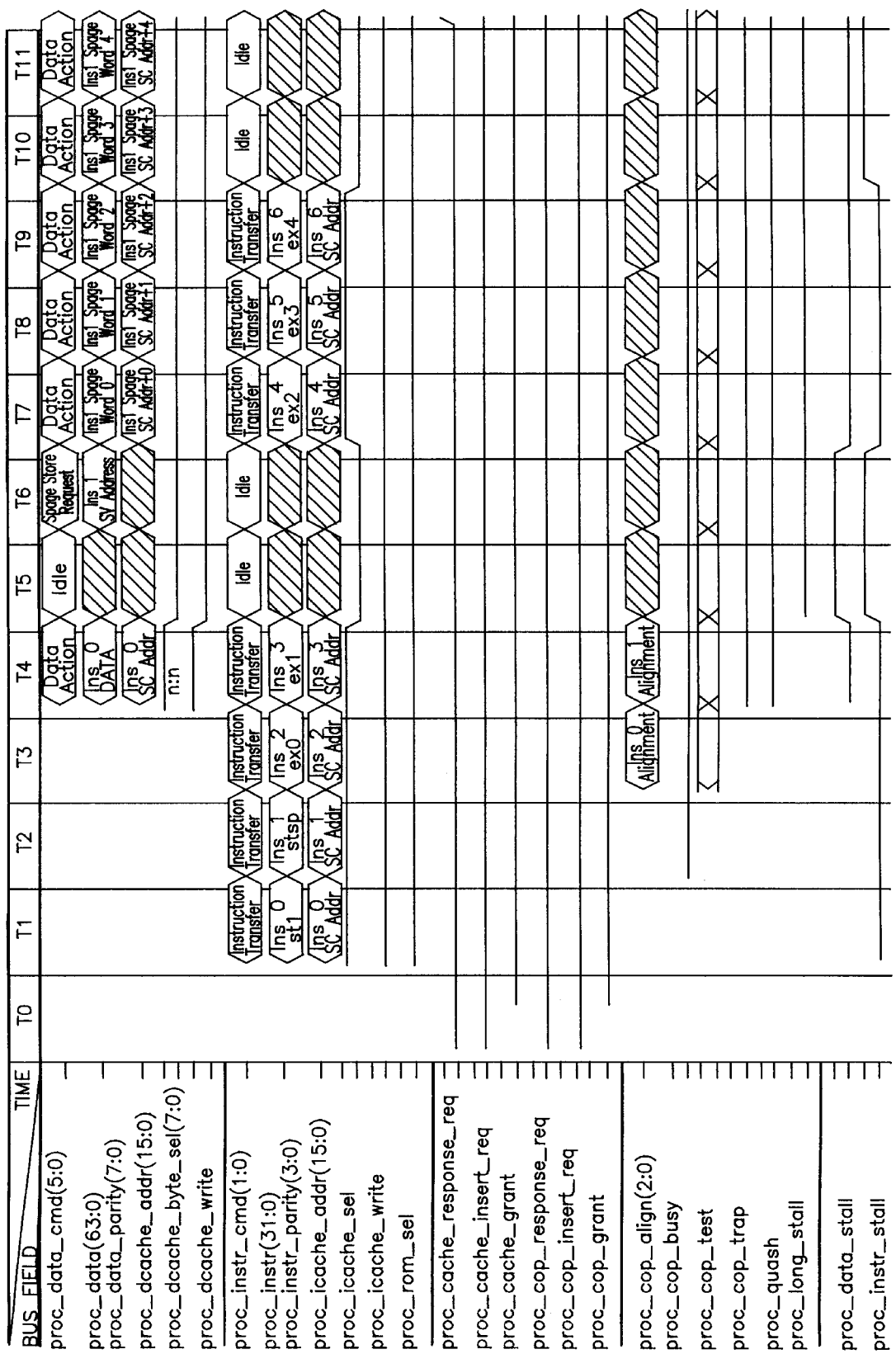
Figures 1, 11J:
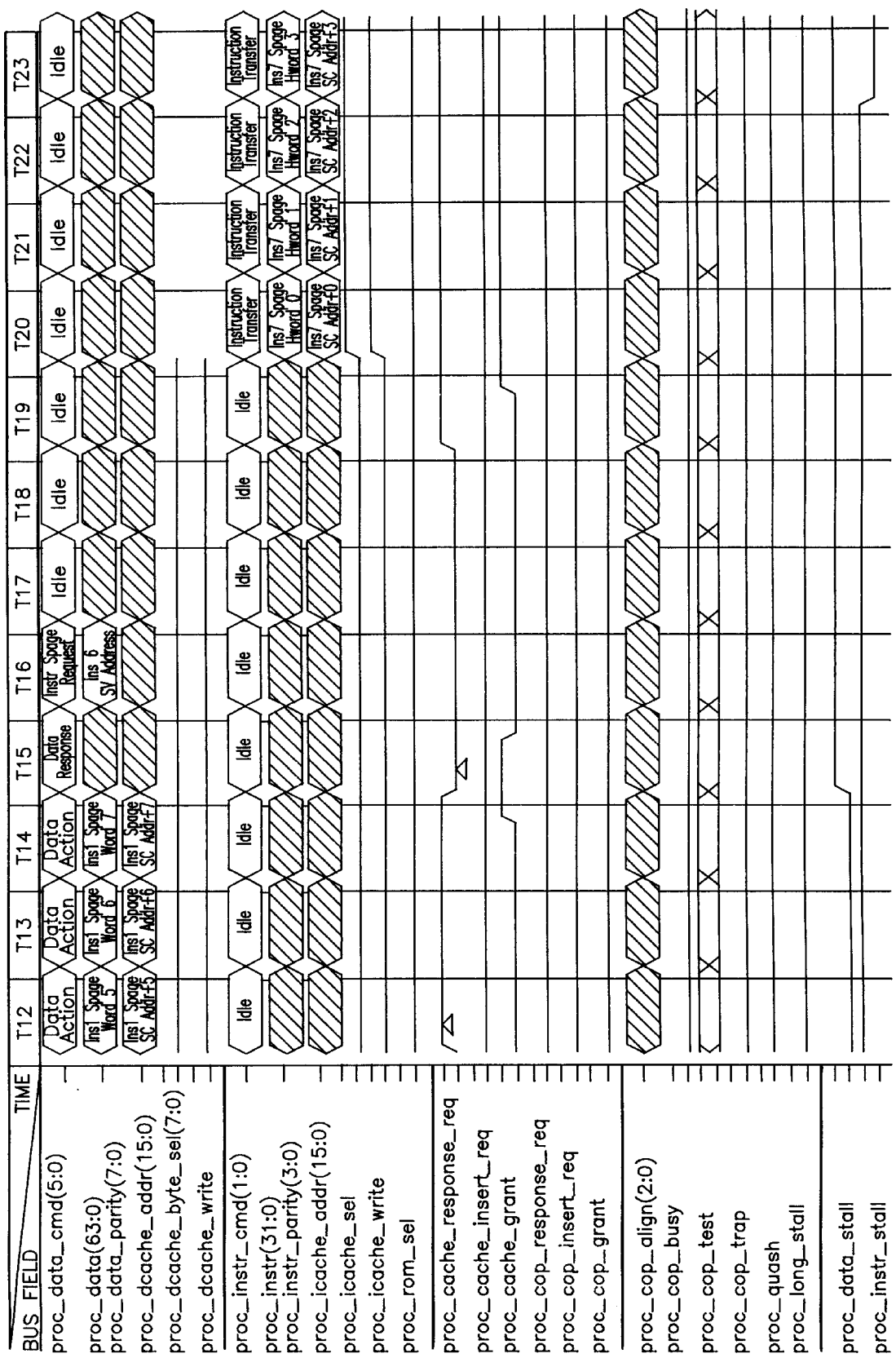
Figures 2, 11J:
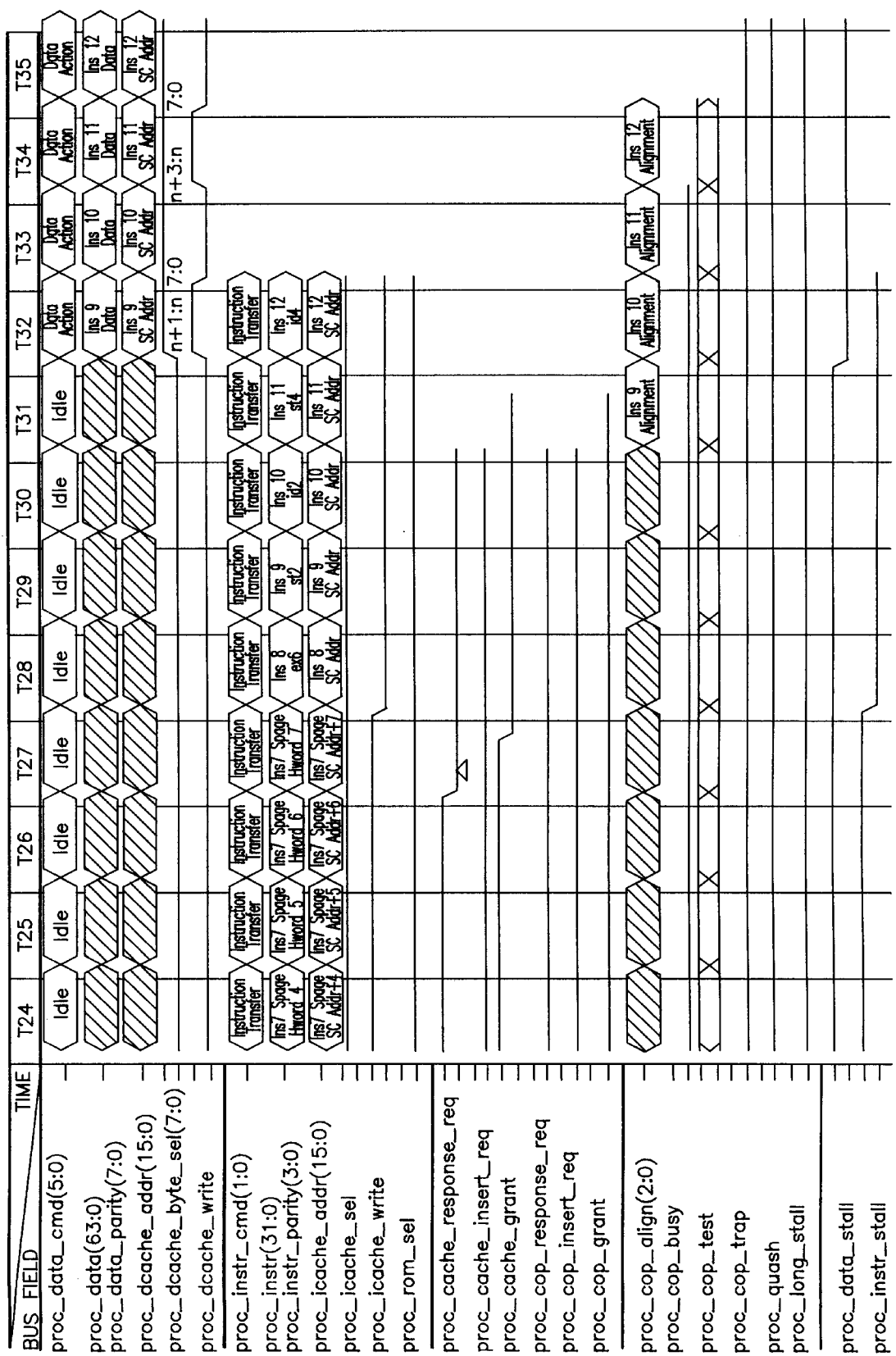
Figure 11K:
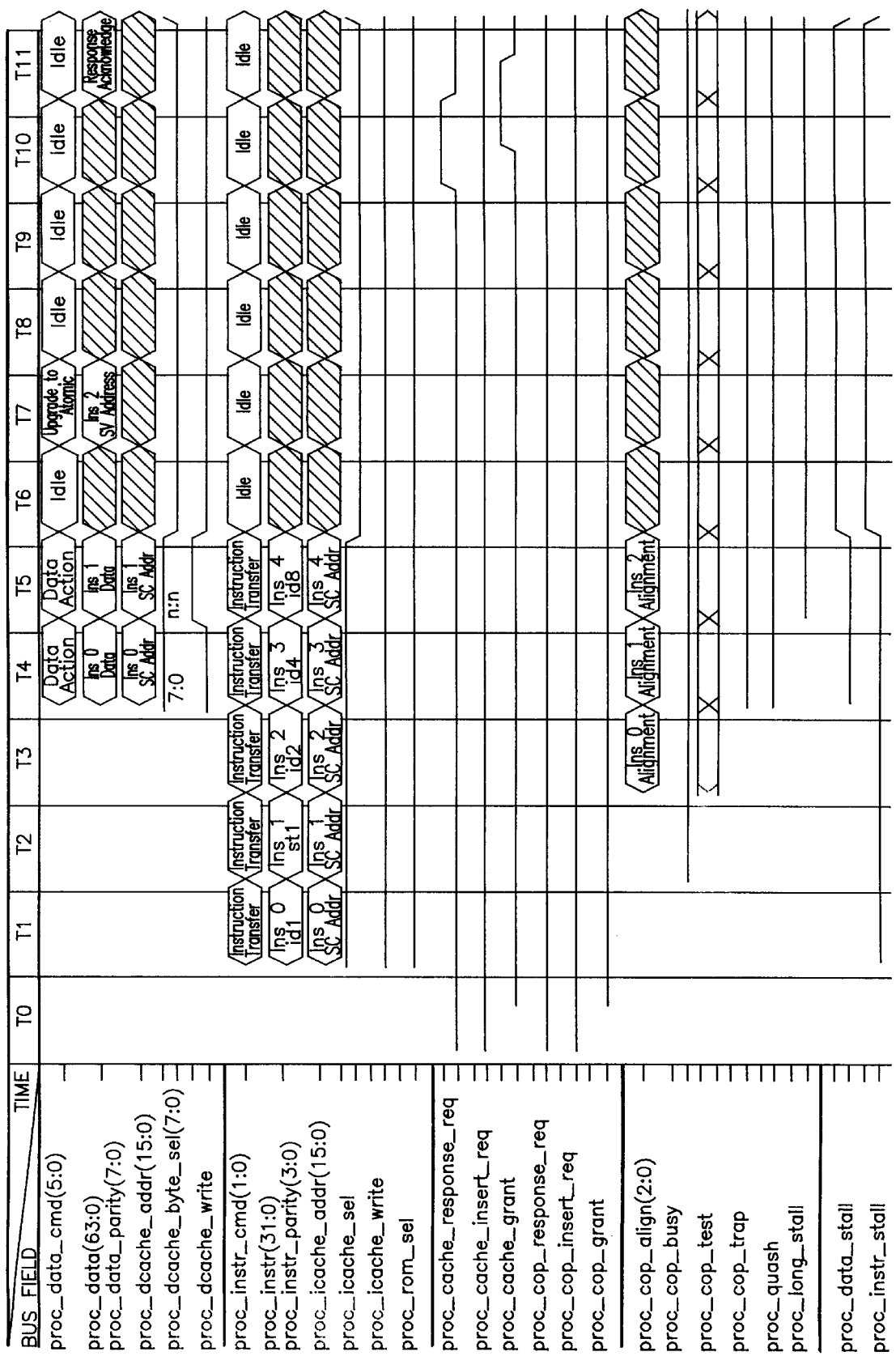
Figure 12A:
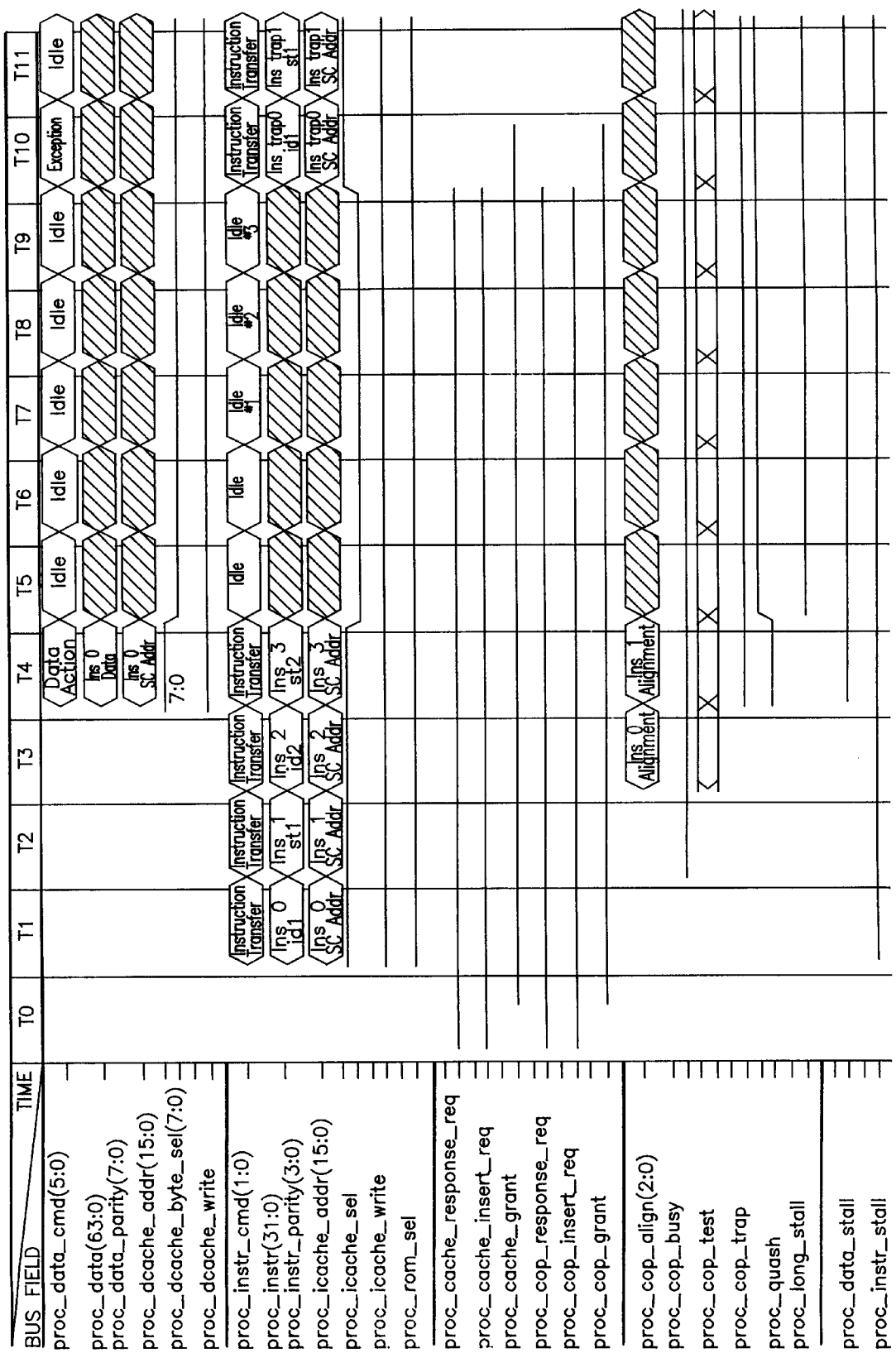
FIG. 12a through FIG. 12b-2 are timing diagrams depicting the timing of trap operations.
Figures 1, 12A:
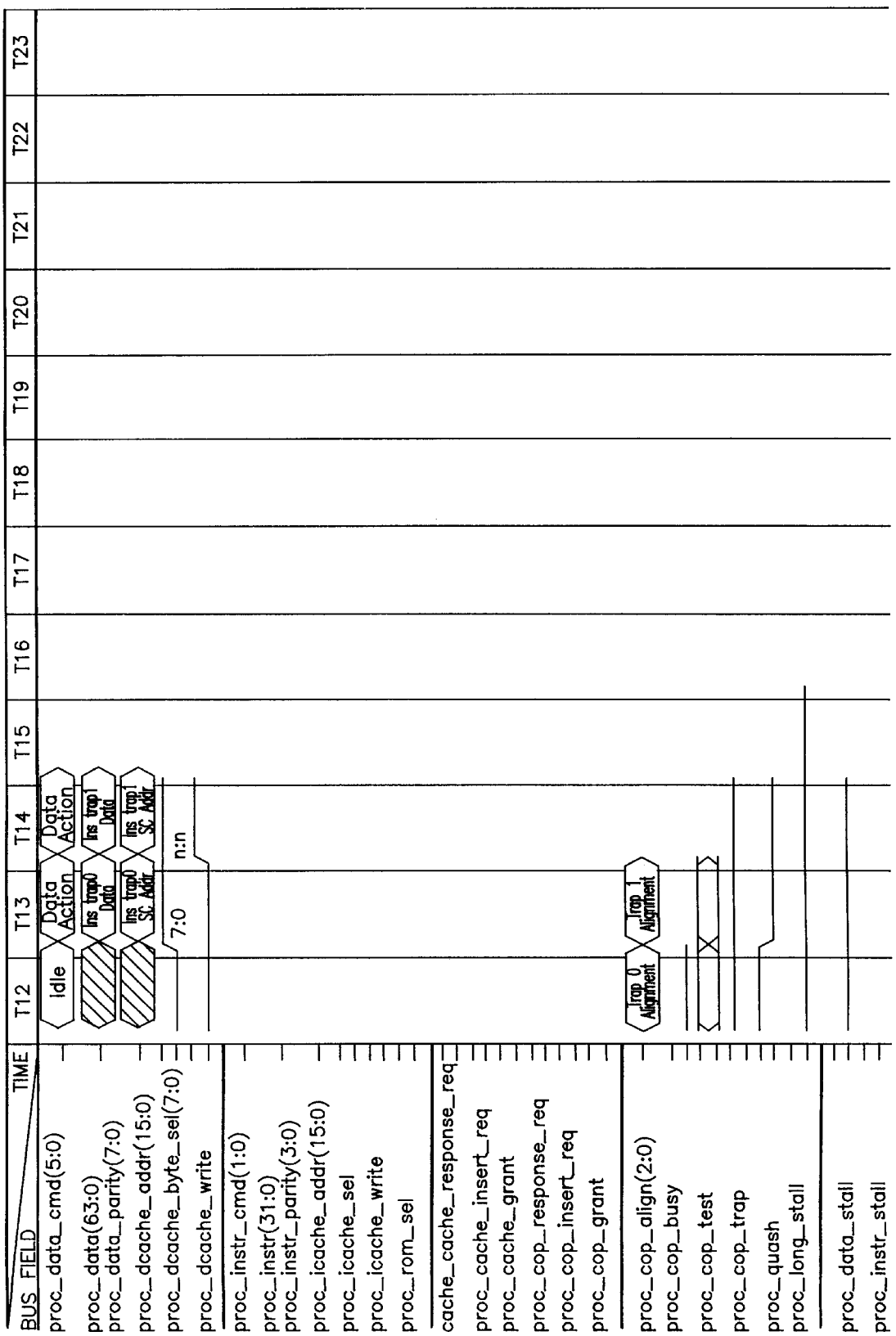
Figure 12B:
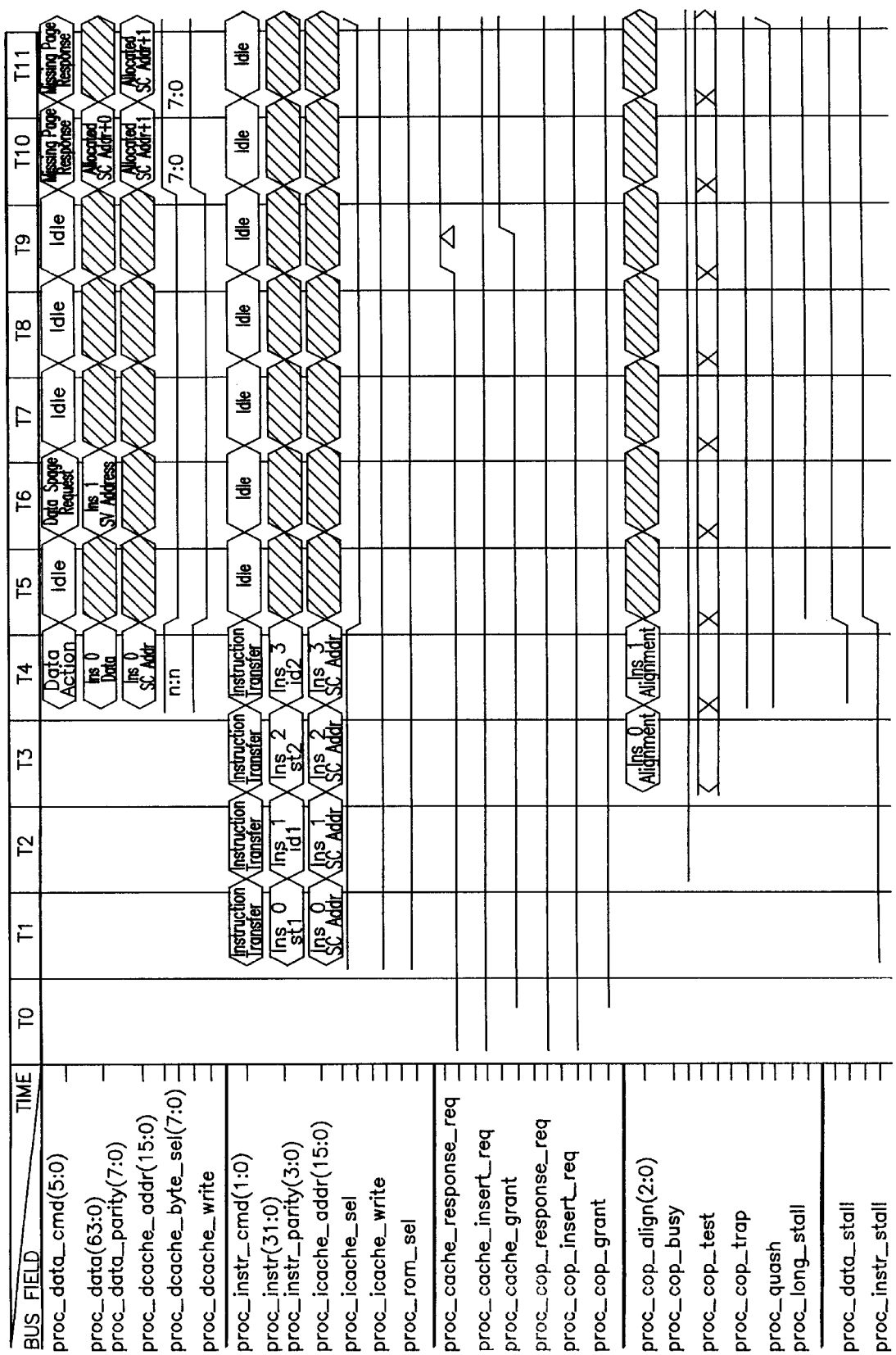
Figures 1, 12B:
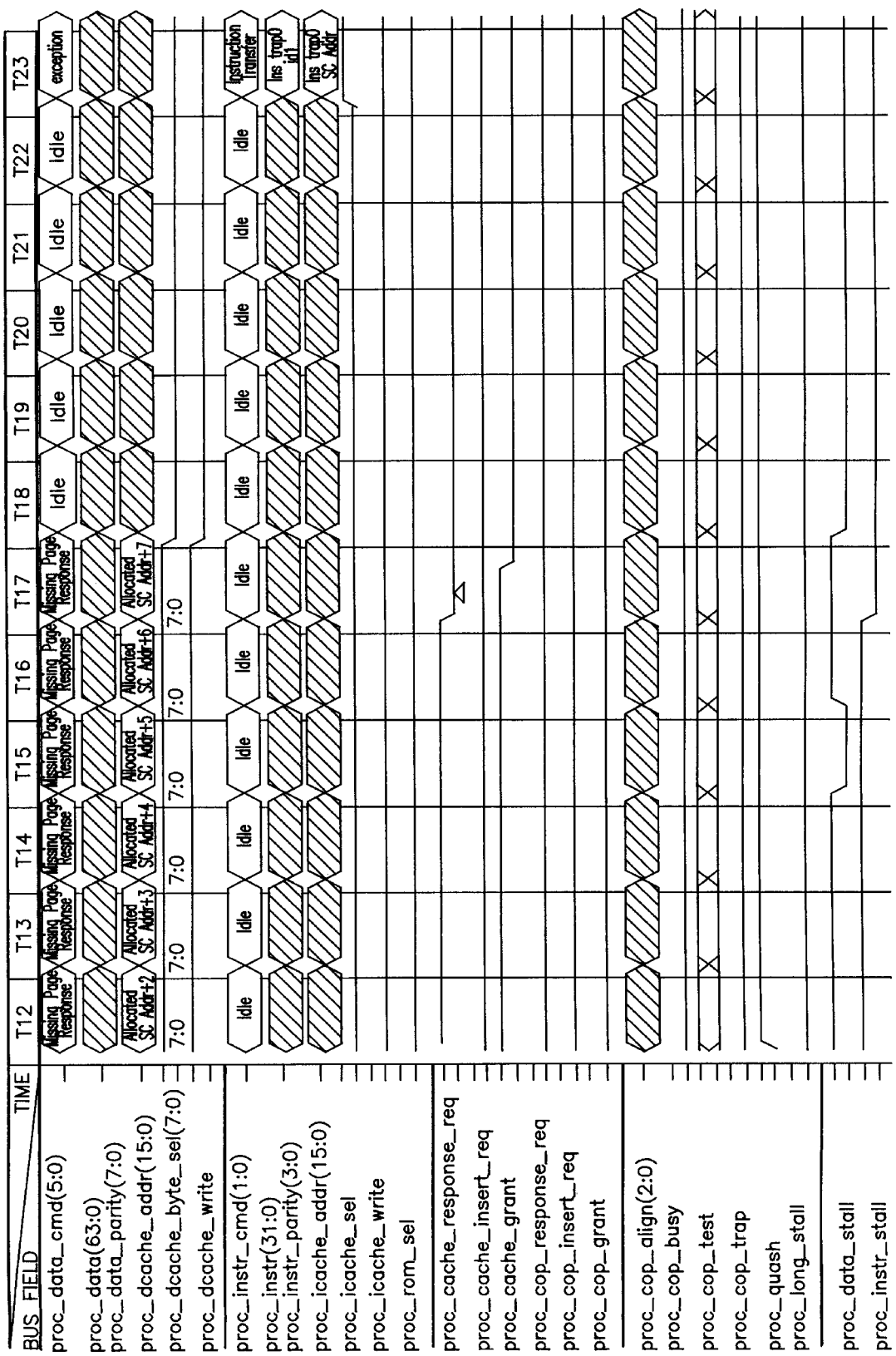
Figures 2, 12B:
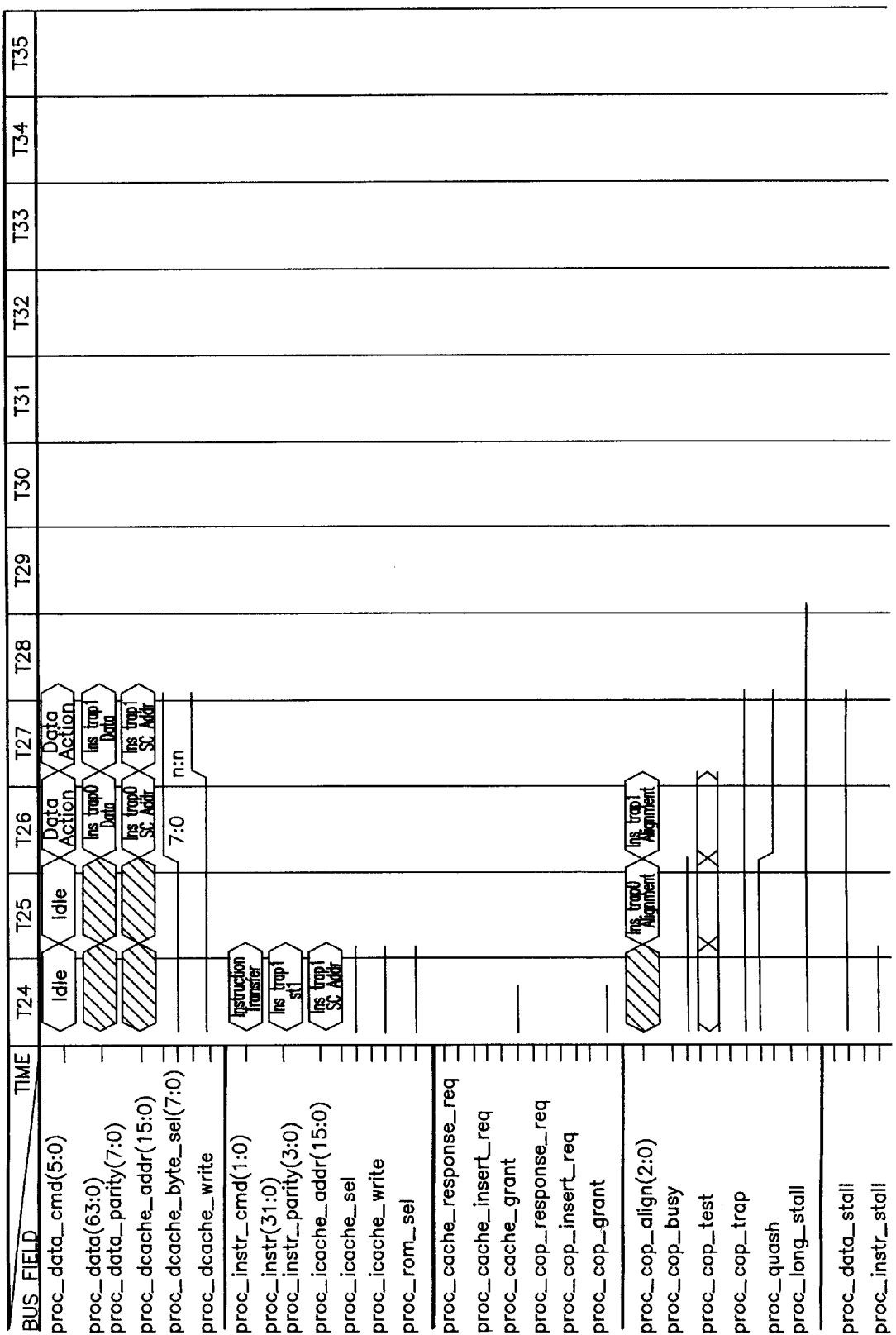
Figure 13A:
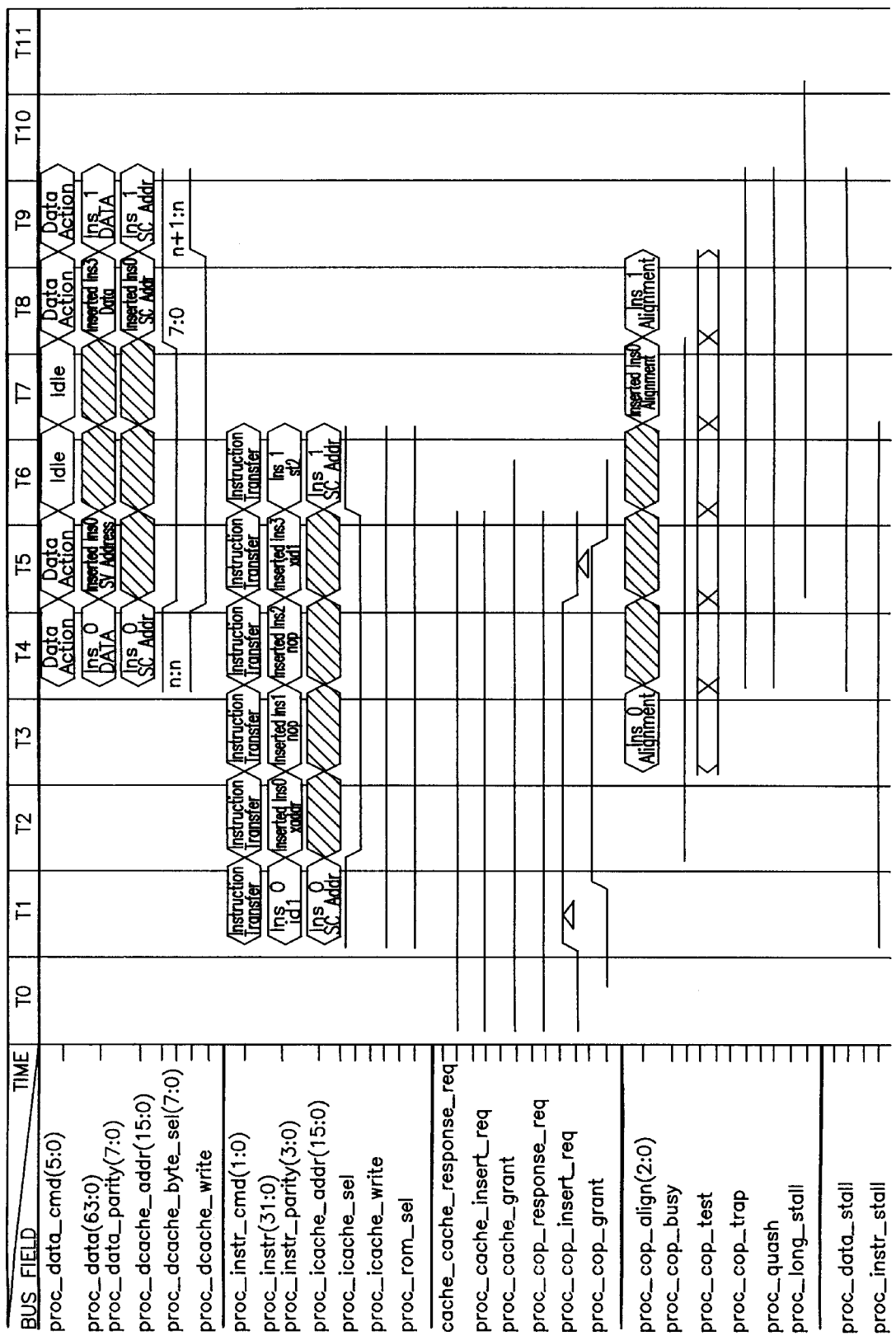
Figure 13B:
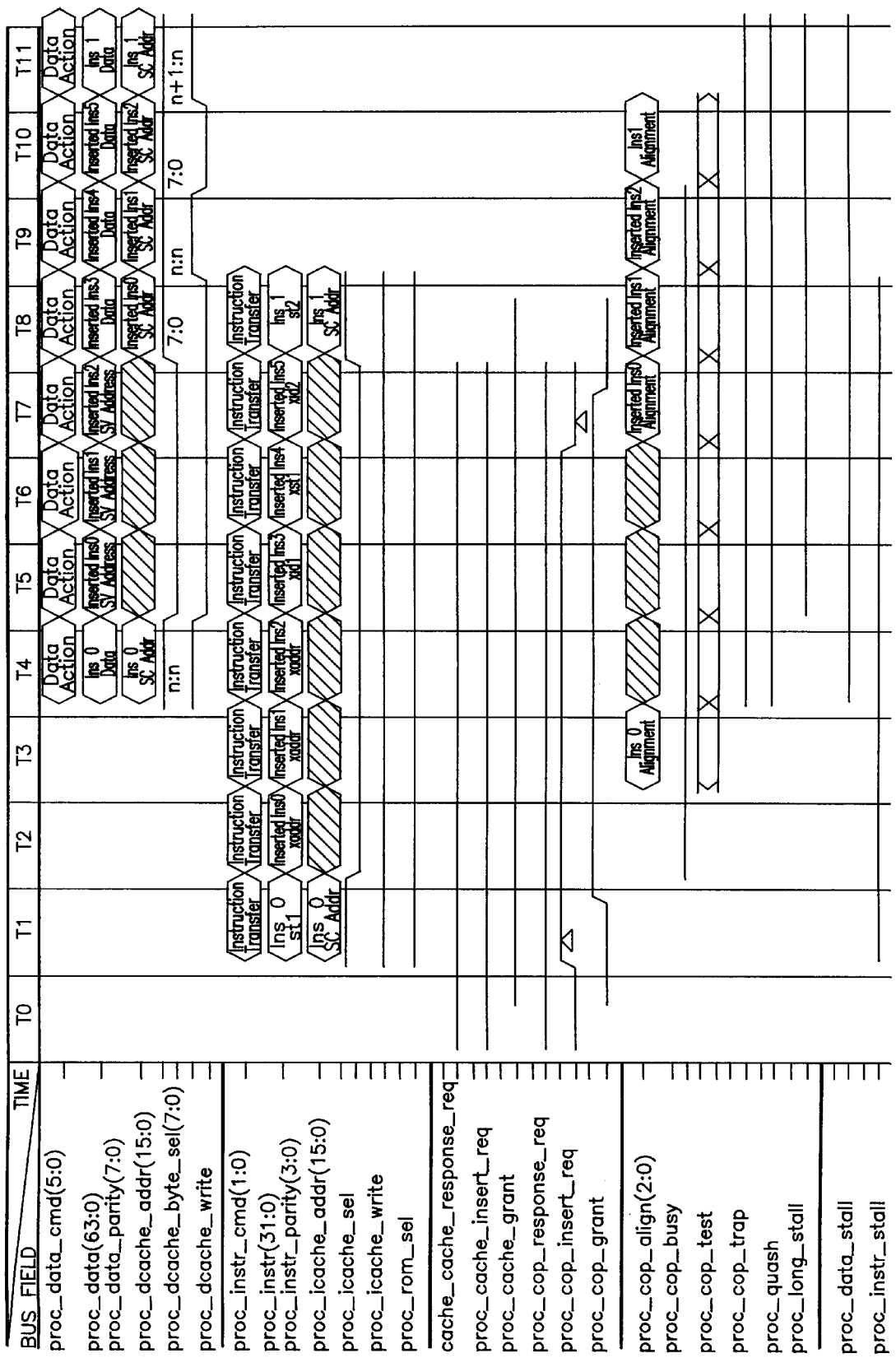
Figure 13C:
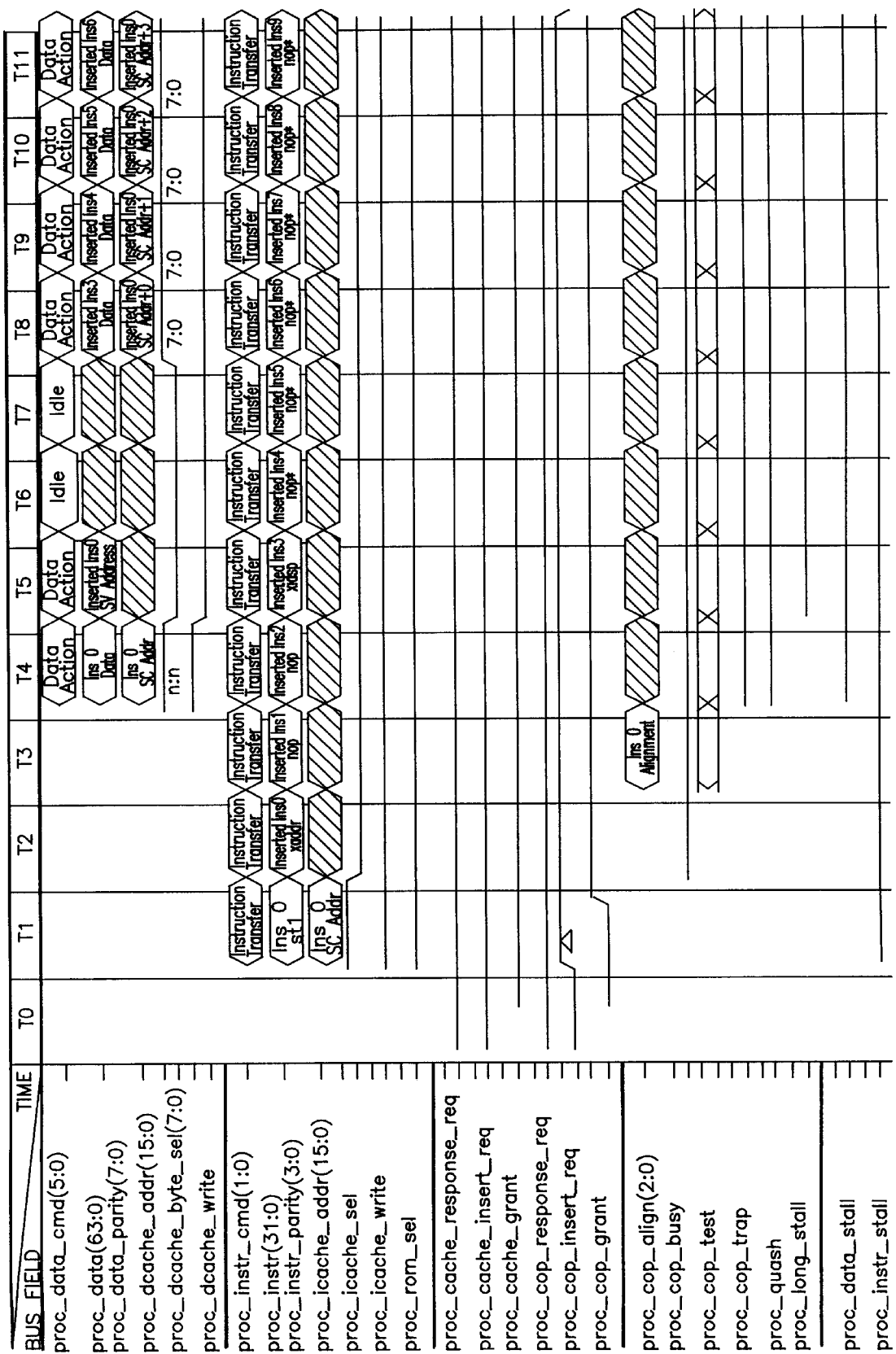
Figures 1, 13C:
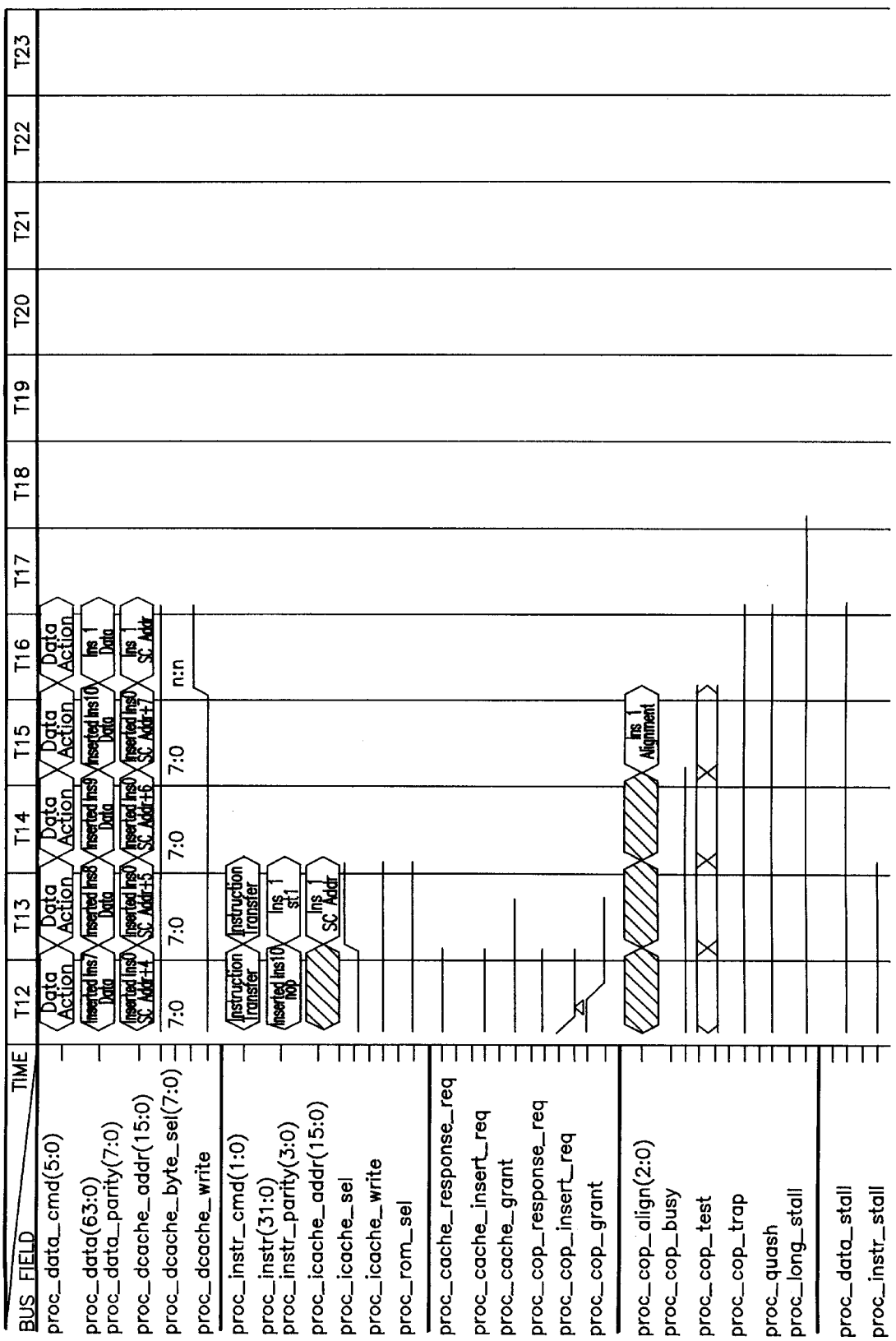
Figure 13D:
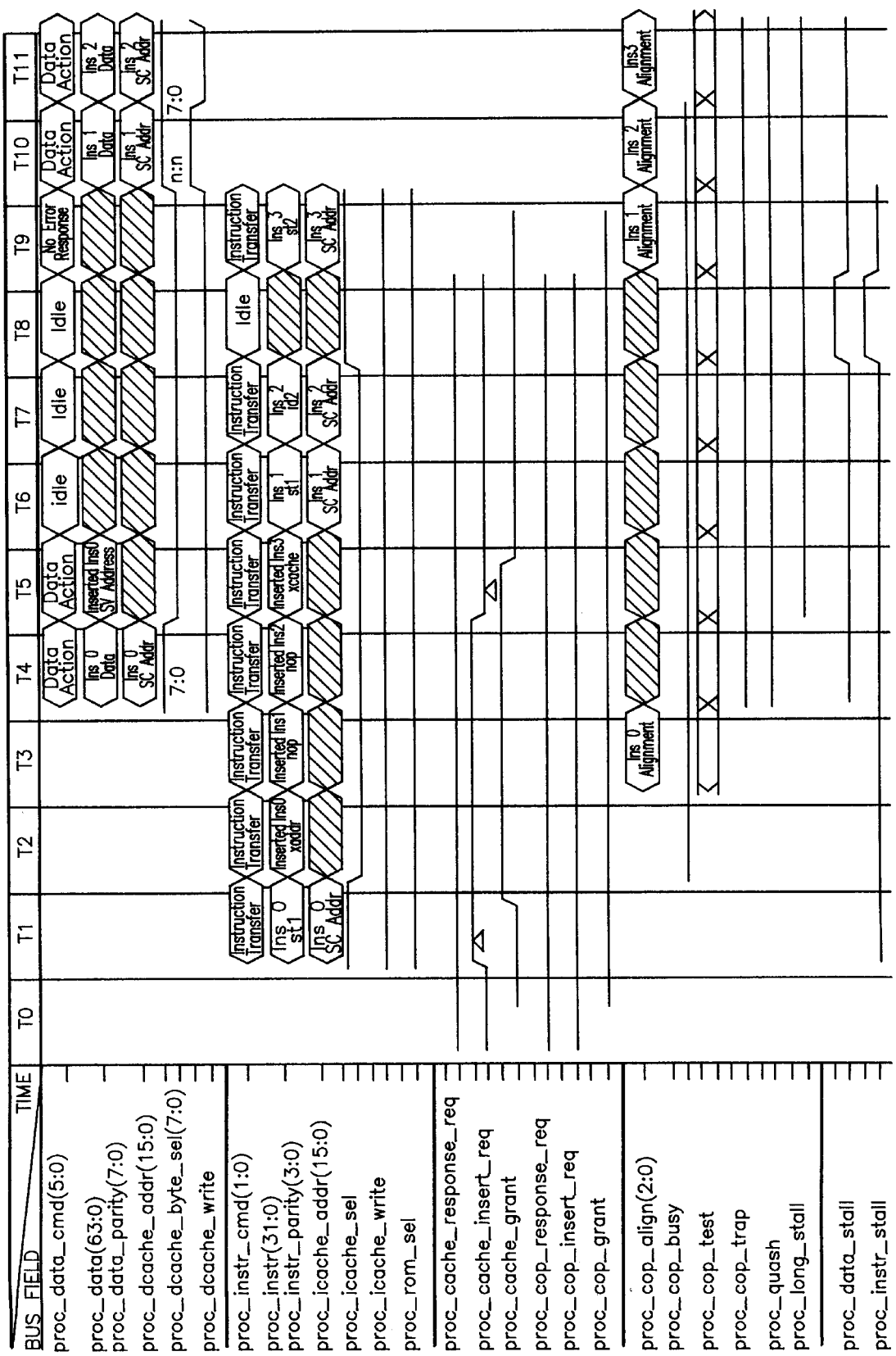
Figure 13E:
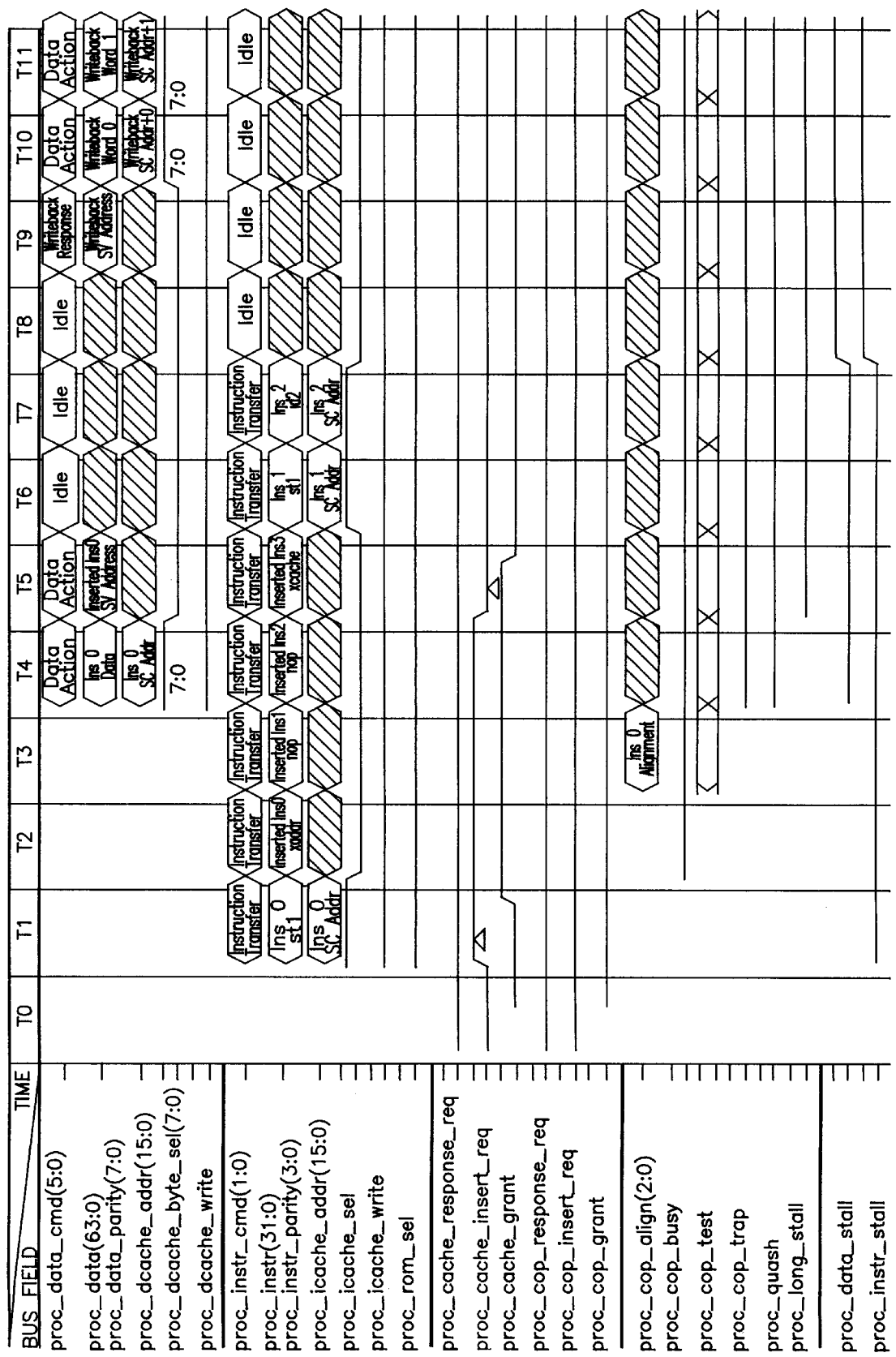
Figures 1, 13E:
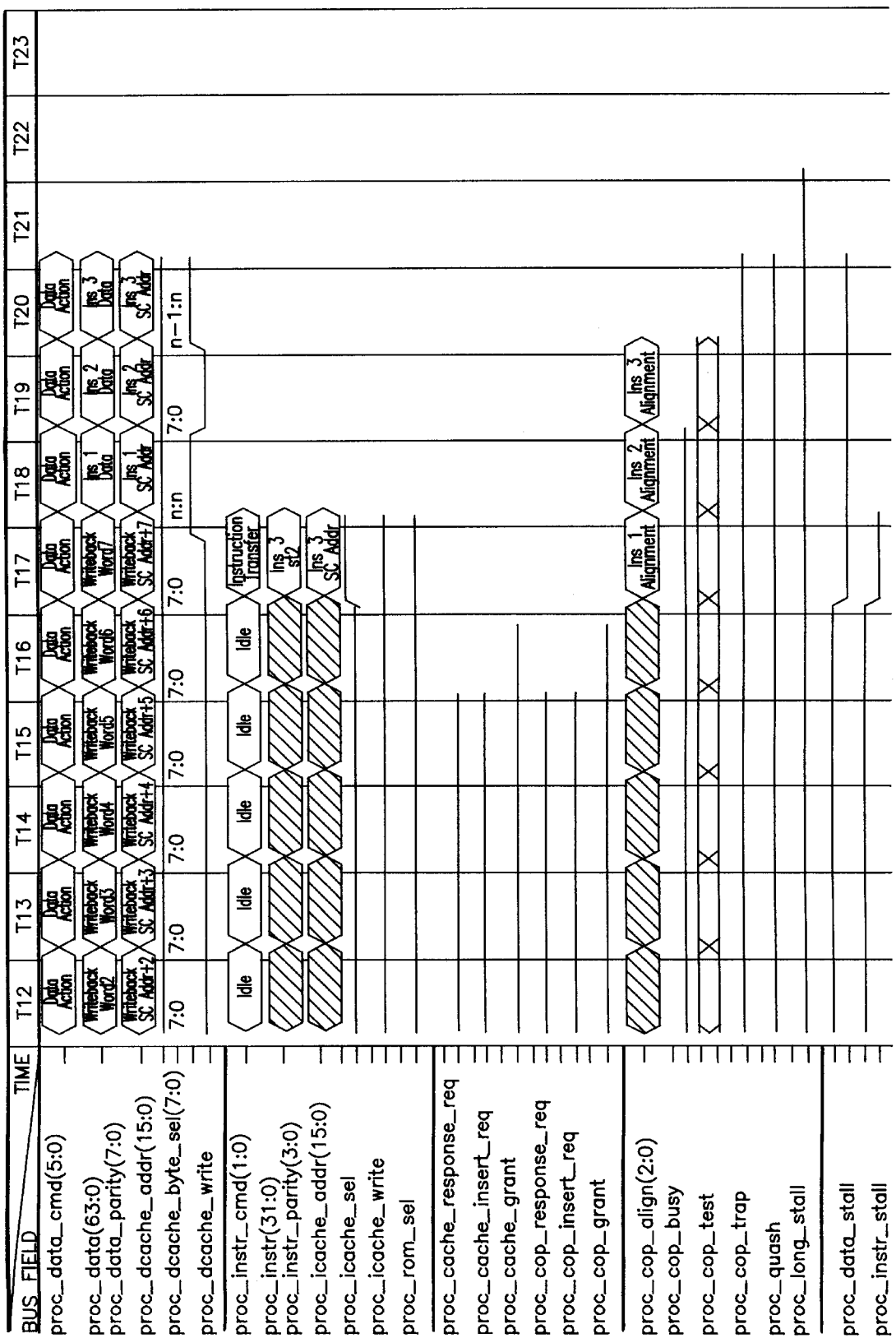
Figure 13F:
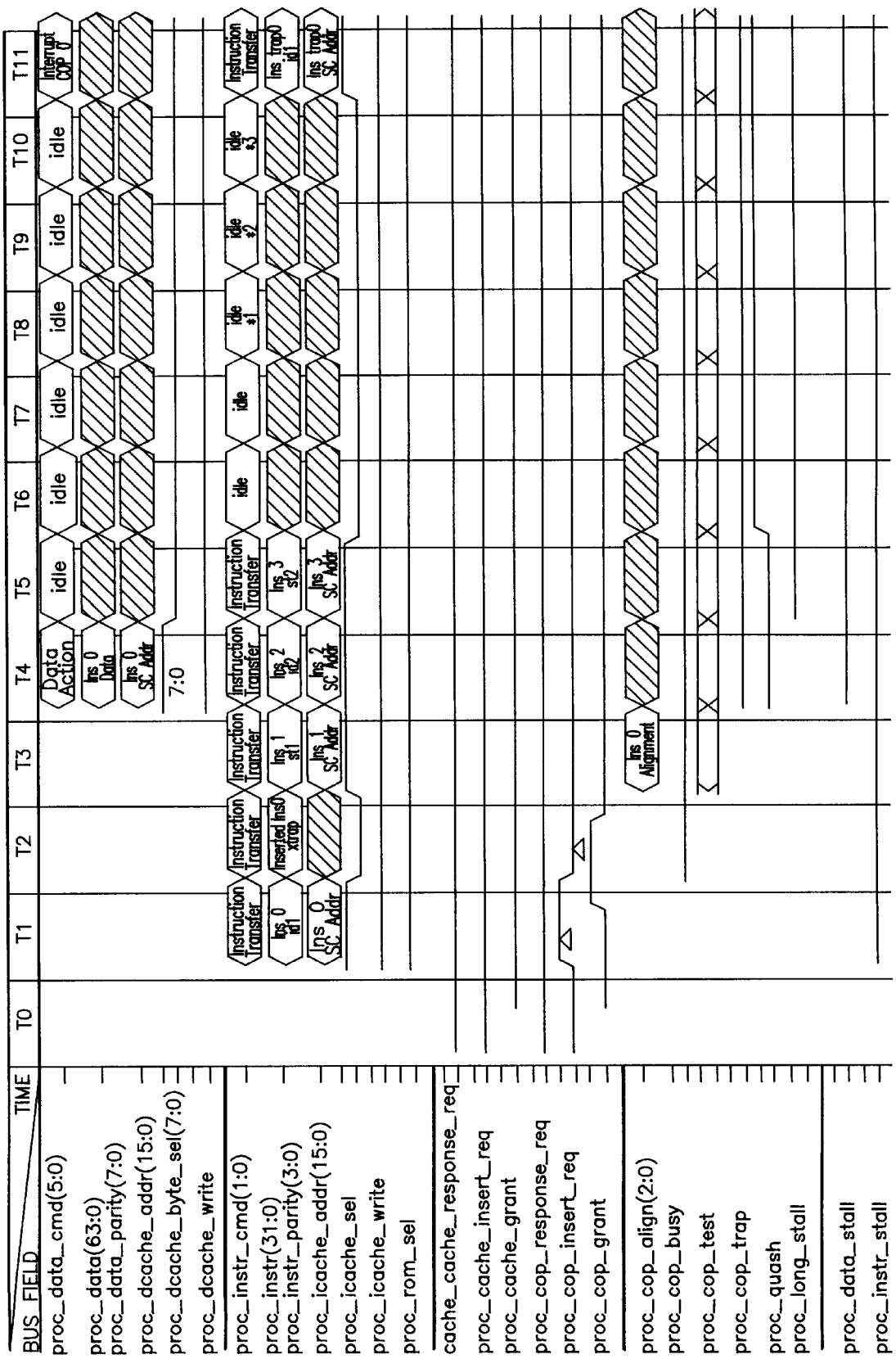
Figures 1, 13F:
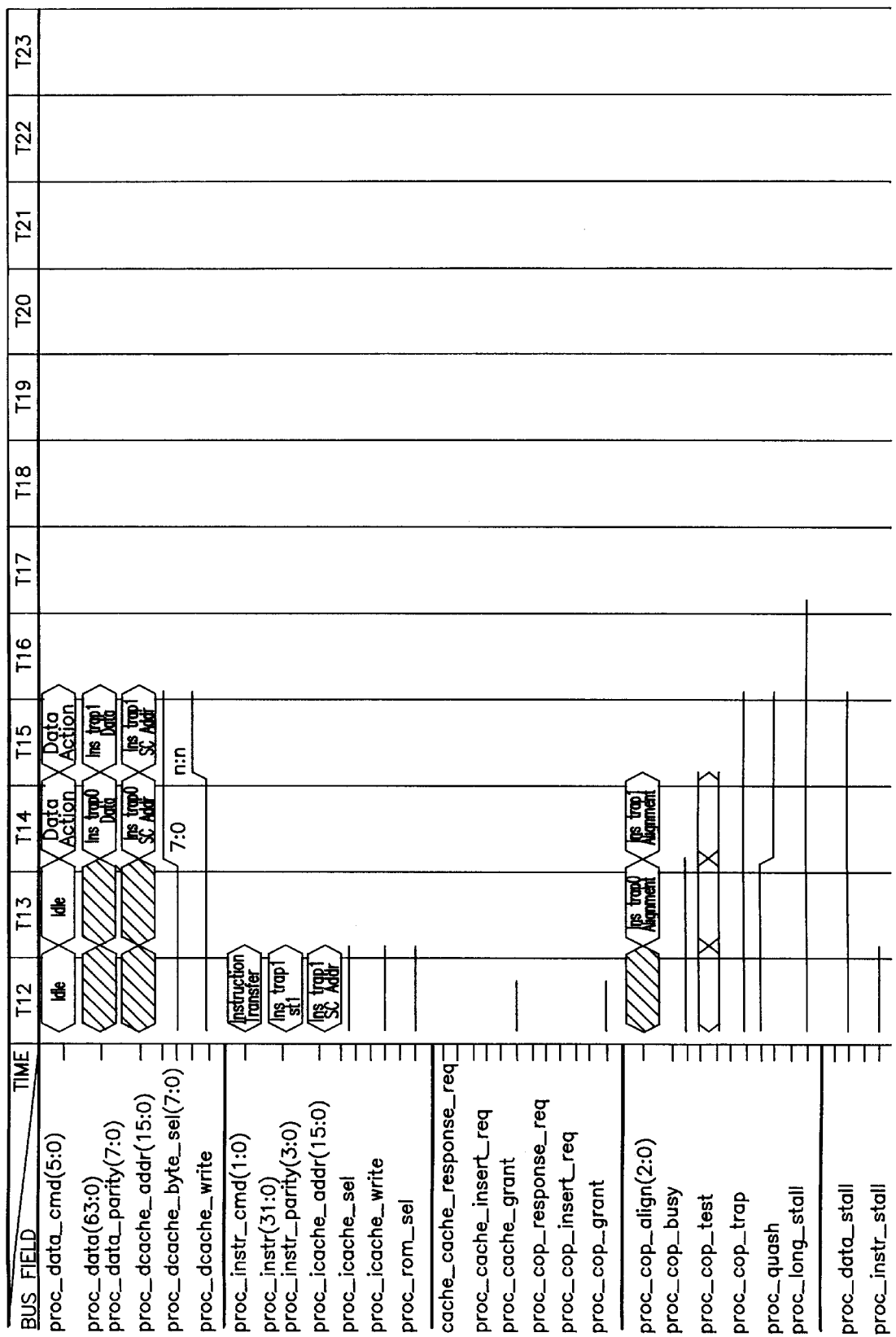
Figure 13G:
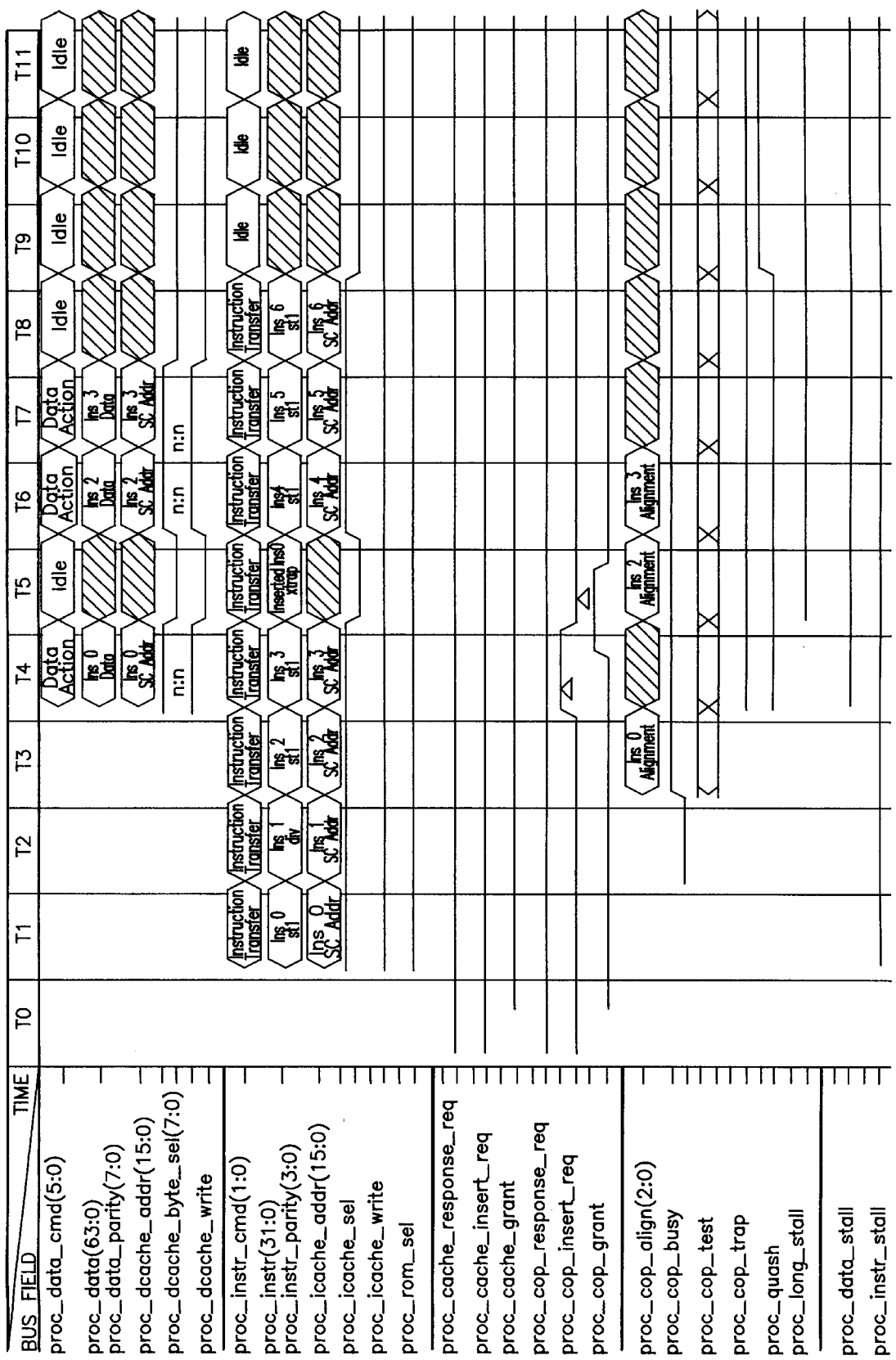
Figures 1, 13G:
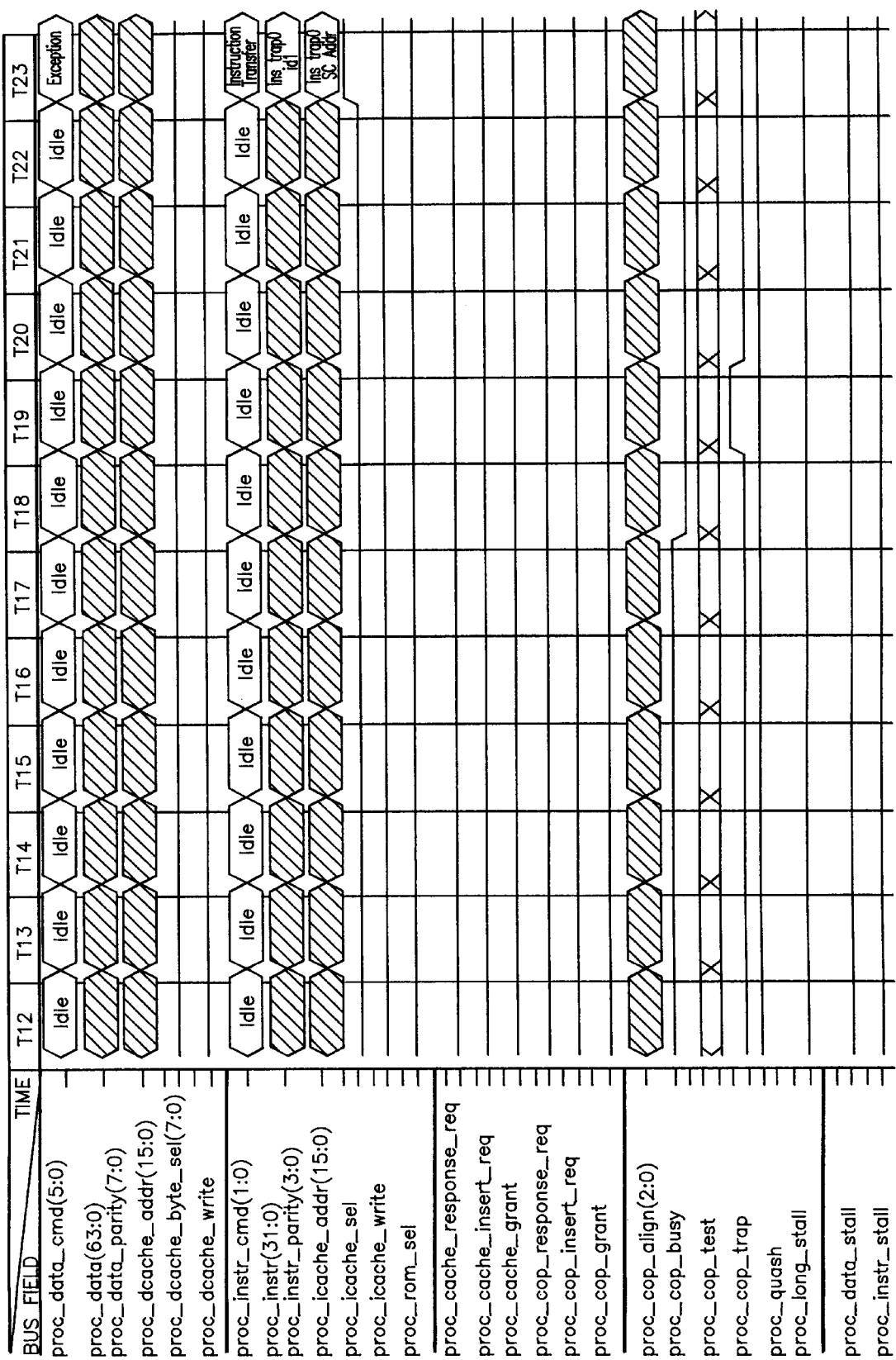
Figures 2, 13G:
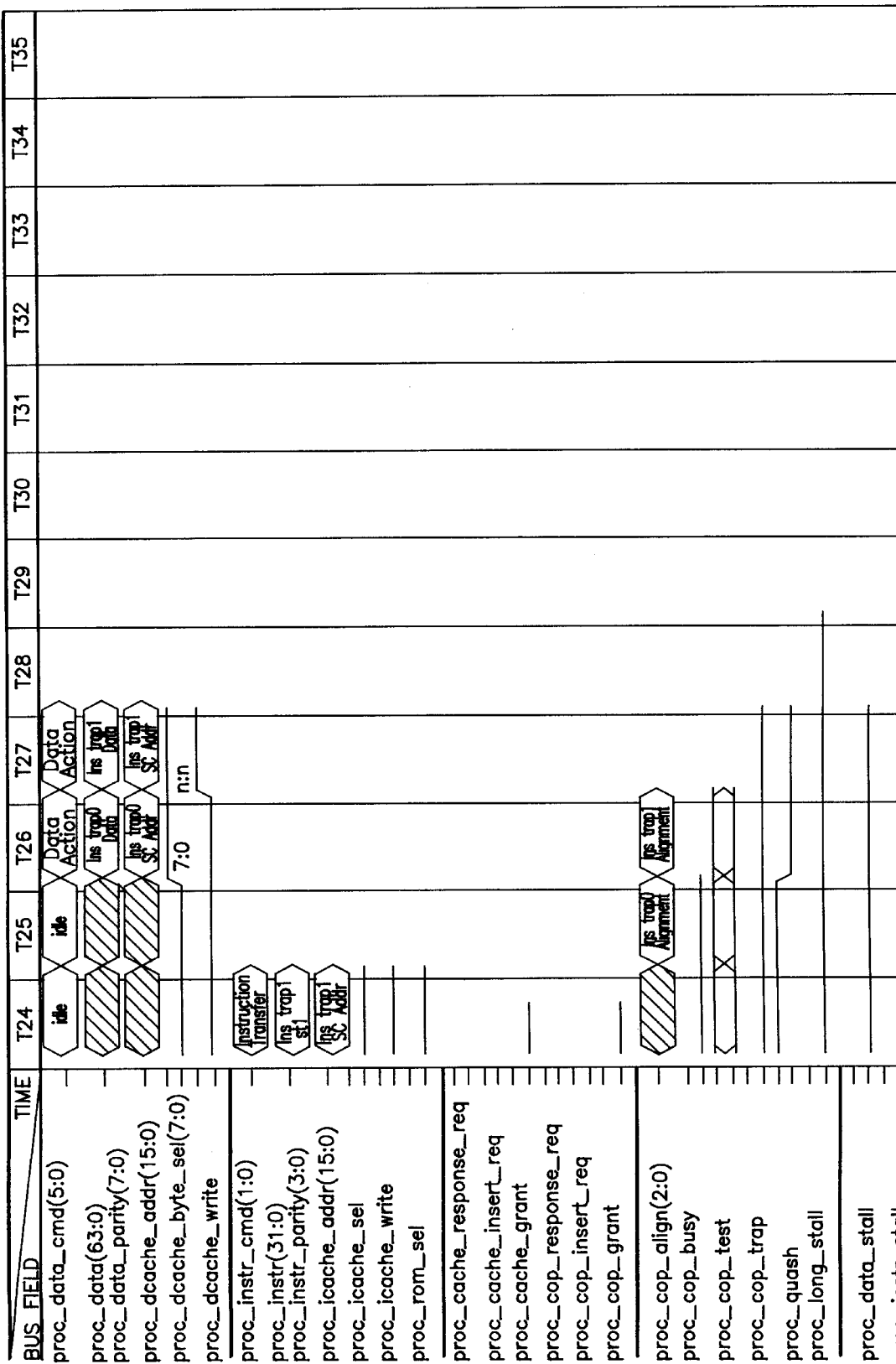
Figure 13H:
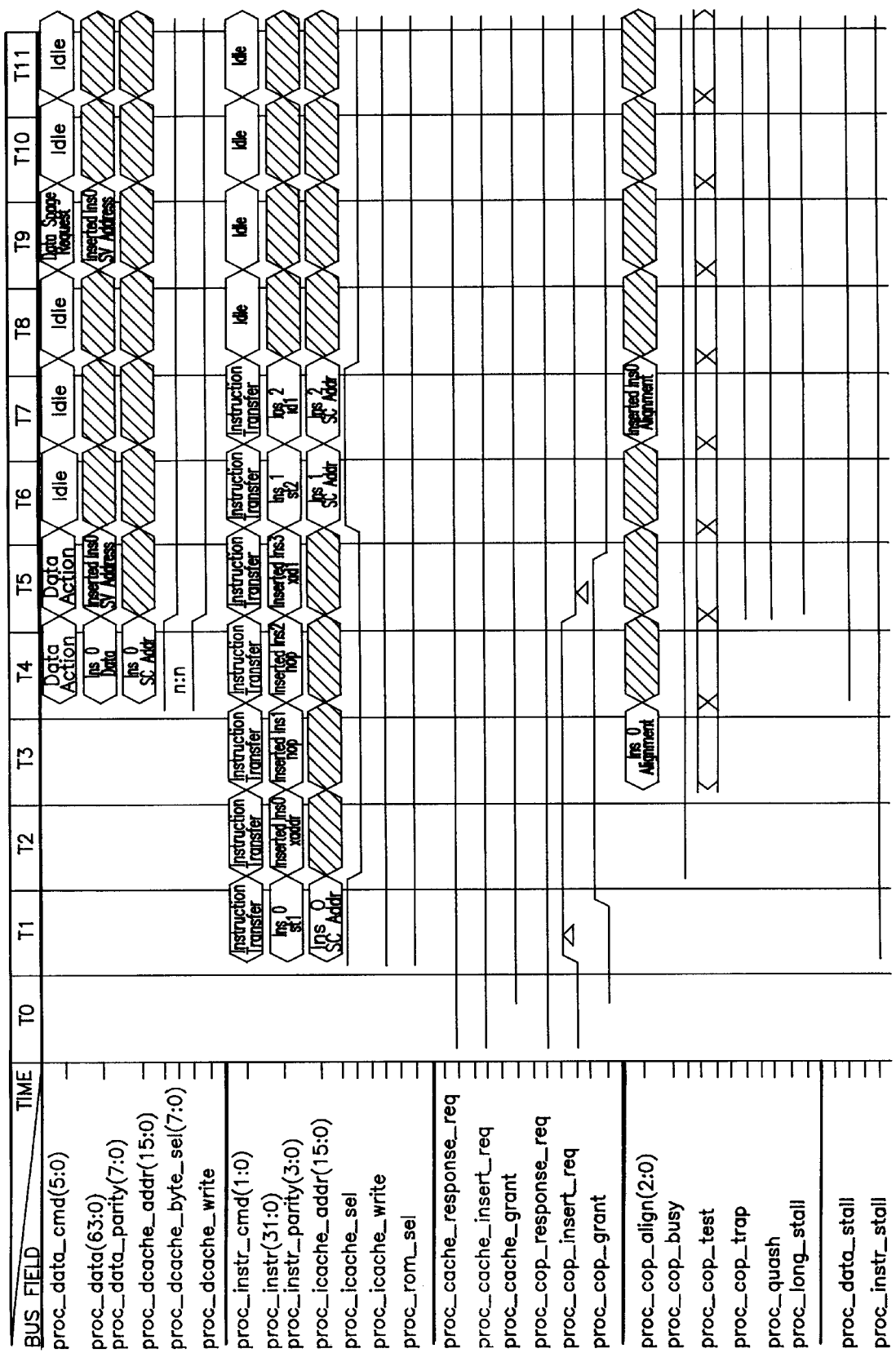
Figures 1, 13H:
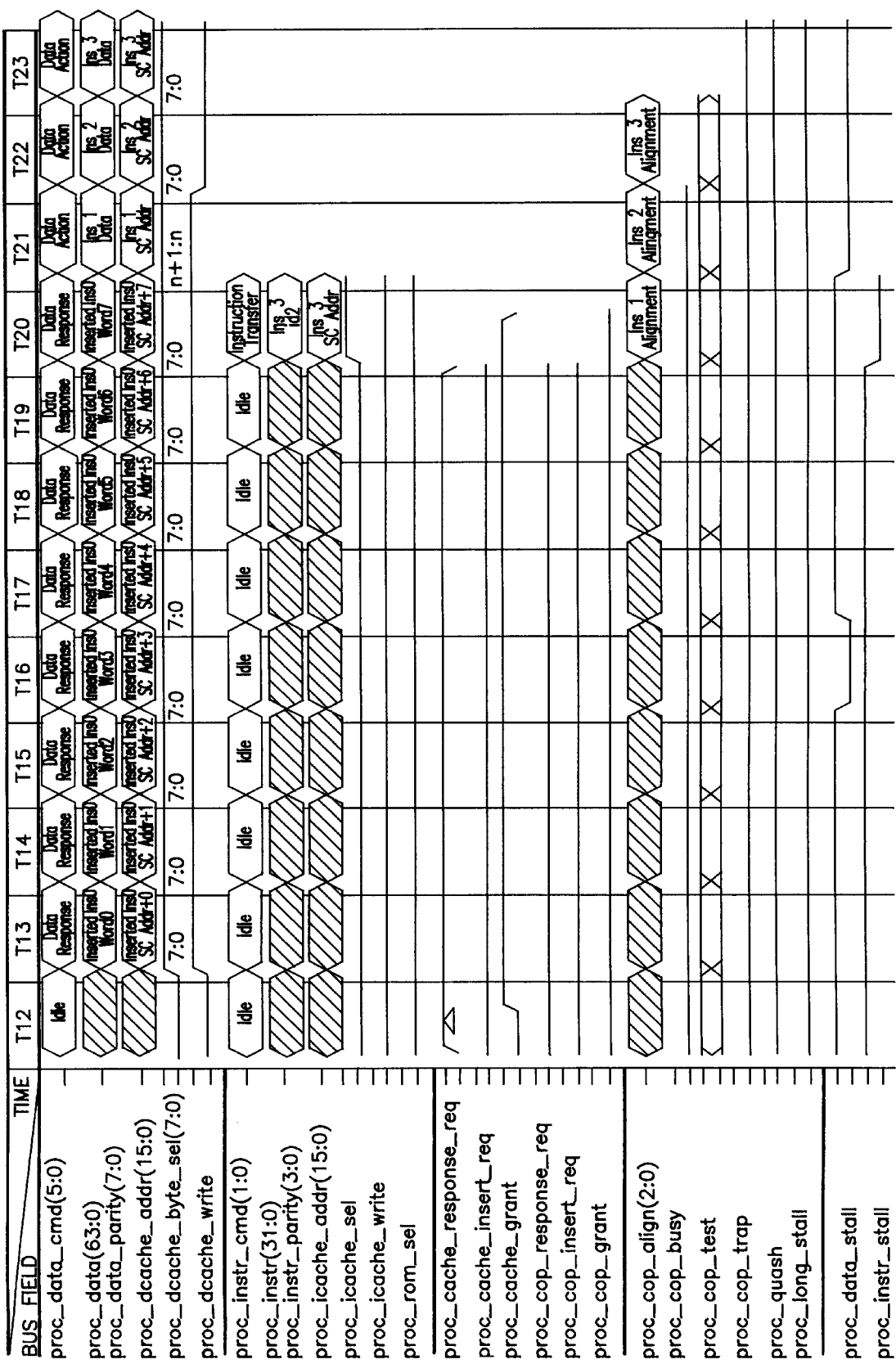
Figure 13I:
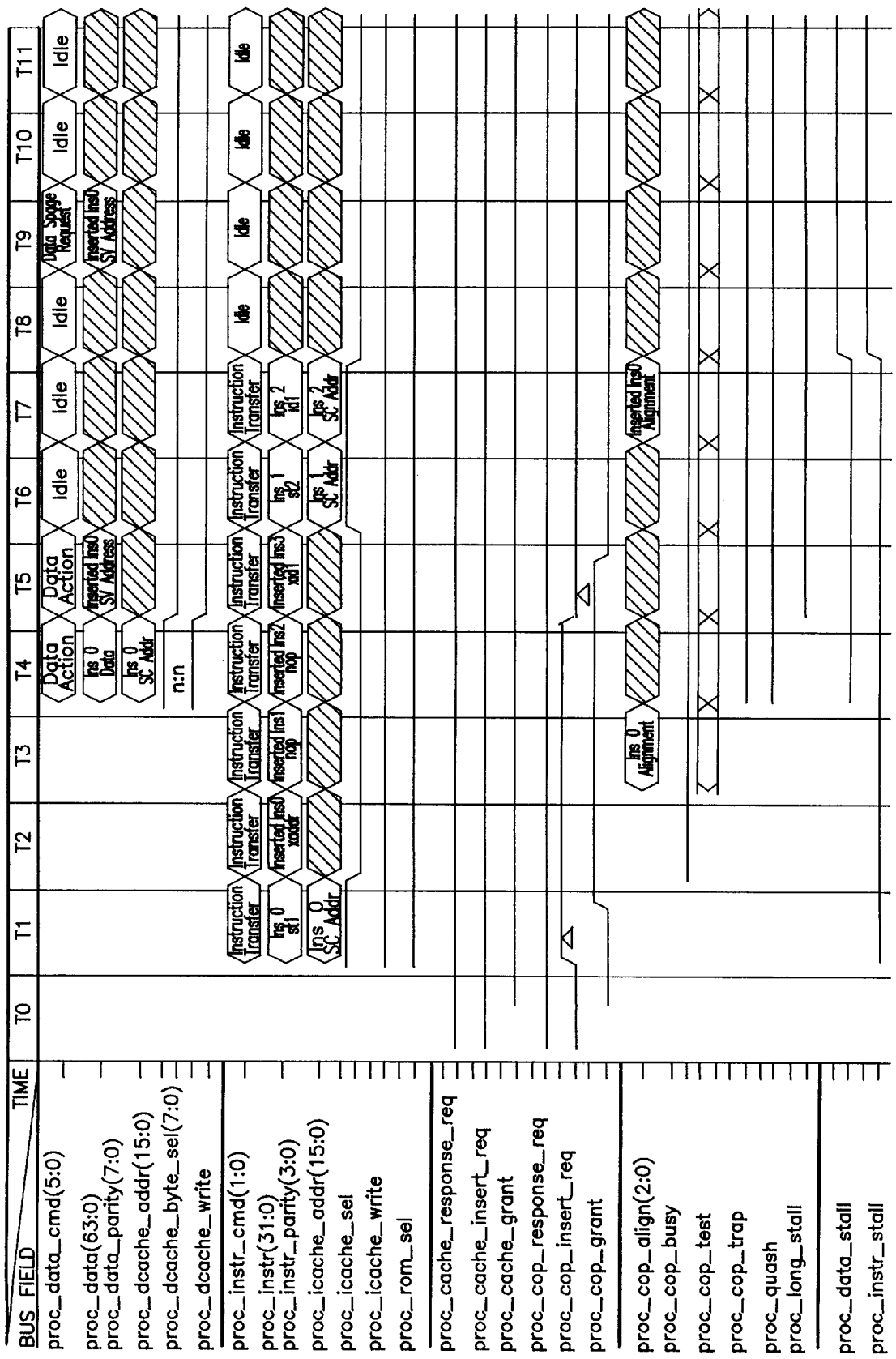
Figures 1, 13I:
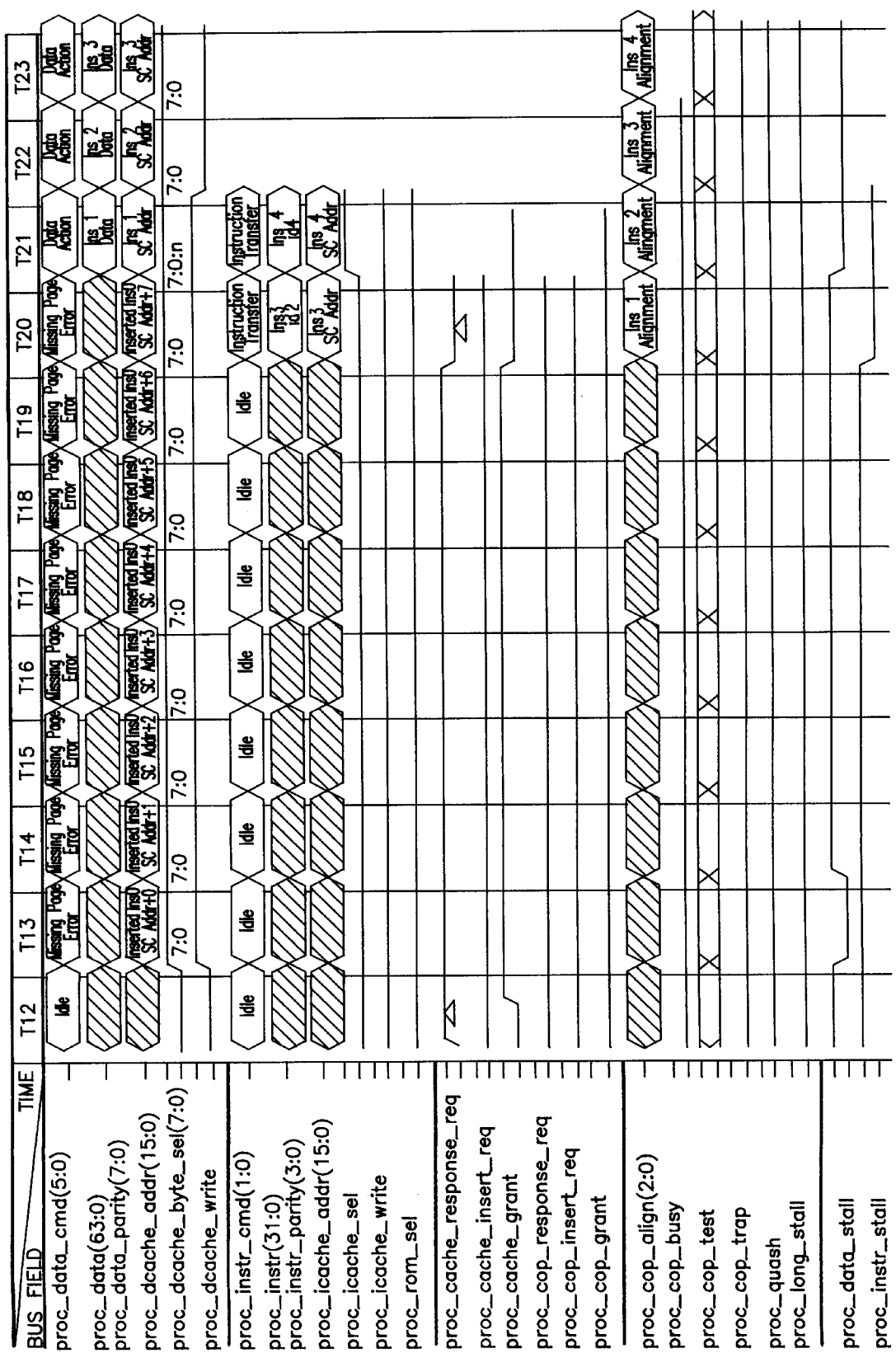
Figures 2, 13I:
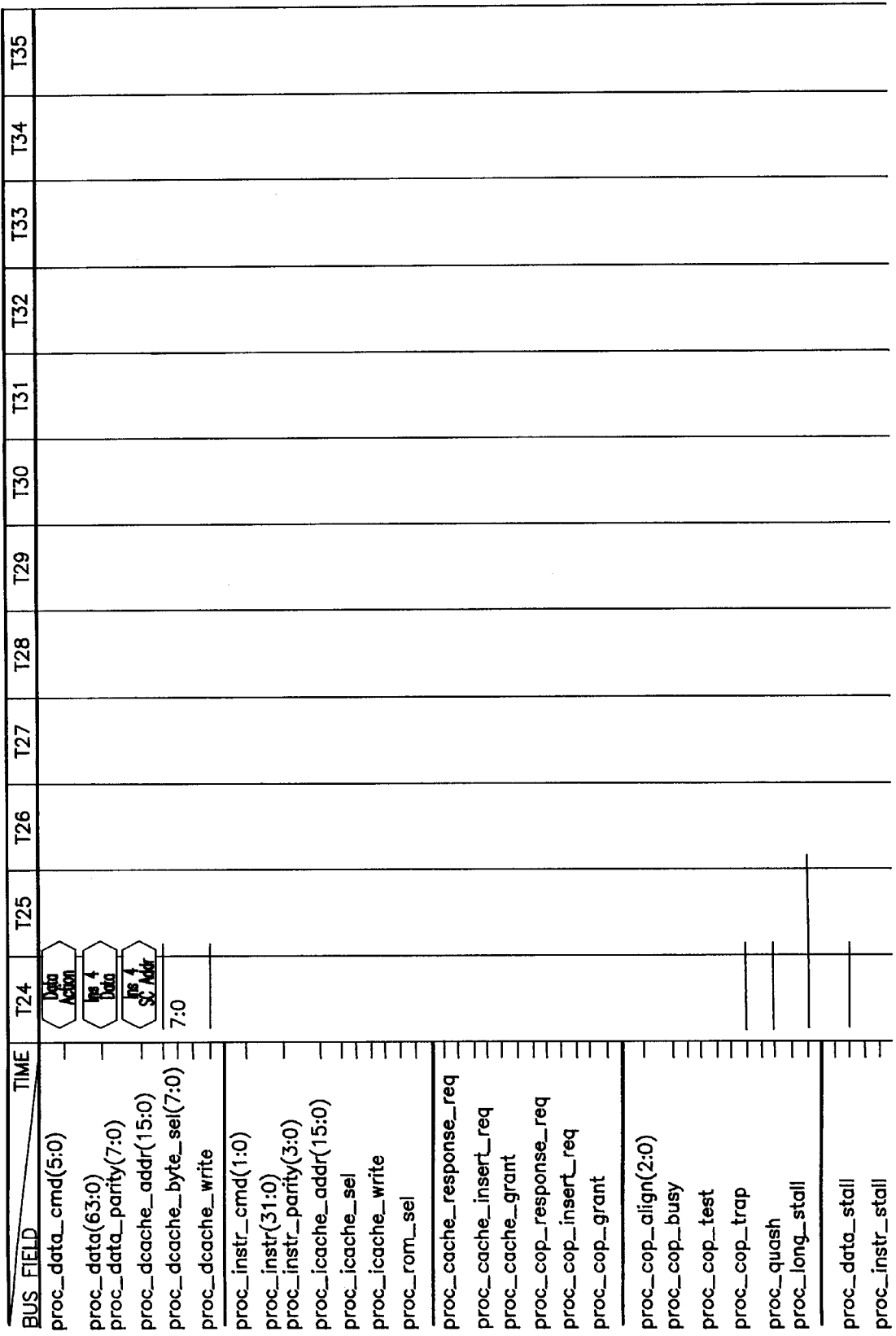
Figure 14A:
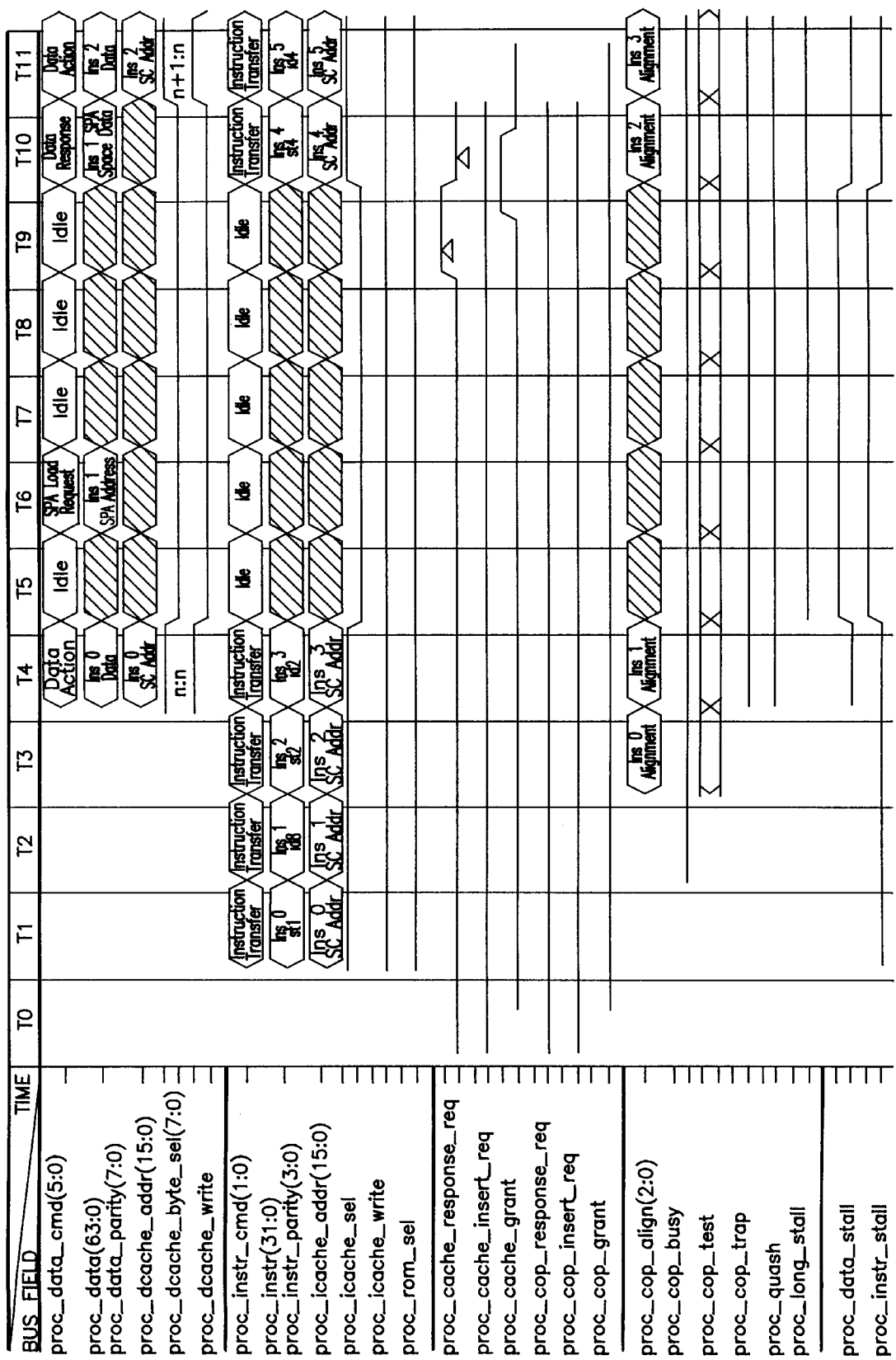
Figures 1, 14A:
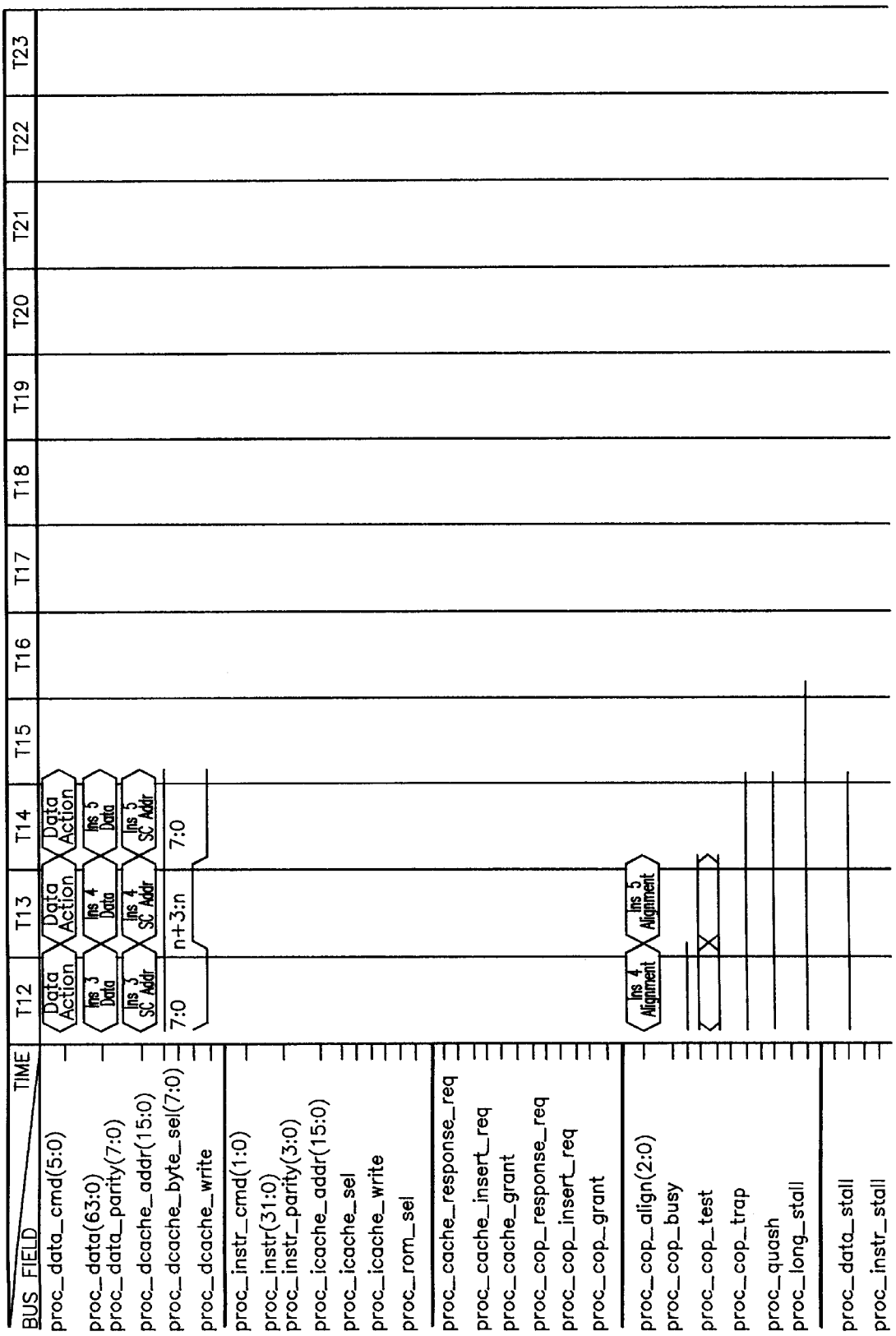
Figure 14B:
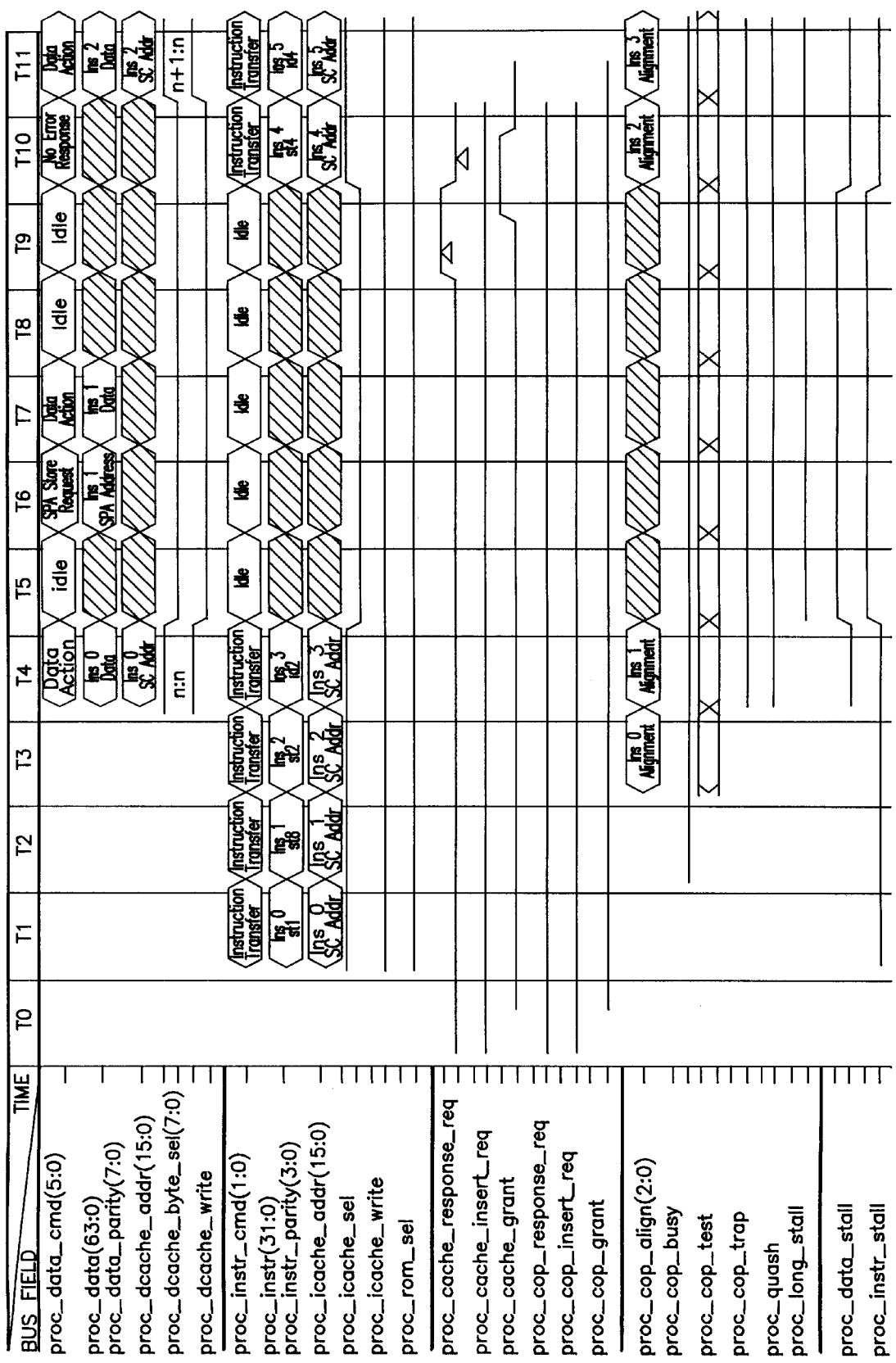
Figures 1, 14B:
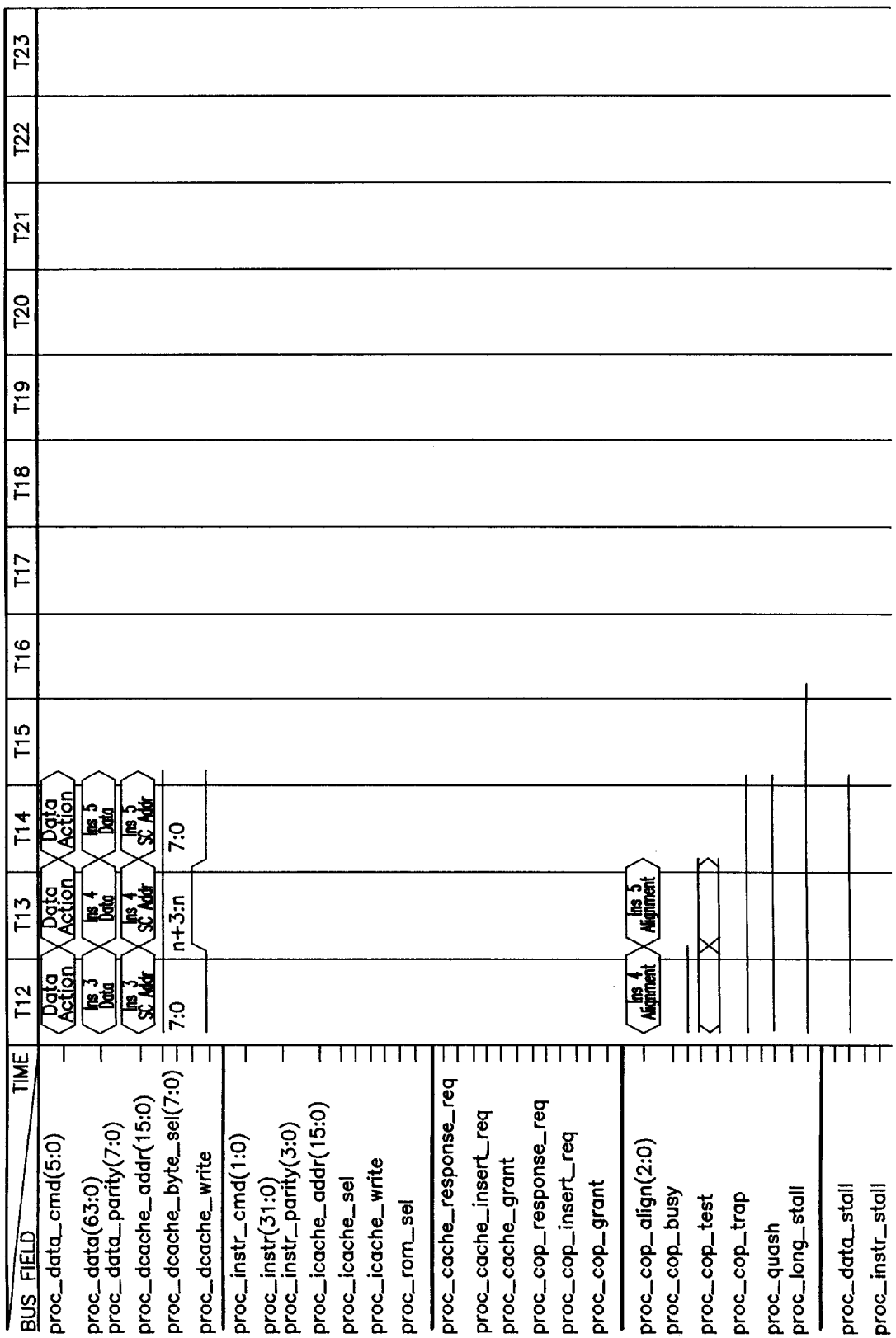
Figure 15A:
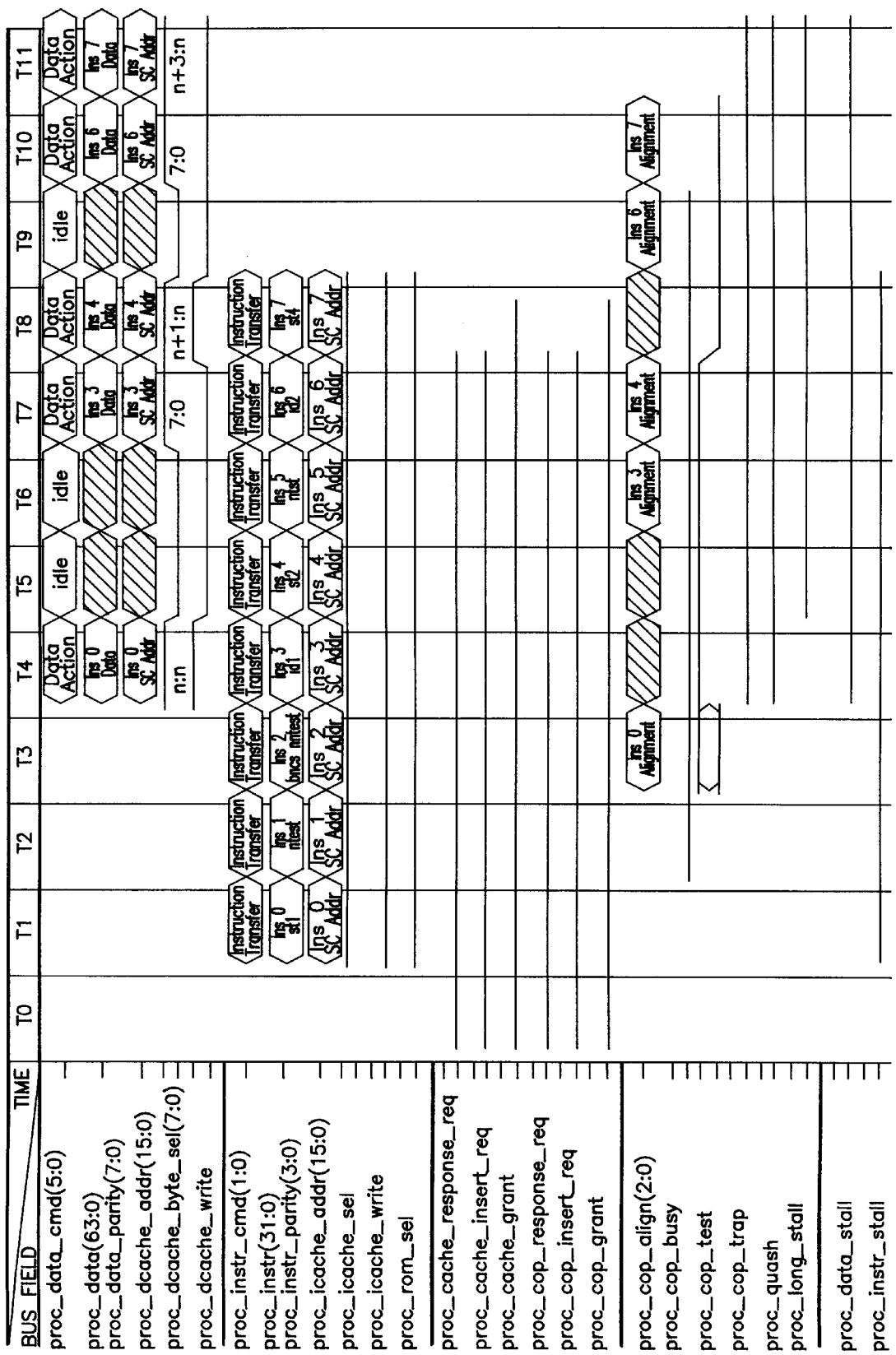
Figure 15B:
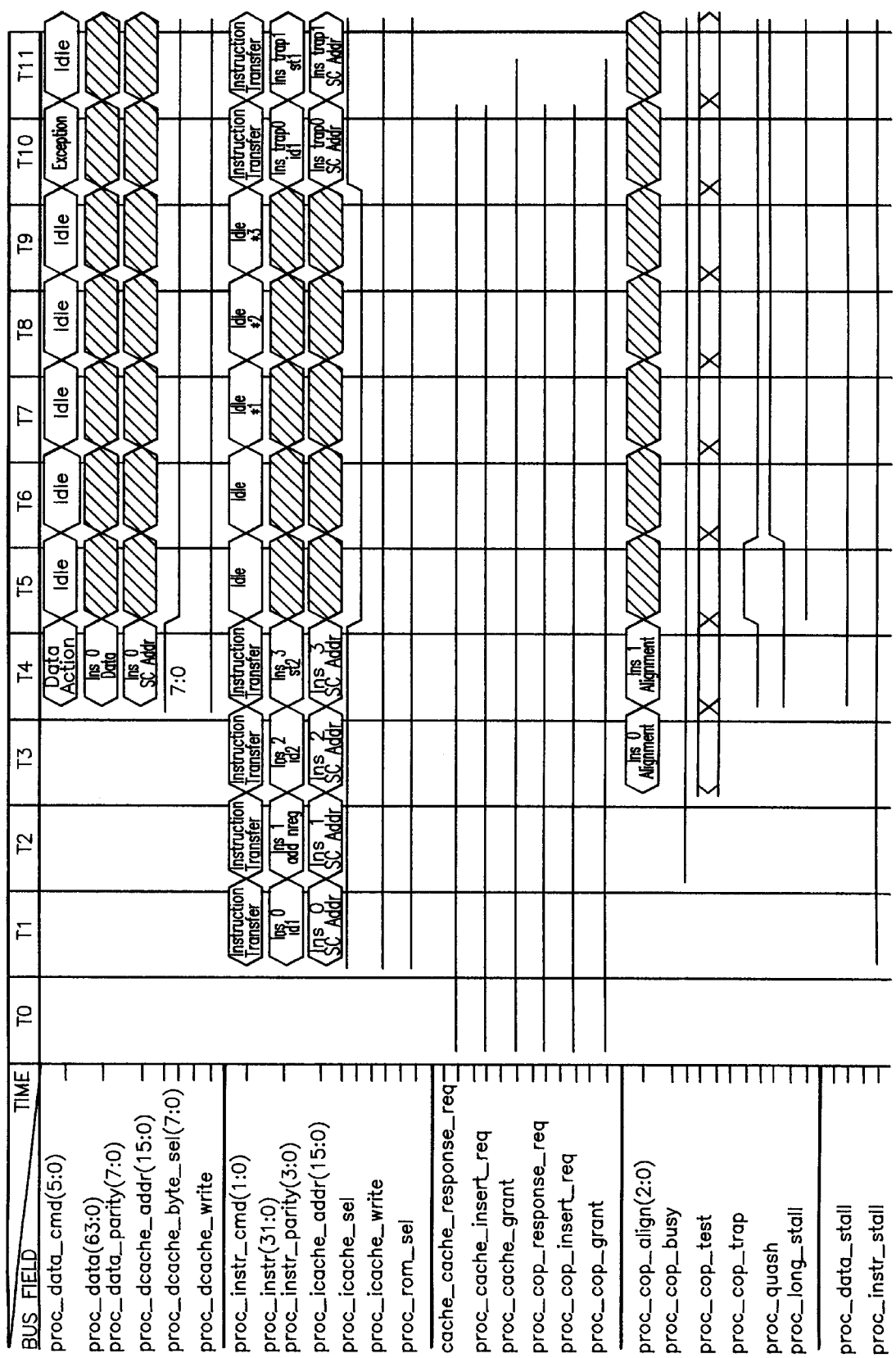
Figures 1, 15B:
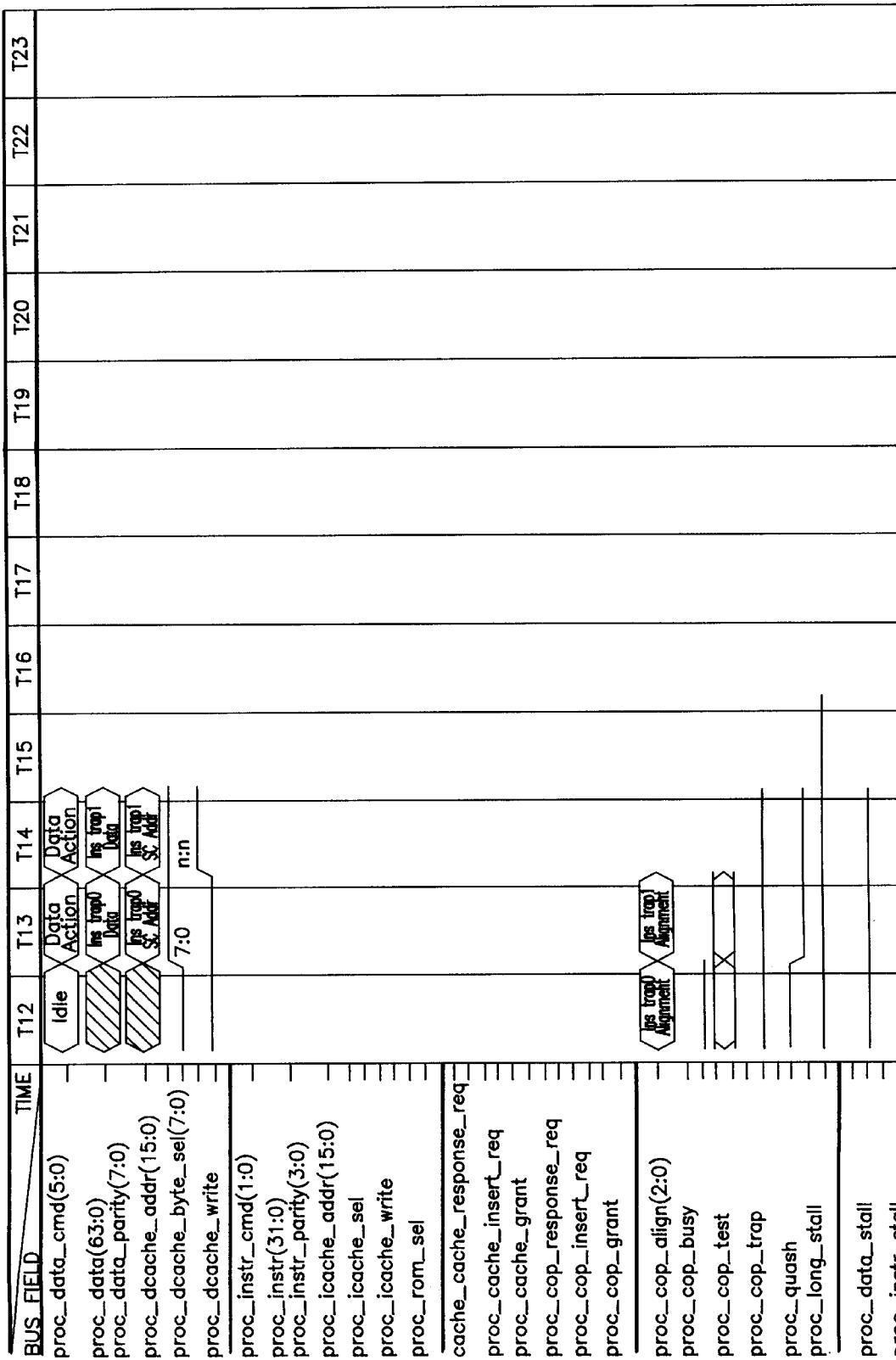
Figure 15C:
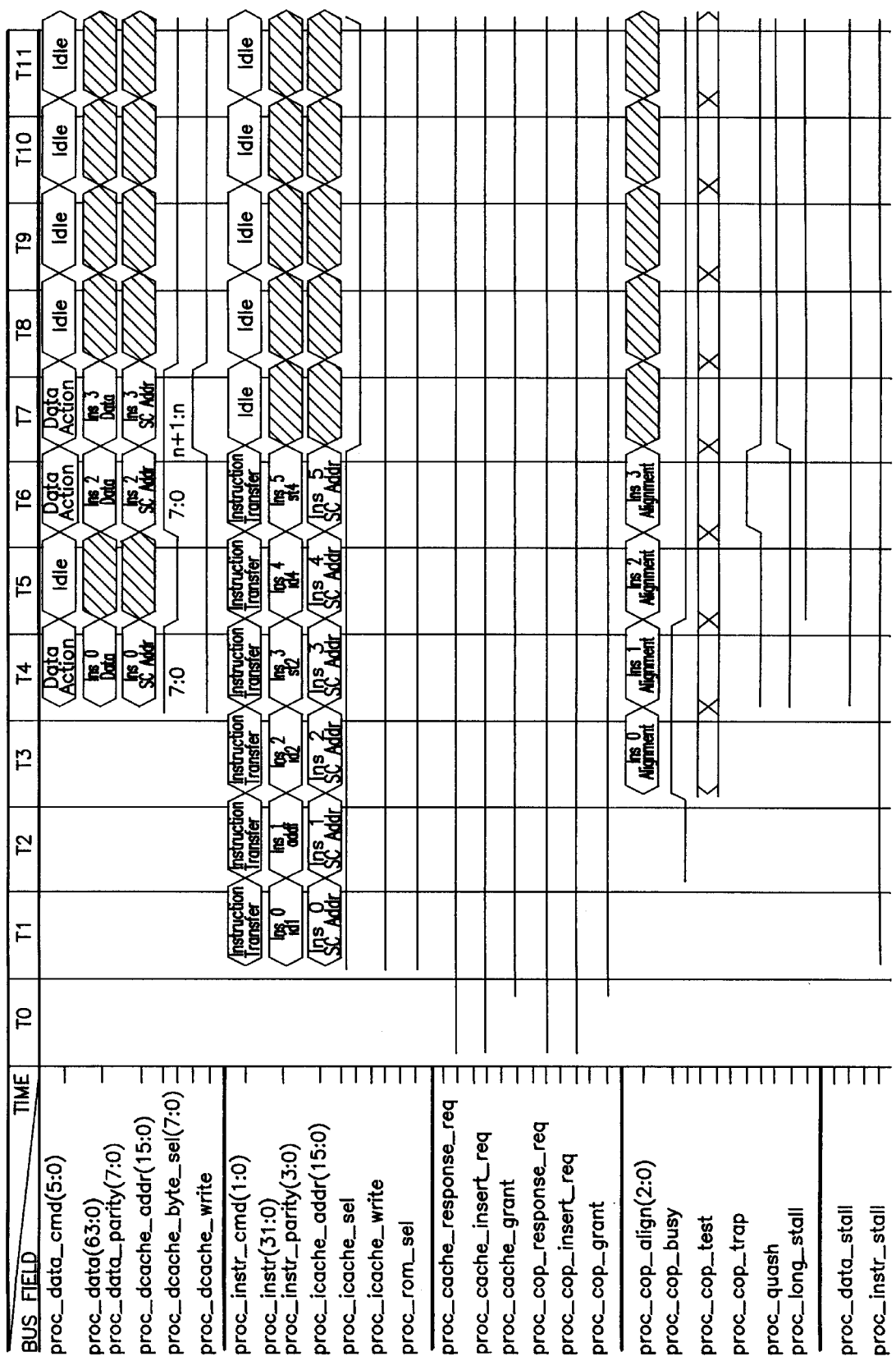
Figures 1, 15C:
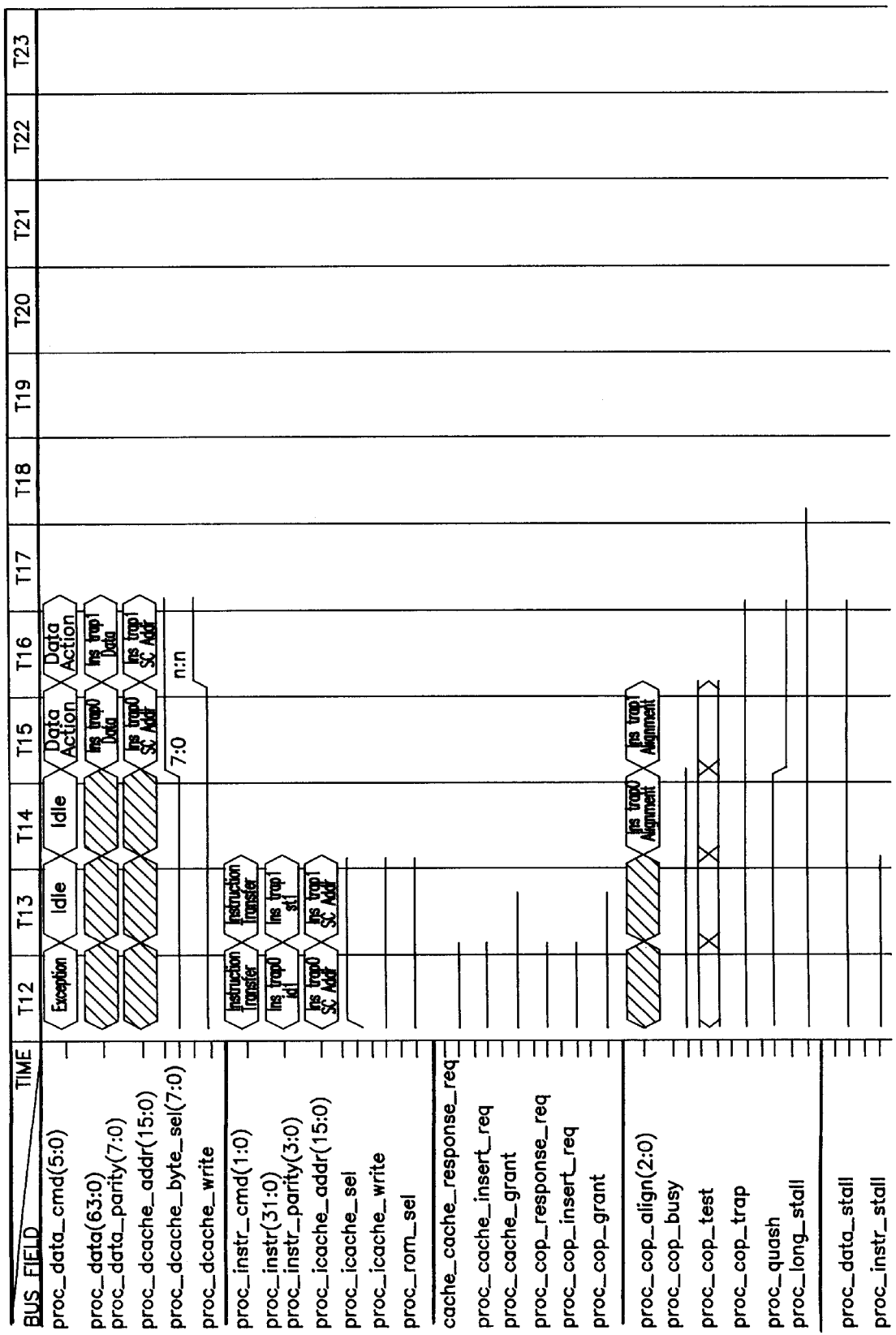
Figure 15D:
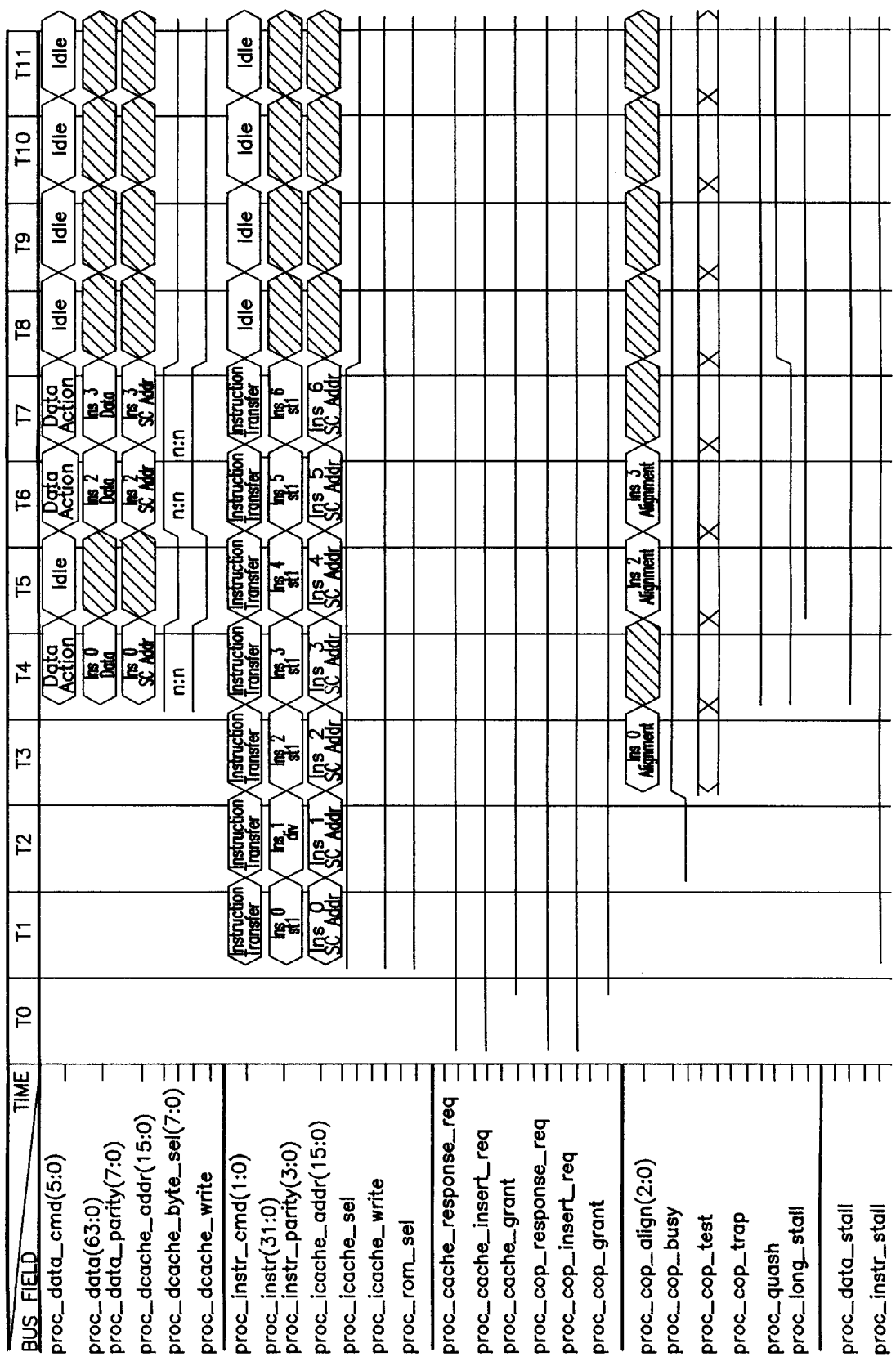
Figures 1, 15D:
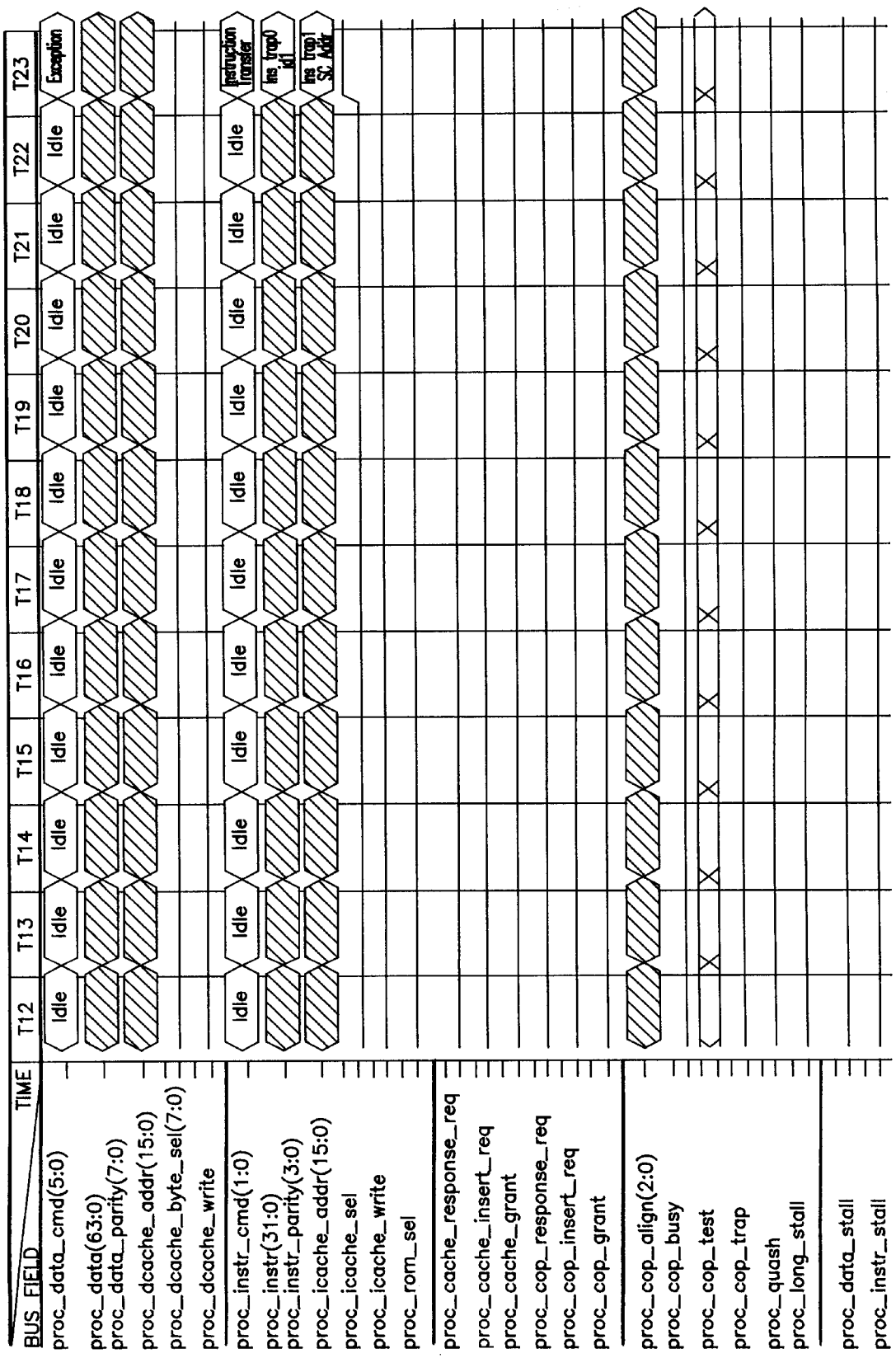
Figures 2, 15D:
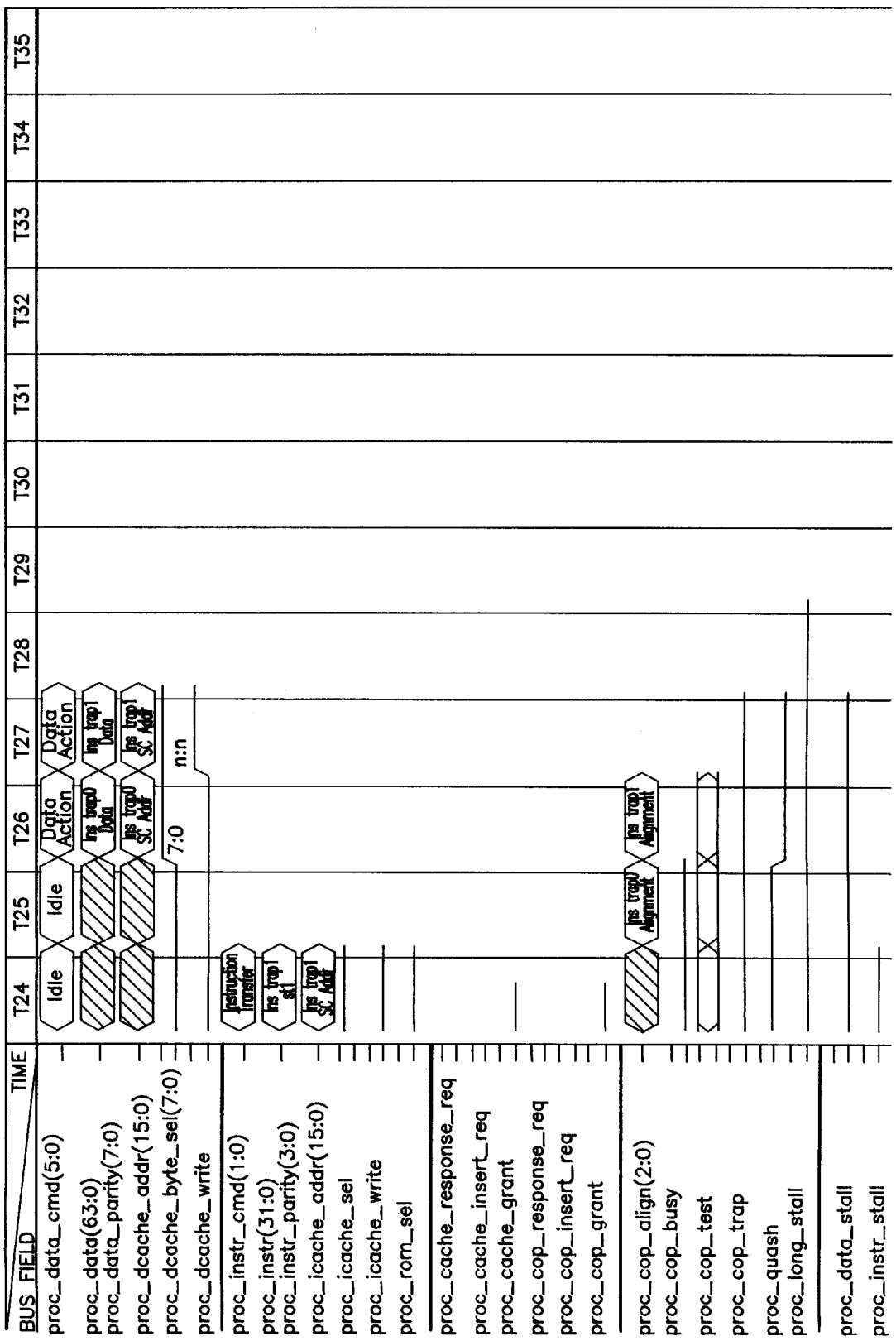
Figure 16A:
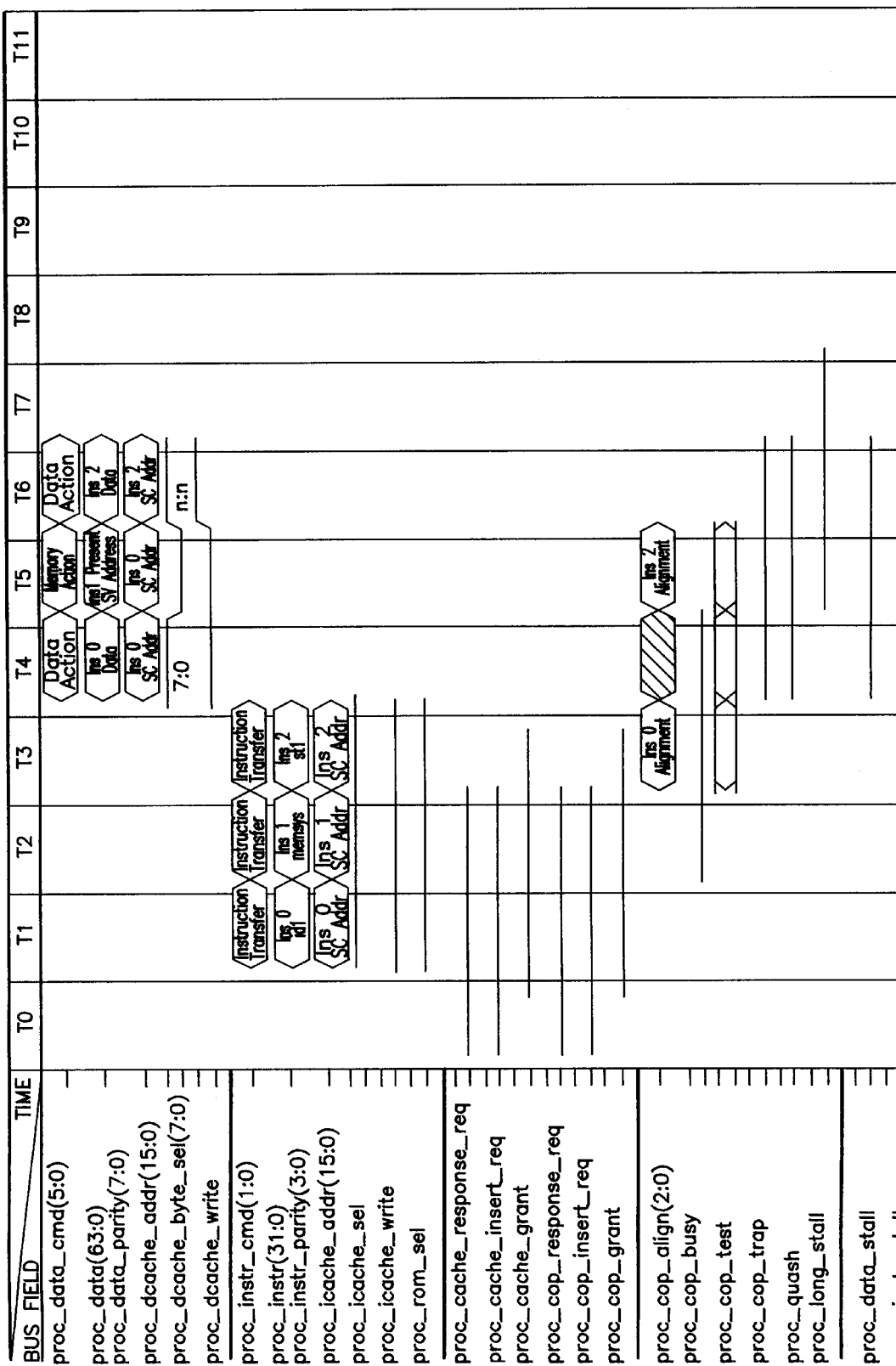
FIG. 16a through 16c are timing diagrams depicting the timing of memory operations.
Figure 16B:
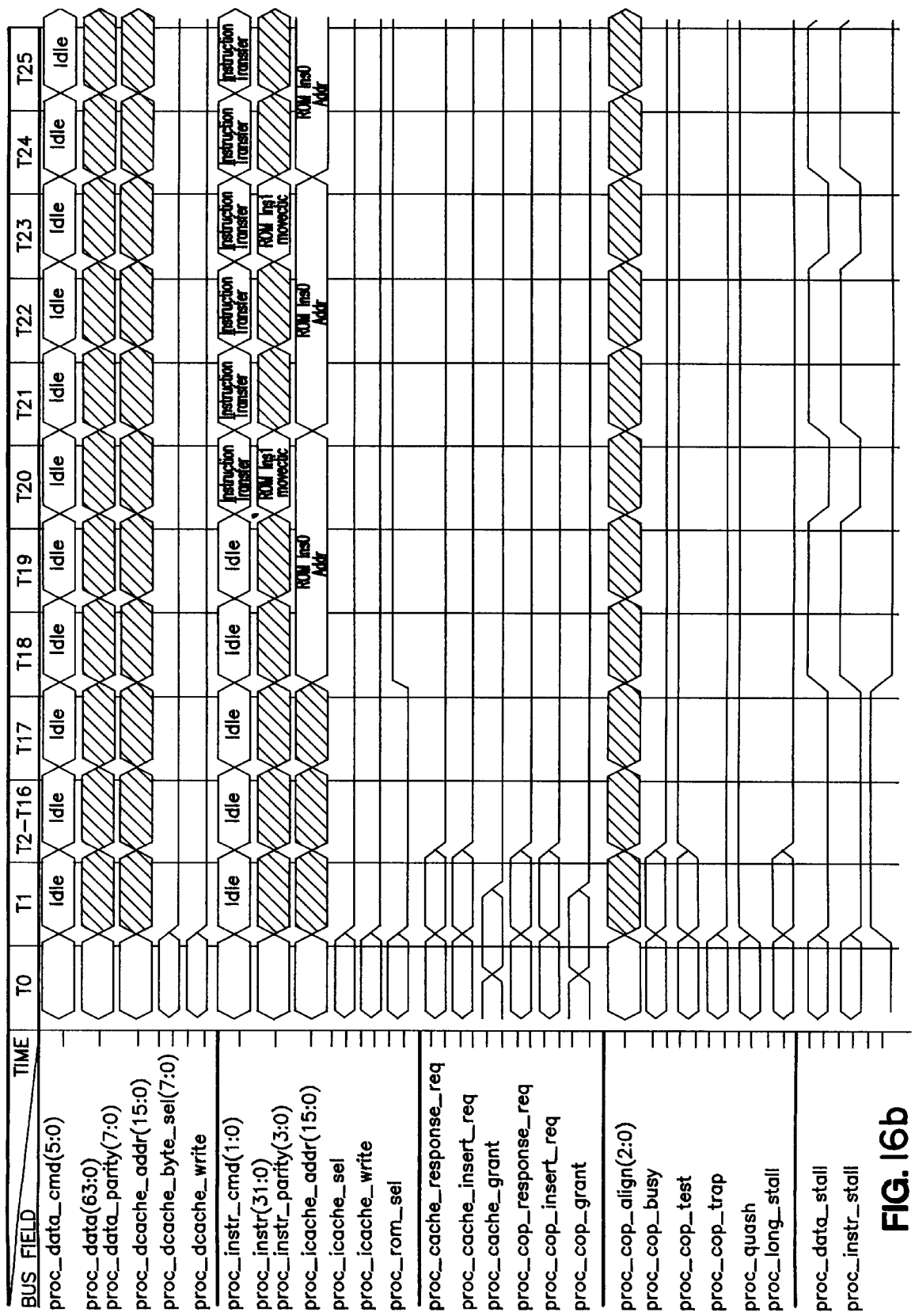
Figures 1, 16B:
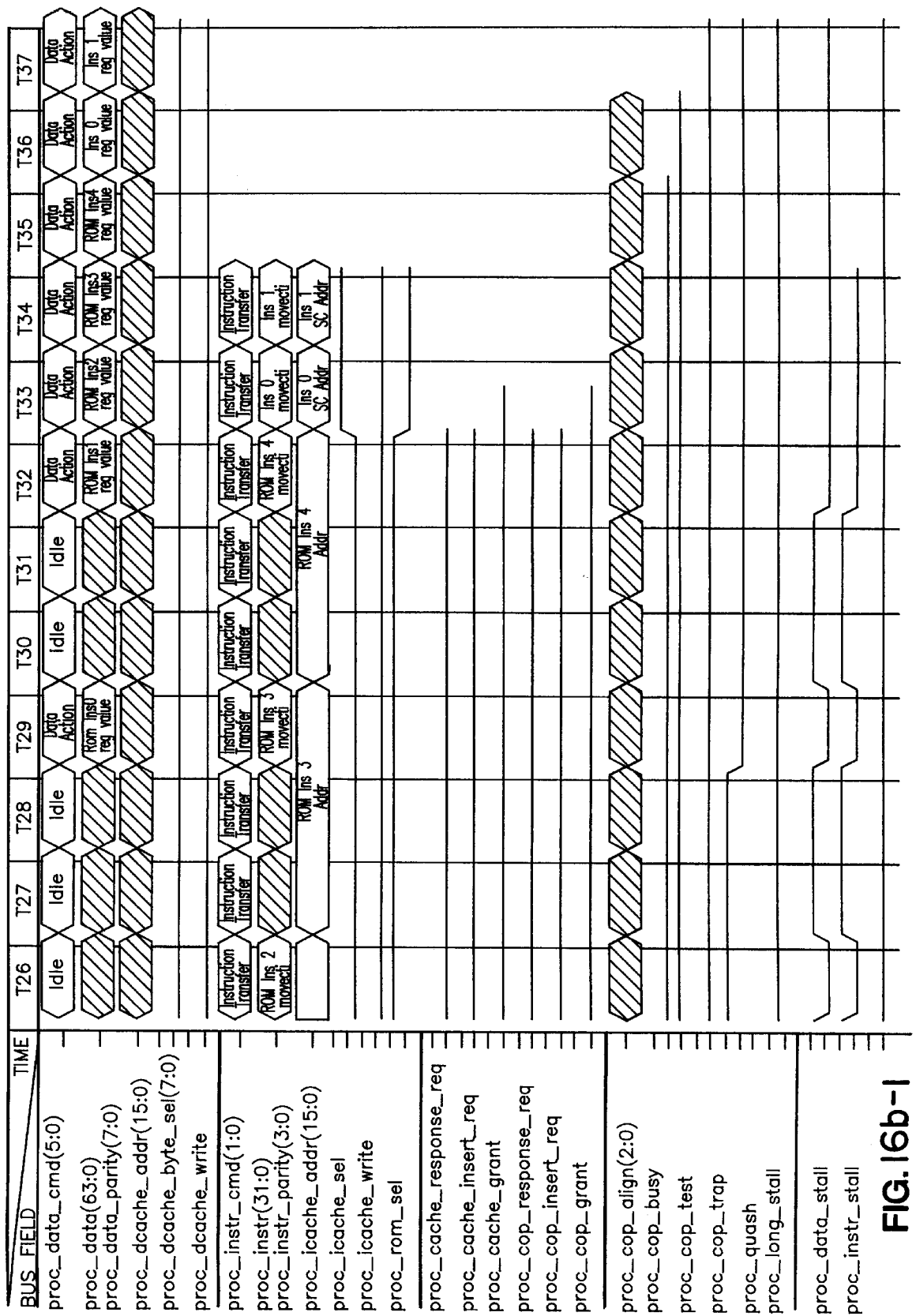
Figure 16C:
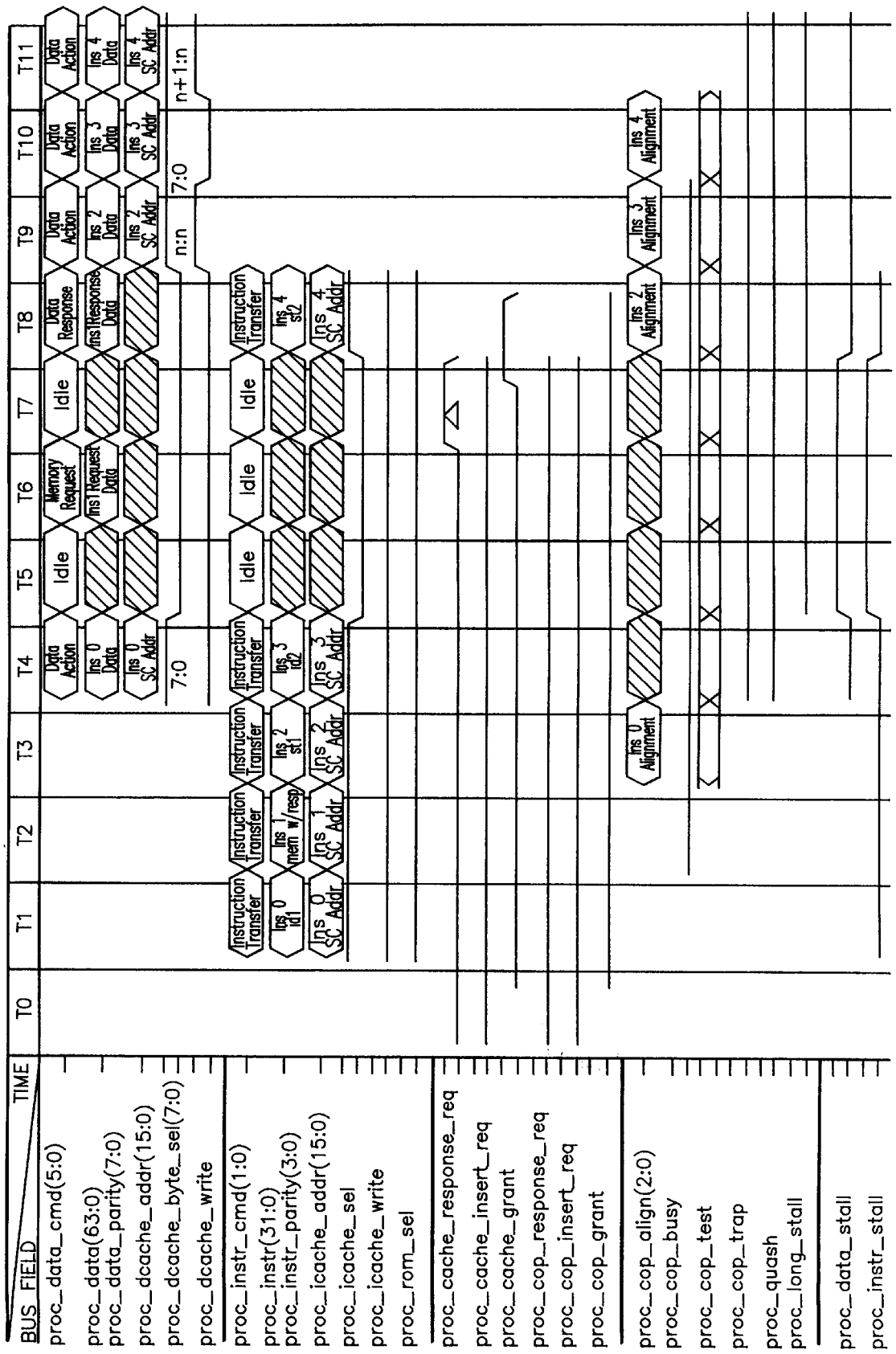

FIG. 9 depicts an exemplary domain routing unit 28F constructed according to a preferred practice of the invention. The unit 28F includes domain directory section 80 and remote fiber interface section 82 interconnected via cache bus 76. Directory section 80 includes dual routing control units 84A and 84B coupled to memory stores 86A and 86B, as illustrated. The stores comprise 8 Mbyte dynamic random access memory elements arranged for storing lists of the descriptors identifying data maintained in the domain segments which descend from the upper level domain segment to which the illustrated routing unit 28F is attached. Routing control units 84A and 84B are constructed and operate similarly to the cache control units 74A, 74B, 74C and 74D, described above. The units additionally include hash encoding logic for controlling storage and access of descriptors within stores 86A and 86B. This encoding logic, as well as the descriptor storage and access mechanisms, are conventional in the art.

The remote fiber interface section 82 includes remote interface unit 88, coupled with fiber receiver and decoding section 90 and with fiber encoding and transmitting section 92, in the manner illustrated in FIG. 9. The receiver 90 interfaces the incoming fiber optic line 94, while the transmitter 92 interfaces the outgoing line 96. In addition to buffering information signal transmissions, the unit 88 provides CRC encoding and decoding for the fiber optic link. Receiver 90 and transmitter 92 are constructed in accord with techniques conventional in the art.

While the illustrated domain routing unit 28F is specifically configured to interface remote domain segments (see, for example, segments 12F and 14B of FIG. 1), it will be appreciated that direct interconnect units (i.e., those domain routing units which provide interconnection between non-remote segments, e.g., segments 14A and 12A of FIG. 1) are similarly constructed. In such units, the remote fiber interface section 82 is replaced by a local interface section, which provides buffering for transmissions between respective domain segment buses.

Summary

It is seen that the aforementioned objects are met by the invention, embodiments of which are described above, which provides a digital data processing system comprising a plurality of processing cells arranged in a hierarchy of rings, which selectively allocates storage and moves exclusive data copies from cell to cell in response to access requests generated by the cells, and which employs routing elements to selectively broadcaset data access requests, updates and transfers on the rings. A multiprocessing system constructed in accord with the invention features improved data coherency, reduced latency and bus contention, as well as unlimited scalability.

It will be appreciated that the embodiments depicted in the drawings and described above are illustrative only and that those skilled in the art may make changes in the illustrated constructions and sequences without departing from the scope of the invention. Thus, for example, that special purpose processing units capable of generating access requests may be substituted for the illustrated central processing units, that remote cells and domains may be coupled by media other than fiber optic lines, and so forth.

Accordingly, what we claim is:

1. A digital data processing apparatus comprising
   A. plural processing cells, each including a central processing unit coupled to an associated memory element,
   B. a memory manager coupled to said plural memory elements for accessing one or more data items stored in said plural memory elements,
   C. at least a requesting one of said central processing units including an access requestor for generating an access request requesting access to one of said data items,
      said access requestor including an ownership request generator representative of a request for priority access to an data item,
      at least the memory element associated with the requesting central processing unit including a controller for selectively transmitting said access request to said memory management element, and
   D. said memory manager including memory coherence element including
      i. a physical storage space allocator responsive to selected ones of said ownership requests for allocating, within the memory element associated with the requesting central processing unit, physical storage space for the requested data item, the memory manager storing the requested data item in the allocated physical storage space, and
      ii. a physical storage space deallocator responsive to selected ones of said ownership requests for selectively deallocating physical storage space maintained for storage of the requested data item, other than the physical storage space associated with the requesting central processing unit, said deallocation being effected substantially concurrently with the allocation of physical storage space for the requested data item in the memory element associated with the requesting central processing unit.

2. A digital data processing apparatus according to claim 1, wherein
   A. said access requester includes a read only request generator for generating a read only request representative of a request for secondary access to a data item, and wherein
   B. said memory manager includes an data item transfer element selectively responsive to a read only request generated by a requesting one of said central processing units, said read only request being representative of a request for secondary access to an data item stored in a memory element associated with another of said other central processing units, for transferring a copy of that data item to the memory element associated with the requesting central processing unit.

3. A digital data processing apparatus according to claim 1, wherein
   A. said central processing units includes an update generator for selectively generating an update request representative of modification of an data item, B. said memory manager includes modification element responsive to an update request generated by an updating one of said central processing units for modifying a corresponding data item stored in the memory element associated with that central processing unit.

4. A digital data processing apparatus according to claim 3, wherein said memory manager includes a data item modification element responsive to an update request generated by said updating central processing unit, said update request being representative of modification of a corresponding data item stored in a memory element associated with another said central processing unit, for modifying that corresponding data item.

5. A digital data processing apparatus according to claim 1, wherein at least one said memory element includes an associated directory for storing an SA address uniquely identifying at least selected data items stored in that memory element.

6. A digital data processing apparatus according to claim 5, wherein
A. said access requestor includes an SA request generator for generating, along with said access request, an SA request identifying the requested data item,
B. said memory manager includes an interface coupled with said directory for comparing an SA request with one or more SA addresses stored in that directory for determining whether the requested data item is stored in the memory element associated with that directory.

7. A digital data processing apparatus according to claim 5, wherein
A. each said directory includes one or more address storage locations for storing SA addresses,
B. said memory management element includes an SA address storage controller for storing in one of said address storage locations an SA address associated with an data item for which physical storage space has been allocated within the associated memory element, and
C. said memory management element includes an SA address invalidator for invalidating an SA address corresponding to an data item for which physical storage space has been deallocated within the associated memory element.

8. A digital data processing apparatus according to claim 1, wherein
A. said access requester includes an atomic ownership generator for generating a atomic request representative of a request for exclusive priority access to one or more data items,
B. said memory coherence element includes an atomic request control element selectively responsive to an atomic request generated by a first one of said central processing units for
i) allocating, in the memory element associated with the first central processing unit, physical storage space for said one or more requested data items and for storing those data items therein, while
ii) preventing access to any of those data items in response to a first selected access request generated by a second one of said central processing units.

9. A digital data processing apparatus according to claim 8, wherein said memory coherence element includes an exclusive transfer control element for responding to a second selected access request generated by said second central processing unit for effecting exclusive transfer of requested data items to the memory element associated with that central processing unit and for preventing access to any of those data items generated by the first or any other central process unit.

10. A digital data processing apparatus according to claim 8, wherein
A. said access requester further includes an atomic transaction terminator for generating a transaction termination request representative of termination of said request for priority access to said one or more data items, and
B. said memory coherence element includes an access re-enabler responsive to said transaction termination request for re-enabling selective access to those data items in response to access requests generated by any of said central processing units.

11. A digital data processing apparatus comprising
A. a plurality of processing cells, including at least a remote processing cell, each said cell including a central processing unit coupled for information transfer with an associated memory element, each said central processing unit including an ownership request generator representative of a request for priority access to an data item,
B. a bus for transmitting data items among said memory elements,
C. a remote interface coupled to said remote cell for transferring data items between the associated memory element and the bus, and
D. a memory manager coupled to said memory elements for accessing data items stored therein, each said central processing unit including a controller for selectively transmitting said access request to said memory management element, said memory manager including memory coherence element including
i) a physical storage space allocator, responsive to selected ones of said ownership requests for allocating, within the memory element associated with the requesting central processing unit, physical storage space for storing the requested data item,
ii) an data item storage controller for storing the requested data item in said allocated storage space, and
iii) a physical storage space deallocator responsive to selected ones of said ownership requests for selectively deallocating physical storage space associated with the requested data item maintained for storage of the requested data item, other than the physical storage space associated with the requesting central processing unit.

12. A digital data processing apparatus according to claim 11, wherein
A. said remote cell resides at a point physically remote from said bus, and wherein
B. said interface includes an information transferor for transferring said data item between said physically remote point and said bus.

13. A digital data processing apparatus according to claim 12, wherein said remote interface includes fiber optic transmission media for carrying data items between said remote cell and said bus.

14. A method of operating a digital data processing apparatus, said apparatus including plural processing cells, each including a central processing unit coupled to an associated memory element, the method comprising the steps of
A. generating within a requesting one of said central processing units an ownership request representative of a request for priority access to an data item, B. determining whether the requested data item is stored within a memory element other than one associated with the requesting central processing unit, and C. responding to a determination that the requested data item is stored in a memory element other than the one associated with the requesting central processing unit for
- (i) allocating, within the memory element associated with the requesting central processing unit, physical storage space for storing the requested data item,
- (ii) storing the requested data item in said allocated storage space, and
- (iii) in response to selected ones of said access requests, selectively deallocating physical storage space associated with the requested data item maintained for storage of the requested data item, other than the physical storage space associated with the requesting central processing unit.

* * * * *